US011562569B2

(12) United States Patent
DeSantola et al.

(10) Patent No.: US 11,562,569 B2
(45) Date of Patent: Jan. 24, 2023

(54) IMAGE-BASED KITCHEN TRACKING SYSTEM WITH METRIC MANAGEMENT AND KITCHEN DISPLAY SYSTEM (KDS) INTEGRATION

(71) Applicant: Agot Co., Pittsburgh, PA (US)

(72) Inventors: Evan DeSantola, Pittsburgh, PA (US); Alex Litzenberger, Pittsburgh, PA (US); Rassoul Mesbah, Aukland (NZ); Prashasti Sar, Pittsburgh, PA (US)

(73) Assignee: Agot Co., Pittsburgh, PA (US)

( * ) Notice: Subject to any disclaimer, the term of this patent is extended or adjusted under 35 U.S.C. 154(b) by 0 days.

(21) Appl. No.: 17/690,539

(22) Filed: Mar. 9, 2022

(65) Prior Publication Data

US 2022/0292834 A1    Sep. 15, 2022

Related U.S. Application Data

(60) Provisional application No. 63/160,668, filed on Mar. 12, 2021.

(51) Int. Cl.
*G06V 20/52* (2022.01)
*G06T 7/70* (2017.01)
(Continued)

(52) U.S. Cl.
CPC ..... *G06V 20/52* (2022.01); *G06Q 10/063112* (2013.01); *G06Q 50/12* (2013.01); *G06T 7/70* (2017.01); *G06T 2200/24* (2013.01)

(58) Field of Classification Search
None
See application file for complete search history.

(56) References Cited

U.S. PATENT DOCUMENTS 9,324,070 B1    4/2016  Bekmann et al.
10,009,780 B2   6/2018  Awiszus
(Continued)

FOREIGN PATENT DOCUMENTS

CA    2851688 A1    11/2014
EP    2055146 B1    11/2013

OTHER PUBLICATIONS

Food Safety Conditions in Home-Kitchens: A Cross-Sectional Study in the Federal District/Brazil—2020.
(Continued)

*Primary Examiner* — Delomia L Gilliard
(74) *Attorney, Agent, or Firm* — Lowenstein Sandler LLP

(57) ABSTRACT

The subject matter of this specification can be implemented in, among other things, methods, systems, computer-readable storage medium. A method includes a processing device receiving image data having one or more image frames indicative of a state of a meal preparation area. The method further includes the processing device determining, based on the image data, one of a meal preparation item or a meal preparation action associated with the state of the meal preparation area. The method further includes the processing device determining, based on the image data, a performance metric associated with the meal preparation item or the meal preparation item or the meal preparation action. The method further includes the processing device causing a notification corresponding to the performance metric to be displayed on a graphical user interface (GUI).

27 Claims, 18 Drawing Sheets

(51) Int. Cl.
*G06Q 10/06* (2012.01)
*G06Q 50/12* (2012.01)

(56) References Cited

U.S. PATENT DOCUMENTS

| | | | |
|---|---|---|---|
| 10,140,602 B2 | 11/2018 | Kelly et al. | |
| 10,185,928 B2 | 1/2019 | Quezada | |
| 10,252,419 B2 | 4/2019 | Fritz et al. | |
| 10,289,989 B2 | 5/2019 | Kelly et al. | |
| 10,304,147 B2 | 5/2019 | Kelly et al. | |
| 10,387,945 B2 | 8/2019 | Burry et al. | |
| 10,467,559 B1* | 11/2019 | Svenson | G06Q 20/326 |
| 10,600,041 B2 | 3/2020 | Kelly et al. | |
| 10,860,995 B2 | 12/2020 | Kelly et al. | |
| 11,200,575 B2 | 12/2021 | Seo et al. | |
| 11,228,700 B2 | 1/2022 | Rajhansa et al. | |
| 11,285,878 B2 | 3/2022 | Sigle | |
| 11,345,040 B2* | 5/2022 | Oleynik | B25J 9/1669 |
| 2006/0213904 A1 | 9/2006 | Kates | |
| 2007/0150371 A1 | 6/2007 | Gangji | |
| 2008/0178749 A1* | 7/2008 | Stutman | G06Q 30/0283 |
| | | | 340/286.01 |
| 2010/0274633 A1 | 10/2010 | Scrivano et al. | |
| 2011/0075192 A1 | 3/2011 | Kumamoto | |
| 2015/0086179 A1* | 3/2015 | Hurst | G06V 20/40 |
| | | | 386/241 |
| 2015/0088594 A1* | 3/2015 | Hurst | G06Q 10/0635 |
| | | | 705/7.28 |
| 2015/0220935 A1 | 8/2015 | Iwai | |
| 2015/0228062 A1 | 8/2015 | Joshi et al. | |
| 2015/0356668 A1 | 12/2015 | L'Heureux et al. | |
| 2016/0180381 A1 | 6/2016 | Kaiser et al. | |
| 2017/0221296 A1* | 8/2017 | Jain | G07F 17/0078 |
| 2017/0323370 A1 | 11/2017 | Burry et al. | |
| 2018/0196403 A1 | 7/2018 | Lagares-Greenblatt et al. | |
| 2018/0324908 A1 | 11/2018 | Denker et al. | |
| 2019/0291277 A1* | 9/2019 | Oleynik | B25J 9/1669 |
| 2020/0019861 A1* | 1/2020 | Jeong | G06F 16/951 |
| 2020/0043156 A1 | 2/2020 | Fox | |
| 2020/0159750 A1 | 5/2020 | Shadrokh et al. | |
| 2020/0175564 A1 | 6/2020 | Kulasooriya | |
| 2020/0175673 A1 | 6/2020 | Wen et al. | |
| 2020/0202462 A1 | 6/2020 | Muyskens | |
| 2020/0249660 A1* | 8/2020 | Rao | G05B 19/41865 |
| 2020/0028619 A1 | 9/2020 | Roy | |
| 2020/0286192 A1 | 9/2020 | Roy et al. | |
| 2020/0294018 A1 | 9/2020 | Wolter et al. | |
| 2020/0334628 A1 | 10/2020 | Goldberg et al. | |
| 2020/0351557 A1 | 11/2020 | Drake | |
| 2020/0363778 A1 | 11/2020 | Mahapatra | |
| 2021/0022559 A1* | 1/2021 | Zito | A47J 44/00 |
| 2021/0027485 A1* | 1/2021 | Zhang | G06V 10/82 |
| 2021/0192329 A1 | 6/2021 | Shin | |
| 2021/0248637 A1* | 8/2021 | Ramos | G06Q 30/0224 |
| 2021/0251263 A1 | 8/2021 | Knightson et al. | |
| 2021/0366033 A1* | 11/2021 | Yamamoto | G06Q 50/12 |
| 2021/0374430 A1* | 12/2021 | Siemer | G06K 9/6215 |
| 2021/0383302 A1* | 12/2021 | Covell | G06N 20/00 |
| 2022/0012801 A1 | 1/2022 | Maddalo et al. | |

OTHER PUBLICATIONS

Design of a Kitchen-Monitoring and Decision-Making System to Support AAL Applications—2021.

* cited by examiner

IMAGE-BASED KITCHEN TRACKING SYSTEM WITH METRIC MANAGEMENT AND KITCHEN DISPLAY SYSTEM (KDS) INTEGRATION

RELATED APPLICATIONS

The present application claims the benefit under 35 U.S.C. § 119(e) of U.S. Provisional Patent Application No. 63/160,668 filed Mar. 12, 2021, which is incorporated by reference herein. This application is also related to U.S. patent application Ser. No. 17/499,795 filed Oct. 12, 2021, entitled "Image-Based Kitchen Tracking System with Order Accuracy Management," and is also related to U.S. patent application Ser. No. 17/499,797 filed Oct. 12, 2021, entitled "Image-Based Kitchen Tracking System with Anticipatory Preparation Management," and is also related to U.S. patent application Ser. No. 17/542,251 filed Dec. 3, 2021, entitled "Image-Based Drive-Thru Management System," and is also related to U.S. patent application Ser. No. 17/690,537 filed Mar. 9, 2022, entitled "Image-Based Kitchen Tracking System with Dynamic Labeling Management."

TECHNICAL FIELD

The instant specification generally relates to monitoring a kitchen and/or drive-thru of a restaurant. More specifically, the instant specification relates to using image acquisition, data processing, and machine learning to produce a representation of the state of the restaurant and to track, measure, process, display, and/or otherwise use operationalized restaurant metrics associated the restaurant including the integration of a computer vision system with the kitchen display system (KDS).

BACKGROUND

Restaurants, or eateries, are businesses that prepare and serve meals (e.g., food and/or drinks) to customers. Meals can be served and eaten on-site of a restaurant, however some restaurants offer a take-out (e.g., such as by implementing a drive-thru) and/or food delivery services. Restaurant food preparation can involve developing systems for taking orders, cooking, and/or serving a collection of items typically organized on a menu. Some food preparation systems involve preparing some ingredients in advance (e.g., cooking sauces and/or chopping vegetables), and completing the final steps when a customer orders an item (e.g., assembly of an order). Menu items are often associated with a series of preparation steps that involve ingredients and actions to be performed in association with those ingredients (e.g., cook a hamburger or apply salt to the French fries). Food preparation systems can depend on knowing precisely how long it takes to prepare each menu item and planning tasks so that the menu items are prepared efficiently and accurately.

SUMMARY

In some embodiments, a method includes a processing device receiving image data having one or more image frames indicative of a state of a meal preparation area. The method further includes the processing device determining, based on the image data, one of a meal preparation item or a meal preparation action associated with the state of the meal preparation area. The method further includes the processing device determining, based on the image data, a performance metric associated with the meal preparation item or the meal preparation item or the meal preparation action. The method further includes the processing device causing a notification corresponding to the performance metric to be displayed on a graphical user interface (GUI).

In some embodiments, a system can include a first camera. The first camera captures first image data. The first image data may include one or more image frames with a first field of view of a meal preparation area. The one or more image frames may indicate a current state of the drive-thru area. The system may further include a kitchen interface device configured to receive inputs (e.g., using a touch screen interface, keyboard, mouse, etc.) from within the meal preparation area and/or provide outputs (e.g., using a printer, display, lights (e.g., light emitting diodes (LEDs)) haptic device, etc.) to the meal preparation area. The system may further includes a memory and a processing device coupled to the memory, the first camera, and the kitchen interface device. The processing device may be designed to receive the image data from the first camera. The processing device further determines, based on the image data, one of a first meal preparation item or a first meal preparation action associated with the state of the meal preparation area. The processing device further receives order data including one or more pending meal orders. The processing device further determines, based on the image data and the order data, a preparation status of a first pending meal order of the one or more pending meal orders. The processing device further provides, using the kitchen interface device, a notification within the meal preparation area corresponding to the preparation status of the first pending meal order.

In some embodiments, a non-transitory machine-readable storage medium includes instructions that when executed by the processing device may cause the processing device to perform operations that include receiving image data comprising one or more image frames indicative of a state of a meal preparation area. The operations may further include determining, based on the image data, one of a meal preparation item or a meal preparation action associated with the state of the meal preparation area. The operations may further include determining, based on the image data, a performance metric associated with the meal preparation item or the meal preparation item or the meal preparation action. The operations may further include causing a notification corresponding to the performance metric to be displayed on a graphical user interface (GUI).

BRIEF DESCRIPTION OF THE DRAWINGS

Aspects and implementations of the present disclosure will be understood more fully from the detailed description given below and from the accompanying drawings, which are intended to illustrate aspects and implementations by way of example and not limitation.

DETAILED DESCRIPTION

Figure 1:
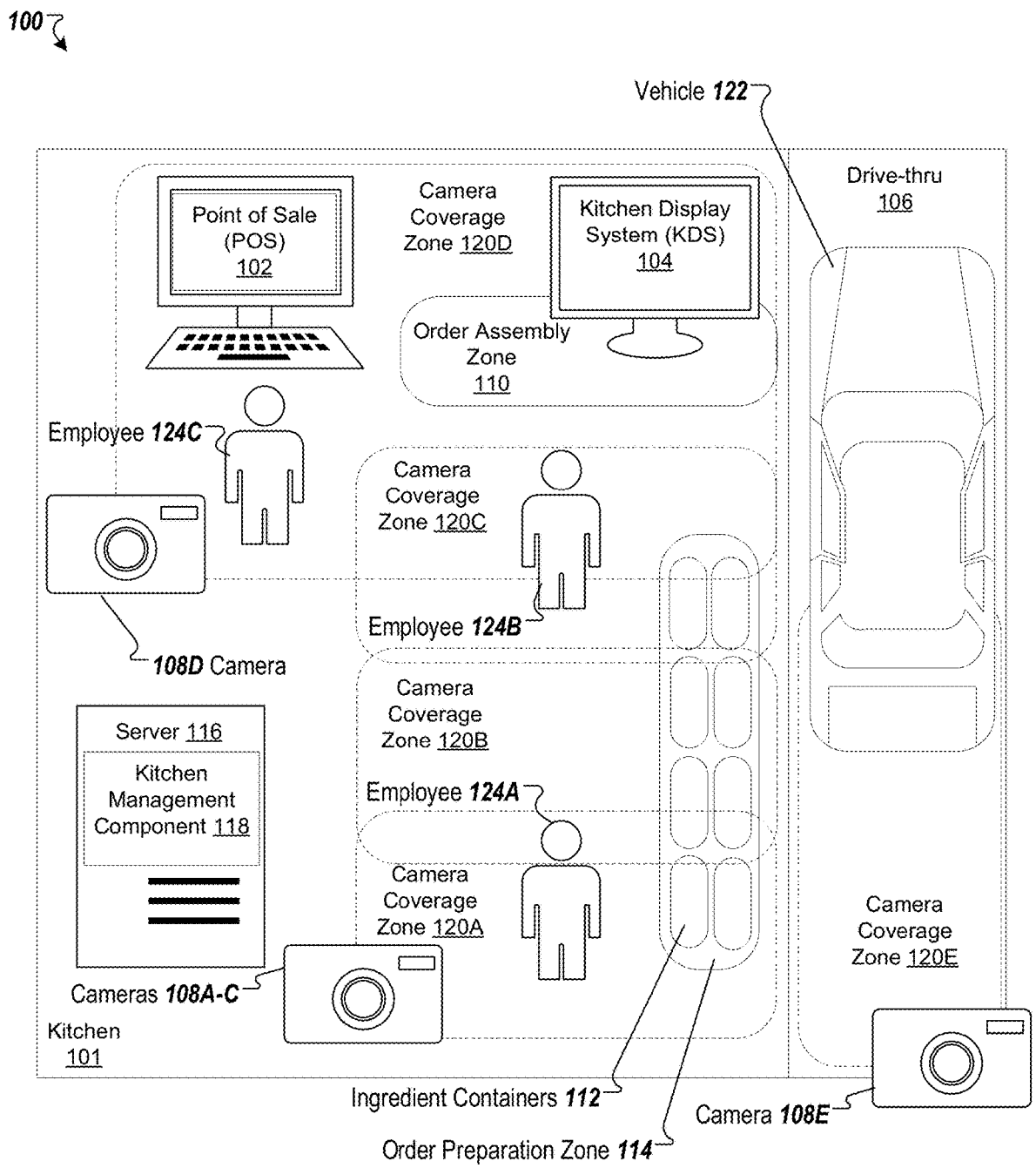
FIG. 1 depicts an image-based kitchen tracking system, in which implementations of the disclosure may operate.

The growing digitization of live operation data in restaurants has led to increased tracking, analysis, and prediction of future data (e.g., future sales data). The increasing digitization of restaurant data has led to an increasing use of digital point of sale (POS) systems, where data is digitized and processed for sales analysis. Conventional POS systems often track orders as they come in and communicate to a display (e.g., a kitchen display system (KDS)) order data (e.g., a queue of upcoming orders) and can communicate with a kitchen interface (e.g., a "bump bar") to receive inputs from users (e.g., employees, chefs, etc.) to update the order data (e.g., advance order queue, delete and order, mark as completed and/or partially completed, etc.).

Advancements in digital technology like POS systems have further increased the efficiency of restaurant preparation operations. However, even in the presence of digital technology, like POS systems, restaurants run the risk of delivering inaccurate orders (e.g., incorrect and/or incomplete orders), late orders, and/or otherwise deficient orders. The deficient orders may be caused by various rationale, for example, employee mistakes when preparing an order, lack of inventory for a given menu item, delays in preparing ingredients used for a given menu item, and/or the like. Identifying the reasons for erroneous orders can be time consuming and inefficient. However, if left uncorrected, orders may continue to be prepared incorrectly, which can lead to customer dissatisfaction. Restaurants often take remedial action (e.g., complimentary items, refunds, remaking menu items, etc.) responsive to deficient orders; however, these actions come at a cost to the restaurant. Additionally, there may exist other restaurant procedures that can be updated and/or improved that may result in increased order accuracy and/or efficiency. However, identifying these updates and/or improvements can be difficult and costly.

Other common deficiencies and/or difficulties in carrying out restaurant operations involve a drive-thru area. Restaurant drive-thru areas may include a queue system including one or more driving lanes that direct a series of vehicles through various stages (e.g., order zones, payment zones, meal pickup zones, e.g.) of a meal preparation and delivery process. Common challenges of conventional drive-thru systems and methodologies include efficiently and accurately filling meal orders to vehicles in the drive thru area. For example, some orders may slow down the meal preparation and delivery process by taking an above average amount of time to prepare and deliver the order (e.g., leaving quickly filled orders to wait upon vehicles associated with slower, longer to fill orders). In some cases, a drive-thru area employs multiple routes through a drive-thru area (e.g., multiple order kiosks to acquire pending meal orders). A drive-thru area may incorporate merging of lanes that can lead to vehicles arriving at payment and/or meal delivery areas in a different order than expected (e.g., different order from the order in which pending meal orders are received). The variable order of vehicles may lead to some customers paying for incorrect meals and/or receiving incorrect meals. Additionally, customers may be required to verify or otherwise declare order association at a payment area and/or meal delivery area which can take time and be a negative experience (e.g., annoyance to customers having to verify order associations).

Additionally, the tracking and monitoring of kitchen tasks such as, for example, the preparation of meals increases in difficulty with the introduction of new menu items such as promotional item or limited time offers (e.g., promotional limited duration menu item). New menu items may bring alterations to current menu items such as changing one or more ingredients, adding one or more ingredients, removing one or more ingredients, and any combination thereof. In some cases, restaurants make use of limited time offers, promotional items, and/or other temporary menu items that may introduce new ingredients, new permutations of existing meal preparation items, new methods of preparing meal for pending meal orders, and so forth. The introduction of new menu items, ingredients, meal preparation actions, and so forth may introduce new visual data captured by the cameras. The kitchen management system may leverage processing logic to identity features of new meal items without recognizing an identity (e.g., an object classification or label) of the new meal preparation item. Novel feature characterizations (e.g., feature vectors) of new items may result in the system failing to detect the object at all or in some cases, may associate the new items with an inaccurate classification rendering one or more of the other systems described herein (e.g., order accuracy, anticipatory preparation of ingredients, operational metrics, drive-thru management) deficient for performing the outlined functionality. As noted throughout, various applications of the image based system such as, for example, order accuracy and anticipatory preparation of ingredients often require a level of processing precision and accuracy to actively perform their outlined functionality.

Conventionally, restaurants track throughput of a drive-thru and/or in-restaurant operations and reward shifts if they are able to keep their speed of service metrics at a good pace (e.g., meeting target metrics). Conventional methods of tracking throughput for a drive-thru involve using magnets or other loop timers that count cars as they come through the drive-thru. Similarly, restaurants count ingredients at the start/end of shifts for similar metric evaluation and reward systems. However, conventional systems are unable to measure more granular data without use of employee resources which often takes away from the efficiency (including speed and accuracy) with which a restaurant can complete and deliver orders. Furthermore, the tracked data is often independent from any pre-existing kitchen operational system. Accordingly, it can require more resources to operate two separate systems (e.g., a system to carry out kitchen tasks and another system to attempt to track various metrics within the kitchen) for conventional systems.

Aspects and implementations of the present disclosure address these and other shortcomings of the existing technology by providing methods and systems for monitoring a state of a kitchen and/or drive-thru of a restaurant. The present disclosure includes cameras designed to capture images of the kitchen disposed throughout a food preparation area, ordering area, order payment area and/or order delivery area (e.g., a drive-thru). The cameras are configured to acquire image-based data of the restaurant in one or more of the various areas previously described. The image data received from the cameras can be processed (e.g., in a distributed fashion) through models (e.g., machine learning models) associated with one or more of performing object detection, action recognition, tracking, volumetric estimation, and/or geometric methods.

The results from the processing models can be post processed into various useful data points such as, for example, action times (e.g., what time was chicken added to a taco), durations (e.g., how long was the chicken being breaded), locations (e.g., which preparation station), meal assembly tracking (i.e., understanding what is in what meal at a given time), and bin fill levels. These data points can be consumed by individual applications or subsystems, which may combine multiple types of data points (e.g., action times and locations). For example, an order accuracy subsystem may consume meal assembly tracking data points, while a drive-thru management subsystem may consume data regarding what is currently available in the kitchen, what is being actively prepped, the number of cars in the drive-thru line, and data about average preparation times.

The outputs based on process of the image data can be assumed to assist in one or more drive-thru operations. For example, the processed image data may be leveraged to identify vehicles in image(s), track vehicles across frames, associate pending meal orders with the vehicles, track proximity of vehicles to a meal payment zone and/or a meal delivery zones and compare the proximity to meal readiness of an associated order. Processed image frames may indicate relative locations of cameras disposed within a drive thru area and relative position of vehicles within the drive-thru area. In other examples, the processed image data may be consumed to determine a routing of vehicles to particular lanes and/or waiting bays based on order readiness, vehicles tracking and order associated in single and multi-lane scenarios, and in lanes state adjustment scenarios (e.g., merging and/or splitting of lanes and the like).

The outputs based on processing of the image data can be consumed in a number of ways to assist with live correction of order accuracy. In an exemplary embodiment, a processing system can consume outputs using an order accuracy tool that is designed to improve accuracy of orders. In some embodiments, the outputs may be used to determine inaccurate ingredients, missing order items, incorrect packaging, and incorrect numbers of items, incorrect quantity of items, and the like.

In an exemplary embodiment, the outputs may be consumed by an anticipatory prep system that is designed to provide indications regarding which ingredients should be prepared and when. For example, a state of the kitchen such as inventory analysis (e.g., to determine whether a restaurant is running low on a prepared ingredient) may be performed and compared against a current and/or predicted volume of orders coming in.

In an exemplary embodiment, a drive-thru routing tool that coordinates routing of vehicles in a drive-thru may consume the one or more outputs of one or more trained ML models. For example, the drive-thru routing tool may consume data associated with the state of items currently available in the kitchen. The system may prompt an employee to direct a car to a waiting bay or alternate route for delivery of an order.

Aspects of the present disclosure provide various technological advantages and improvements over conventional systems. As previously outlined, the kitchen management system can structure kitchen operation video into data that is consumable by a number of applications. Additionally, a drive-thru management system may structure drive-thru video into data that is consumable by a number of applications. These may be the same or different applications from those that consume the information on the kitchen operation. This data can be presented to employees to improve the efficiency of the restaurant and improve metrics such as order accuracy, preparation speed, mean drive-thru time, drive-thru wait time, and the like. For in-store interactive solutions, data can be presented to in-store employees through the existing Kitchen Display System (KDS). Targeted corrections and/or improvement may increase the efficiency of a restaurant as well as provide additional details that can be used for post-mortem analysis for larger restaurant operational decisions and changes. The system further can provide live corrections to prevent erroneous orders from being filled.

Aspects of the present disclosure provide for various technological improvements over previously identified challenges to conventional image-based management systems arising from new menu items and/or ingredients, temporary menu items and/or ingredients, promotional menu items and/or ingredients, and the like by providing for a kitchen management system that includes dynamic labeling of new ingredients, new combination and/or permutations of new and/or existing ingredients, and so forth. The system leverages comparisons between (e.g., detecting clustering of) feature characterizations of a newly detected meal preparation item and previous feature characterizations corresponding to unclassified meal preparation items. Feature characterizations may include a feature vector or other data (e.g., visual embedding data) characterizing an item captured in an image frame. In some aspects, the kitchen management system may detect new items and prompt a user (e.g., an employee) to enter a label for the newly detected item. In some aspects of the present disclosure, the kitchen management system may determine an identity (e.g., classification label) of new items from menu configuration data from a kitchen display system and/or order data from a point-of-sale system. In some aspects, the present disclosure using this contextual data and user input to dynamically new items in an orderly and timely manner.

Aspects of the present disclosure provide for various technological improvements over conventional kitchen tracking systems by leveraging an operational metrics tool (sometime referred to as a "gamification tool") that consume outputs generated from processing image data indicating a state of the kitchen. Conventional tracking of employee metrics is limited to drive-thru throughput. However, more detailed and targeted metrics can be obtained from the processed image-data in embodiments to promote efficiency and order accuracy through incentives and/or remedial action. This targeted data can allow for targeted improvement at a cheaper cost than that of a full-scale incentive and/or remedial action program. For example, granular data such as metrics associated with individual kitchen tasks, tasks tailored to a specific preparation entity or preparation station, and so on may be tracked and further analyzed (e.g., to improve throughput and/or accuracy of kitchen operations). Integration of the kitchen tracking system and the kitchen operating system allows for live data to flow between them. The integration of the kitchen tracking system with the kitchen operating system or kitchen display system (KDS) can enable the kitchen tracking system to communicate with members of the kitchen using conventionally used operational equipment.

FIG. 1 depicts a kitchen tracking system 100, in which implementations of the disclosure may operate. As shown in FIG. 1, the kitchen tracking system 100 may be associated with a kitchen 101 and/or a drive-thru 106. The kitchen 101 may include an order preparation zone 114 where food and/or drinks are prepared. For example, the order preparation zone 114 may include food preparation equipment such as ovens, mixers, ingredient containers 112, and the like. The food and/or drinks can be associated with an order that includes a collection of food and/or drinks to be prepared. The kitchen 101 may include an order assembly zone 110 where orders are to be assembled. In some embodiments, the order assembly zone 110 is designed to assemble prepared food and/or drinks that were prepared at the order preparation zone 114.

The kitchen tracking system may include one or more cameras 108A-E capable of capturing images of the kitchen 101 and/or drive-thru 106. The cameras 108A-E may be associated with camera coverage zones 120A-E within the kitchen 101 and/or drive-thru 106. The cameras 108A-E may include video cameras. For example, the cameras 108A-E may include closed-circuit televisions (CCTV) cameras. In some embodiments, one or more of the cameras may include depth sensors such as using a light detection and ranging (LIDAR) camera.

One or more of the cameras 108A-E may be disposed overhead to capture images of the kitchen from a downward looking perspective. One or more of the cameras 108A-E may capture images associated with the state of the kitchen. For example, the cameras may capture employees 124A-C performing food preparation, assembly, and/or delivery functions. In some embodiments, the cameras 108A-E may be associated with camera coverage zones 120A-E. In some embodiments, at least some of the camera coverage zones 120A-E overlap.

As shown in FIG. 1, the kitchen tracking system 100 may include a point of sale (POS) system 102. The POS system 102 may include one or more devices that carry out day-to-day restaurant operations and functionality. For example, the POS system 102 may include an order input device such as a computer and/or register used to enter data associated with upcoming orders. In some embodiments, the POS system 102 includes information associated with each of the menu items. For example, POS system 102 may include ingredient lists, preparation and assembly instructions, prices, meal delivery instructions and the like for one or more menu items.

As shown in FIG. 1, the kitchen tracking system 100 may include a kitchen display system (KDS) 104. The kitchen display system 104 may be integrated with or otherwise communicate with POS system 102. The KDS 104 can be designed to display kitchen data such as upcoming orders, status of currently/partially prepared orders, meal delivery instructions and/or other kitchen data received from the POS system 102 and/or the kitchen management component 118. In some embodiments, multiple KDS's 104 are used. For example, a KDS 104 may be assigned to a given food preparation station and may display data indicative of order statuses and/or preparation steps associated with a given food preparation station. For example, the KDS 104 may be associated with an order assembly station and/or display data indicative of what packaging should be used to assemble the order.

In some embodiments, the KDS 104 may display which order/meal items to deliver to a driver at a window of the drive-thru. As will be discussed later, a drive-thru area may include multiple lanes and order kiosks and may be processing multiple orders simultaneously. The KDS 104 may provide clarity to an employ about which order is associated with the vehicle currently in a meal delivery zone.

In some embodiments, the KDS may display an indication of a new menu item, a promotional item, a temporary item, etc. The KDS may further receive data from the kitchen management component 118 that may include an indication of one or more meal preparation items that are unrecognizable by the kitchen management system. For example, an "unclassified" item such as, for example, an item not reaching threshold criteria to be classified by a given class/label, may be deemed unrecognizable. As will be discussed further, the KDS 104 may display a notification of multiple instances of unclassified items such as a prompt or request for an employee 124A-C to input a label for unclassified items that are determined to be similar (e.g., share common features, have features determined to be within a threshold proximity of one another, etc.).

In some embodiments, a KDS 104 may be disposed proximate an order assembly zone 104. The KDS may indicate to an employee 124A-C who is assembling orders information regarding the status of currently pending orders, such as for example dynamically displaying the contents of meal packaging (e.g., bags or wrapping used to cover and/or support one or more meal preparation items). In some embodiments, the KDS 104 may indicates which package or bag to place an item into as an employee prepares to assemble an order together. As will be discussed in other embodiments, various kitchen interface devices such as a visual output device, an auditory output device, and/or a haptic output device may provide an associated signal (e.g., an auditory signal, a visual signal, and/or a haptic signal) to indicate which of the packages to put ingredients into.

As shown in FIG. 1, the kitchen tracking system 100 may include a server 116 with a kitchen management component 118. The kitchen server may receive image-based data from one or more of cameras 108A-E associated with the state of the kitchen. The kitchen management component 118 may include instructions that cause a processor to perform image-processing methodology, as described herein.

In some embodiments, the kitchen management component 118 can perform one or more order accuracy functions. The kitchen management component 118 may receive image data associated with upcoming orders and order data from the POS system 102. The kitchen management component 118 may process the image data to determine inaccuracies in the order preparation. For example, inaccuracies can include inaccurate ingredients (e.g., missing an ingredient or too much or too little of an ingredient), incorrect item (e.g., incorrect drink), inaccurate packaging (e.g., used a packaging for a menu item when a second menu item packaging should be used), incorrect number of items (e.g., five pieces of chicken when an order calls for four pieces of chicken), missing miscellaneous item (e.g., missing sauce packets, utensils, etc.), incorrect quantity of an item (e.g., too little or too much special sauce), and/or missing or incorrect sets of items in a completed order (e.g., missing or incorrect items in a combination menu item).

In some embodiments, the kitchen management component 118 may determine and/or detect inaccuracies in order preparation and alert one or more employees 124A-C through an auditory, haptic, and/or visual indicator. For example the kitchen management component 118 may send data indicative of the error to the KDS 104 to be displayed to employees 124A-C.

The employees 124A-C can check the flagged instances of order inaccuracy and/or improper use of the kitchen tracking system 100 and either rectify the inaccuracy or otherwise indicate (e.g., using an input on the KDS 104) that the determined order inaccuracy was incorrect. In the case in which there is no inaccuracy, either on the part of the system or in the preparation, no intervention is made and the meal preparation process proceeds as it would in the absence of the flagged error. In the case of a kitchen management component 118 inaccuracy, the data from the instance of detected inaccuracy may then be used to further train the kitchen management component 118 and associated data processing models. For example, the kitchen management component 118 may perform functionality that includes creating labels that can be used to retrain the system to further improve the kitchen management component's 118 accuracy. In another example, the kitchen management component 118 may generate tags (object classifications) for new food items, limited time offers, and/or combination of meal preparation items that the kitchen management component 118 has not seen before or otherwise has difficulty classifying.

In the case of an order inaccuracy being correctly determined, the KDS 104 can provide further information associated with rectifying the order accuracy. For example, the KDS 104 may display the changes needed (or course of action to be taken) in order to rectify the mistake or a list of possible alternatives from the POS associated with the menu item that was made incorrectly. In some embodiments, an intervention can be made to preempt any potential order inaccuracy. For example, an intervention can be applied before an incorrectly scooped ingredient is placed on a meal, potentially saving the ingredient and meal from being wasted and/or having to be remade.

In some embodiments, the kitchen management component 118 can perform one or more anticipatory preparation functions. For example, the kitchen management system may indicate (e.g., through the KDS 104) to the employees 124A-C which items the system anticipates should be prepared and when. The kitchen management component 118 may include one or more models, as will be discussed later, that process image data received from cameras 108A-E to determine factors indicative of future preparation times (e.g., state of the kitchen, customer ingress (e.g., vehicles 122 in drive-thru and customers in line to order), delivery drivers available or soon to be available, and other factors indicative of the states of the kitchen.

In some embodiments, as mentioned previously, one or more cameras include LIDAR cameras capable of acquiring depth data. The kitchen management component 118 can receive image-depth including depth data and recognize and distinguish between different dishes and/or meal items in a restaurant. In some embodiments, the kitchen management component 118 can determine how much product is left in a given container 112. In some embodiments, the kitchen management component can track how long a product has been in the container 112. In some embodiments, the kitchen management component 118 can track when containers are replaced and/or relocated and determine when new inventory needs to be prepared.

In some embodiments, the kitchen management component 118 can perform one or more drive-thru management functions. In one embodiment, a separate drive-thru tracking system receives image data (e.g., frames of videos) from one or more cameras that are external to the restaurant and directed at a drive-thru 106, parking lot, surrounding streets, etc. and processes the image data to determine information about vehicles in the drive-thru. The drive-thru tracking system may be a sub-component of the kitchen tracking system or a separate system that interfaces with the kitchen tracking system in embodiments.

In some embodiments, the kitchen management component 118 may provide data indicating updates to statuses of pending meal orders. As will be discussed further in other embodiments, an order, and more specifically a meal, often is prepared by carrying out a series of instructions or meal preparation actions (e.g., current meal preparation item, current meal preparation action, subsequent meal preparation item, subsequent meal preparation actions, etc.). The kitchen management component 118 may track a current state of an order and more specifically a meal. The kitchen management component 118 may process image data of the kitchen 101 to determine when a meal has advanced in the process (e.g., when an ingredient or menu item has been successfully added to an order) and may perform an "auto-bump" in the KDS, updating a status of an order in the kitchen system. For example, in conventional systems employees manually provide an input to the KDS to advance a status of an order, such as by pressing a button on a "bump bar". However, the kitchen management component 118 may determine updates to order status for one or more orders and provide automatic advances of the order status based on processing image data corresponding to the kitchen 101.

In some embodiments, the kitchen management component 118 may provide specific instructions to employees to carry out specific tasks. For example, the kitchen management component 118 may indicate (e.g., through the KDS 104) that an employee needs to correct an order by performing a set of actions. In another example, the kitchen management component 118 may indicate (e.g., through the KDS 104) to an employee one or more remaining tasks (e.g., remaining meal preparation items to add and/or actions to perform) to complete an order and/or walk an employee through preparing a specific meal.

In some embodiments, the kitchen management component 118 may indicate (e.g., through the KDS 104) a status of a customer queue area (e.g., line queue metrics such as how long a queue is, how long a wait is, a duration or rate of time the line/queue is above a target or threshold queue length, and the like).

In some embodiments, the kitchen management component 118 leverages the state of the customer queue area to determine an error thresholds. Each meal preparation error may be associated with an error severity indicator. Processing logic may further determine if the error severity indicator meets a severity threshold condition. In some embodiments, a first error may be assigned as a level one error, and a second error may be assigned as a level two error. For example, a first error level may be associated with missing one or more auxiliary meal preparation items (e.g., napkins). A second error level may be associated with missing one or more components of a combination order (e.g., missing hamburger, fries, and/or a beverage of a meal combination). The order severity threshold may be modified by other received inputs and/or conditions. Processing logic may alter or use different severity threshold conditions based on the state of the meal preparation area. For example, as will be discussed further in later embodiments, processing logic may determine an order density of upcoming meal orders.

As shown in FIG. 1, one or more cameras (e.g., camera 108C) may include a camera coverage zone 120C associated with the drive-thru 106. The kitchen management component 118 may combine data indicative of the state of the kitchen 101, as previously described, with data indicative of the drive-thru (e.g., vehicle 122 ingress, current wait times, etc.). The data indicative of a state of the drive-thru may be received by the kitchen management component 118 from a drive-thru tracking system in embodiments. The kitchen management component 118 may determine how to route vehicles (e.g., to most efficiently service each order). One or more alternative drive-thru routes may be used, such as a waiting bay for vehicles associated with orders that are determined to be filled after a wait time that is above a threshold wait time or an alternate lane for multi-lane drive-thrus. For example, the kitchen management component may determine that a first meal item (e.g., French fries) are low in stock and will need extra time to prepare. This increased wait time may be flagged by the kitchen management component (e.g., through the KDS 104) and an employee may instruct a vehicle to a waiting bay which may allow a queue of vehicles to continue while the vehicle is in the waiting bay until the associated order is filled. The vehicle may be identified, associated with an order (e.g., the order that includes the first meal item), and tracked by the drive-thru tracking system as discussed in greater detail below. Some restaurants that use a single food delivery window for the drive-thru may make use of a waiting bay and/or parking spot designed as an alternate delivery method for longer orders.

In some embodiments, the kitchen management component 118 can perform one or more operational metric functions. The kitchen management component 118 may process image data from cameras 104A-C to evaluate and determine metrics associated with the state of the kitchen. For example, the kitchen management component 118 can determine preparation times for various meal items, preparation times for a given preparation station, order fill times, ingredient preparation times, rate of errors, degree of errors, and so on. The image data can be processed to determine more granular metrics than are conventionally available that can be used to identify specific areas of improvement and be used as a form of gamification and/or incentive system. For example, adding a specific ingredient to a meal, duration of time to prepare a specific ingredient, duration of time to move a preparation item from one station to another, and the like. The system can additionally be used to determine detailed information for post mortem assessment of a restaurant's efficiency, identifying particular steps, operations, menu items, ingredients, etc. that are generally accurate and/or quick as well as particular steps, operations, menu items, ingredients, etc. that are often inaccurate and/or slow. The system can evaluate various granular efficiencies for a myriad of kitchen tasks and/or responsibilities (e.g., time to prepare a meal item, time to take an order, time to deliver orders, accuracy of order preparation, time since last order error/mistake, amount of waste attributed to an employee, task, menu item, etc., and so on). The kitchen management component 118 may use a scoring system that evaluates individual employees, shifts, menu items, ingredients, ingredient preparation, and the like. Further details regarding operation metrics are discussed in association with operational metrics tool 226 of FIG. 2, operational metrics logic 356 of FIG. 3, and exemplary method 1000 of FIG. 10.

In some embodiments, the kitchen management component 118 can perform dynamic classification of items captured by cameras 108A-C within the kitchen 101. For example, as will be discussed further in other embodiments, the kitchen management component 118 may leverage a feature comparison approach such as a feature clustering analysis (e.g., determining a set of items that are deemed to have common features such as color, size, texture and/or non-physical features such as identified patterns, trends, statistical properties of raw and/or processed image data) to detect that an unknown item (e.g., an item without a classification) has been detected in the kitchen previously. The feature characterization corresponding to an item may be stored and/or processed using a data structure representative of the various identified feature such as, for example, a feature vector. In some embodiments, the kitchen management component 118 may receive POS data from POS 102. The POS data may include order data indicating one or more pending meal order and/or historical meal orders. The POS data may identify objects within the kitchen and provide labels to various ingredients, meal preparation item, and/or prepared meals. The kitchen management component 118 may leverage POS data to identify unknown (e.g., unclassified) objects detected within the kitchen 101

In some embodiments, the kitchen management component 118 may receive menu configuration data (e.g., received from KDS 104). The menu configuration data may indicate new items, combination of item, preparation instruction, item customizations, etc. associated with a restaurant's menu. The kitchen management component 118 may leverage the menu configuration data to identify (e.g., determine an object classification) for one or more newly detected meal preparation items located within the kitchen 101. FIGS. 8-11 provide various process flows for detecting new menu items, receiving contextual data (POS data and/or KDS data) associated with the new menu items, and generating new objects classifications for the new menu items.

As noted in some embodiments, the outputs generated based on processing the image data by the kitchen management component 118 may be consumed and/or utilized in a live environment such as to correct orders and inaccuracies as they arise. In other embodiments, the kitchen management component 118 may process images to generate data to be consumed post-mortem or after the system has run for a period of time. For example, analytics data on drive-thru queue time may be evaluated. In another example, analytics data on average pacing of employees per shift for specific actions (e.g., pacing chicken preparation) may be evaluated.

The various analytics data may be used as a method for determining rewards such as identifying employees or combinations of employees that exceed target performance goals (e.g., speed, accuracy, efficiency, etc.). The analytics data may additionally or alternatively be used to determine further training to deliver to employees (e.g., to correct technique for one or more menu preparation tasks and/or menu items that have a high error rate and/or a slow completion rate).

In some embodiments, the data metrics may be used by a scheduling system to determine shifter (e.g., combinations of employees). For example, the scheduling system may leverage performance metrics (e.g., speed and accuracy of employees) with demand metrics (e.g., state of customer queue area at various time throughout a day and/or week) to identify an employee or a combination of employees that fit the needs of the restaurant at any given time. For example, employees with efficient metrics (e.g., speed scores above target speed scores, accuracy score above target accuracy score, etc.) may be selected when the restaurant is likely going to be busy (e.g., based on the demand metrics such as queue length, ingress and/or egress of customers, etc.). Combinations of efficient employee may be partnered or otherwise grouped with low efficiency employees such that aggregate metrics of a shift attach target metrics (e.g., target speed metrics and/or target accuracy metrics).

In another example, data associated with the dynamic labeling of item within the meal preparation area may be indicated (e.g., flagging newly labeled items, unclassified, patterns and/or trends of new items, limited time offers, promotional items, etc.) Such data can be used in time-sliceable aggregate analytics (e.g., how long did employees spend prepping dough on Monday between 9 am and 11 am). Pacing and accuracy data may be used to improve throughput, employee accountability, and operational efficiency.

Figure 2:
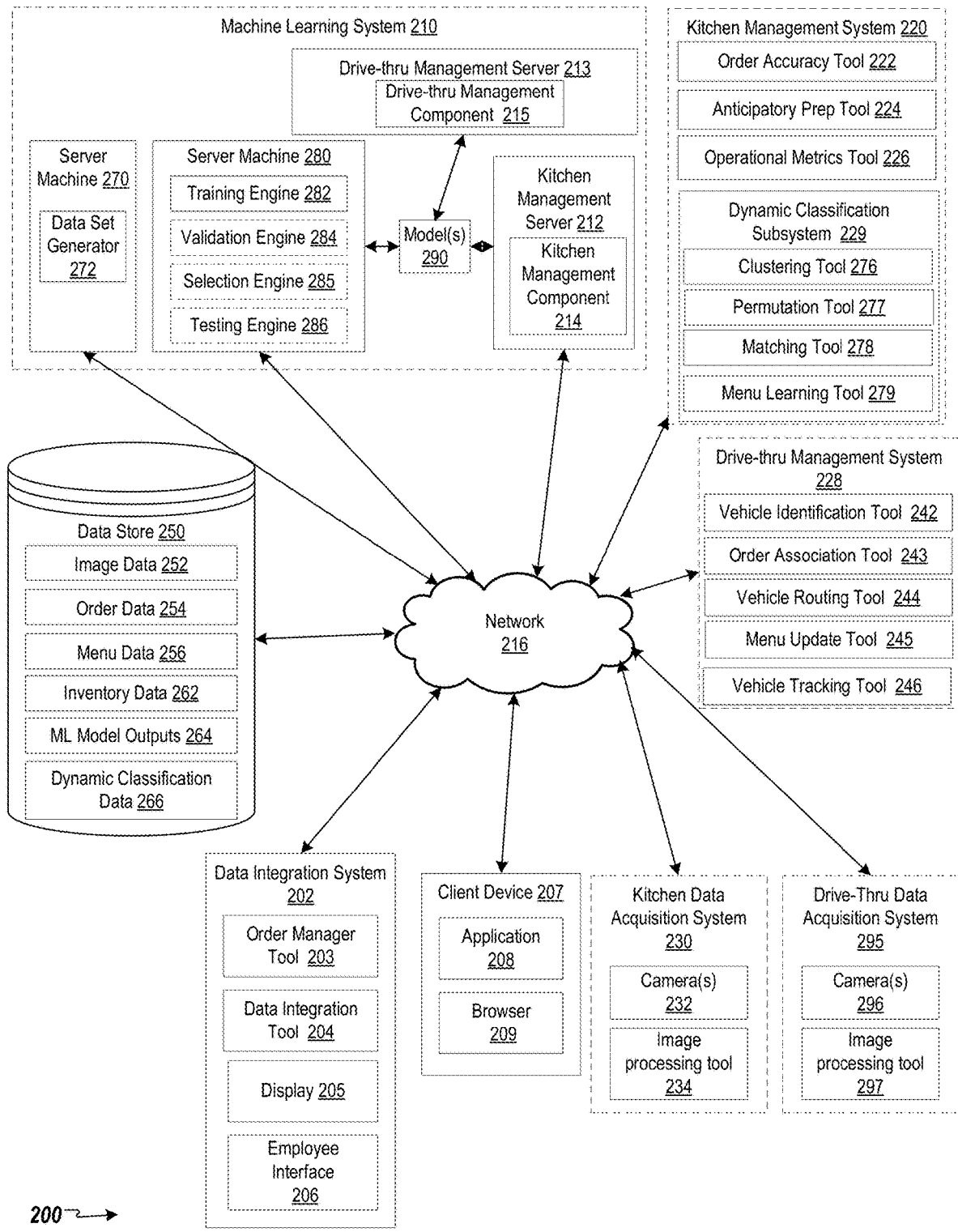
FIG. 2 is a block diagram illustrating an exemplary data acquisition system architecture in which implementations of the disclosure may operate.

FIG. 2 is a block diagram illustrating an exemplary system architecture of system 200, according to certain embodiments. The system 200 includes a data integration system 202, a client device 207, a kitchen management system 220, a kitchen data acquisition system 230, a kitchen management server 212, a drive-thru management server 213, a drive-thru data acquisition system 295, a drive-thru management system 228, and a data store 250. The kitchen management server 212 and/or drive-thru management server 213 may be part of a machine learning system 210 (or may be parts of separate machine learning systems). Kitchen management server 212 may correspond to server 116 of FIG. 1 in embodiments. The machine learning system 210 may further include server machines 270 and 280.

The kitchen data acquisition system 230 may include one or more data acquisition devices, such as camera(s) 232. The one or more camera(s) 232 may include closed-circuit television (CCTV) cameras, light detect and ranging (LI-DAR) enabled cameras, and/or other image acquisition devices. The cameras may be disposed through a kitchen preparation area, a customer ordering area, and/or an order delivery area (e.g., a drive-thru). The camera may provide a continuous stream of images associated with food preparation and delivery. The cameras may be disposed in an orientation and/or configuration to overlap image acquisition areas. For example, a first image capture area of a first camera may also be partially captured by a second camera. The data may be spliced and/or further processed and analyzed together, as will be discussed in other embodiments. The image-processing tool 234 may include processing logic that receives image based data acquired by the camera(s) 232 and performs a feature extraction to identify features (e.g., inventory data, recipe data, current order performance, visual features of objects, etc.) associated with the state of the kitchen. As will be discussed in more detail below, the image-processing tool 234 may employ one or more machine learning models (e.g., using machine learning system 210) to perform the feature extraction.

The drive thru data acquisition system 295 may include one or more data acquisition devices, such as camera(s) 296. The one or more camera(s) 232 may include closed-circuit television (CCTV) cameras, light detect and ranging (LI-DAR) enabled cameras, and/or other image acquisition devices. The cameras may be disposed within various portions of a drive-thru such as an order placement area, an order payment area, and/or meal delivery area. The camera may provide a continuous stream of images associated with states of the various drive-thru area (e.g., location of vehicles, quantity of vehicles, vehicles movement within the drive-thru area, etc.). The cameras may be disposed in an orientation and/or configuration to overlap image acquisition areas. The data integration system 202 includes one or more of a server, client devices, and/or data stores housing operational data and/or processing instructions associated with a restaurant's operations (e.g., a restaurant's operations system (e.g., a point of sale (POS) system 102 of FIG. 1) server. The data integration system 202 may include an order manager tool 203 that manages a menu and collection of upcoming orders. In some embodiments, the order manager tool 203 maintains data associated with upcoming orders (e.g., a list of upcoming orders). The order manager tool 203 may also include menu recipe data. For example, each menu item may be broken down to individual menu items (e.g., combinations of items such as an entrée and a beverage) and recipe items (e.g., a hamburger may include buns, meat, vegetables, condiments, etc.). The order manager tool 203 may further include additional data associated with the preparation, cooking, and/or assembly of menu items (e.g., cooking duration, quantity of a first ingredient, packaging instructions, etc.)

The data integration system 202 may include a data integration tool 204 that includes hardware and/or processing logic associated with connecting and communicating with external devices. For example, the data integration tool 204 may include an application programming interface (API) configured to connect with the kitchen management system 220 and transmit data (e.g., data associated with the order manager tool 203) between the systems (e.g., using network 216).

The data integration tool 204 may include a display 205 (e.g., a kitchen display system (KDS)). Display 205 may communicate and/or otherwise work with order manager tool 203 to display upcoming orders and associated menu items and recipes for the upcoming orders. In some embodiments, multiple displays 205 are used. For example, a display 205 may be associated with a particular station (e.g., cooking station, assembly station, etc.) and order steps associated with that particular station are displayed. In some embodiments, the data integration system 202 further includes an employee interface 206. The employee interface may include data input devices (e.g., buttons, keyboards, touch screens) capable of applying an input to the data integration system 204. For example, an employee at a particular station may press a button when a portion of a recipe associated with that particular station is completed for an associated order. The interface 206 may communicate or otherwise work with the display 205 to advance orders as they are completed. In some embodiments, additional data may be received from employees through interface 206 such as deleting orders, flagging orders, completing orders, modifying orders, inputting new object classifications (e.g., labels for unclassified meal preparation items) for new menu items such as a limited time offers, and so on.

In some embodiments, the display 205 may present a current status of a pending meal order. For example, a meal order may include a set of meal items. During preparation of the meal order one or more of the meal items of the set of meal items may be completed before other items and a status indicative of partial completion of the set may be displayed in association with the completed items (e.g., by affirmatively indicating one or more tasks as completed) and/or the incomplete item (e.g., by providing an indication of the tasks needed to be performed to complete a pending meal order).

In some embodiments, the display 205 may present the orders in a priority order. The order may be based on a temporal association between the orders (e.g., oldest order is displayed with the highest priority (i.e., first on the list)) and/or based on a position in one or more drive-thru line of vehicles associated with orders. In some embodiments, the employee interface may receive input that alters a current display state of the pending meal orders on the display 205. The employee interface 206 may receive input (e.g., from an employee) associated with an order. For example, the employee interface may receive an input that a first preparation stage of a meal item has been completed and can update a status of a pending meal order based on the received input by the employee interface 206. Alternatively, in embodiments processing logic automatically determines when a preparation stage of a meal item is completed. The employee interface 206 may receive input associated with altering a priority of one or more pending meal orders presented on the display 205 of the data integration system 202. For example, a sequence of pending meal orders may be adjusted based on input received by the employee interface 206. Alternatively, in embodiments processing logic automatically adjusts a priority of one or more pending meal orders presented on the display 205. The display may update a state and/or manner of display based on an input received by the employee interface 206 in some embodiments. For example, the display 205 may present one or more tasks remaining to complete an order and can update the list of remaining tasks based on the input received by the employee interface 206 and/or based on an output from a trained machine learning model that indicates that one or more tasks have been completed. In some embodiments, as is discussed further in other embodiments, the ordering of items may also be performed with improved efficiency and accuracy by leveraging pacing data.

In some embodiments, the display 205 may indicate a live update of contents of a meal package or a bag enclosing one or more meal preparation items. For example, a bag may enclose one or more meal preparation items and as items are added to (and in some cases removed from) the bag the contents of the bag may be updated on the screen. Some meal items have similar appearance such as various packaging used to wrap meal items, and the ability to see the contents of the bag on the display 205 may allow for improved efficiency and accuracy in preparing and/or delivering meals to customers. In some embodiments, the display 205 may indicate what is still needed to be input into a bag or container to complete an order. For example, the display 205 may indicate that a first item is in the bag or container by showing the item in a positive position on the display 205. For example, the first item may be shown in green, with a checkmark next the item name, faded out, and the like to show that the first item is accounted for in the contents of a bag. On the other hand, items that are not currently in a bag but are still needed to complete the order may be displayed in a prominent position. For example, a second item that is needed in a first bag or container may be presented on the display 205 with a red color, highlighted, or otherwise indicated that the second item needs to be added to the bag. For example, first visualizations may be used to indicate menu items for an order not yet added to the packaging or container and a second visualization may be used to indicate menu items for the order that have already been added to the packaging or container.

In some embodiments, the display 205 includes an overlay or provides visual, auditory, and/or haptic cues for indicating an action to be performed next in a meal preparation process. For example, an LED, speaker, haptic device (e.g., vibration device such as a haptic touch screen), etc. may indicate a subsequent meal preparation item or a meal preparation action associated with a next step in preparing a corresponding meal item. In some embodiments, the visual, auditory, and/or haptic cues may be provided after a delay in determining a new action is detected. For example, the display 205 may act as a training mechanism that displays cues indicating the next action to perform after the employee has had an opportunity to make an attempt. In some embodiments, the same or analogous cues may indicate whether an action be performed (e.g., a meal item being used in a corresponding action) is correct. For example, a negative cue such as a red light, a buzzer, or rapid haptic vibration, and the like may indicate a negative response and that a meal preparation error has occurred and/or is currently occurring. In some embodiments, analogous cues may be used to indicate an action is correctly performed. For example, a green light, a positive auditory cue, or light haptic vibrations may be used to indicate a correct action has been performed.

In some embodiments, the display 205 may display an overlay or other visual indicators on a screen contemporaneously with a live video feed of the meal preparation area. For example, a visual indicator such as, for example an arrow, a bounding box, a color filter, and the like may be used to identify a meal preparation item and/or a location within the kitchen associated with a meal preparation action.

In some embodiments, the display 205 may provide specific instructions to employees to carry out specific tasks. For example, the display 205 may indicate that an employee needs to correct an order by performing a set of actions. In another example, the display 205 may indicate to an employee one or more remaining tasks to complete an order and/or walk an employee through preparing a specific meal. In some embodiments, the display 205 indicates a status of a customer queue area (e.g., line queue metrics such as how long queue line is, how long the wait for customers, a duration or rate of time the line is above a target or threshold line length, and the like).

In some embodiments, the display 205 may present a live feed of operational metrics within the kitchen. As will be discussed further in other embodiments, various operational metrics may be acquired about various tasks, operations, inventories, employee performance, customer queue analytics, among other things. Such operational metrics may be identified from the image frames acquired via cameras 232 in the kitchen and cameras 296 disposed in the drive thru. For example, analytics data on drive-thru queue time may be evaluated. In another example, analytics data on average pacing of employees per shift for specific actions (e.g., pacing chicken preparation) may be evaluated. The various analytics data may be used as a method for determining rewards such as identifying employees or combinations of employees that exceed target performance goals (e.g., speed, accuracy, efficiency, etc.). The various analytics may be displayed live on display 205. In some embodiments, the various metrics may be displayed on a client device that is associated with an employee such, as for example, accessing a graphical user interface (GUI) associated with a user account (e.g., an employee account). In some embodiments, the display 205 may provide a rank or score associated with a current state of the kitchen. For example, a first employee may be listed with a score and/or ranking relative to other employees. In another example, a current store may be given a score and/or ranking relative to other stores. In another example, a specific workstation, combination of employees, meal preparation task, meal item, etc. may be scored, analogously ranked, and displayed on display 205. In another example, a first shift may be listed with a score and/or ranking relative to other shifts at a restaurant. In some embodiments, the various rewards may be associated with breaking records and the system may provide positive feedback such as for example, congratulatory sounds, pleasing music, flashing lights, and the like. For example the system may recognize when a record is broke, when a streak is extended (e.g., preparing a number of tacos in a row in under a target amount of time).

The client device 207 may be or include any personal computers (PCs), laptops, mobile phones, tablet computers, netbook computers, network connected televisions ("smart TV"), network-connected media players (e.g., Blue-ray player), a set-top-box, over-the-top (OOT) streaming devices, operator boxes, etc. The client device 207 may include a browser 209, an application 208, and/or other tools as described and performed by other system of the system architecture 200. In some embodiments, the client device 207 may be capable of accessing the data integration system 202, the data acquisition system 230, data drive-thru data acquisition system the kitchen management system 220, the drive-thru management system 228, machine learning system 210, and data store 250 and communicating (e.g., transmitting and/or receiving) data associated with the state of the kitchen. For example, data from kitchen management system may be transmitted to client device 207 for displaying, editing, and/or further processing. Client device 207 may include an operating system that allows users to one or more of generate, view, or edit data (e.g., data stored in data store 250).

In some embodiments, as will be discussed later, the client device 207 may employ an application 208 and/or a browser 209 capable of processing transactions associated with one or more pending meal orders. For example, an order manager tool 203 may receive orders and process payments associated with pending meal orders (e.g., orders associated with vehicles in a drive-thru area).

The kitchen management system 220 may include an order accuracy tool 222, an anticipatory prep tool 224, an operational metrics tool 226, and/or dynamic classification subsystem 229. The order accuracy tool 222 may receive output data generated based on processing of image data such as detected objects and order data, such as data managed by order manager tool 203 and determine inaccuracies between what is being prepared in the kitchen (e.g., detected in the images) and what steps are to be performed (e.g., following recipes and predetermined order preparation instructions). In some embodiments, the order accuracy tool may include flagging or otherwise indicating an error to an employee. For example, the order accuracy tool 222 may communicate with the display 205 of the data integration system 202 to display a visual indication of the error. In another example, the data integration system may include an auditory device (e.g., a speaker) that may indicate the error to an employee through an auditory alert.

In some embodiments, the order accuracy tool 222 may include a tracking tool that uses data from multiple processed images to detect and follow an order, as it is prepared. For example, the tracking tool may follow and order and store the last action performed on an order to ensure an order is prepared properly. In some embodiments, the order accuracy tool 222 determines compound actions based on the image data 252.

The anticipatory prep tool 224 may receive ML model outputs 264 associated with objects detected (ingredients, menu items, packaging, etc.). The detected objects may be associated with a current inventory of the kitchen. For example, the image data 252 may be processed to determine how much of a given ingredient is available. The kitchen data may be monitored over a period of time and a model may be generated to predict when more of a given ingredient needs to be prepared. For example, the rate of consumption of a first ingredient (e.g., grilled chicken) will be monitored over a series of outputs generated based on processing image data. The anticipatory prep tool 224 may include a model that predicts, based on the image data 252 and/or ML model outputs 264, future preparation times and quantities. For example, to ensure a restaurant has a given ingredient available, the anticipatory prep tool 224 may indicate to an employee a future prep time and/or quantity of the given ingredient.

The operational metrics tool 226 (sometimes referred to as gamification tool) includes methodology and subsystems that provide targeted, specific metrics associated with a restaurant's food preparation and delivery services. In some embodiments, image data is processed to determine preparation times of given employees, menu items, employee shifts, restaurants, and/or preparations steps. The operational metrics tool 226 may determine preparation and/or delivery times of individual employees, shifts, stations, food preparation tasks, ingredients and/or menu items. For example, conventional systems may rely on sales data or start to end inventory changes to determine performance. However, the operational metrics tool 226 may provide for more granular metric measurements such as those metrics previously described. The operational tool 226 may then provide incentives to increase one or more metrics for individuals, shifts, restaurants, and so on. The incentives may be tailored to specific metrics that may have values lagging expectations and/or target values for those metrics. Additionally, the operational metrics tool 226 may be used to identify further training to be provided to employees (e.g., to retrain employees on how to perform particular meal preparation tasks that are lagging target thresholds).

The operational metrics tool 226 may process image data from cameras 104A-C to evaluate and determine metrics associated with the state of the kitchen. For example, the operational metrics tool 226 can determine preparation times for various meal items, preparation times for a given preparation station, order fill times, ingredient preparation times, and so on. The image data can be processed to determine more granular metrics than are conventionally available that can be used as a form of operational metrics and/or incentive system. For example, overserving/underserving a meal item, time between various added ingredients, time taken for individual actions performed within the meal preparation area, and the like. The system can evaluate various granular efficiencies for a myriad of kitchen tasks and/or responsibilities (e.g., time to prepare a meal item, time to take an order, time to deliver orders, accuracy of order preparation, time since last order error/mistake, amount of waste attributed to an employee, and so on). The operational metrics tool 226 may use a scoring system that evaluates individual employees, shifts, menu items, ingredient preparation, and the like.

The dynamic classification subsystem 229 includes a clustering tool 276, a permutation tool 277, a matching tool 278, and a menu learning tool 279. The dynamic classification subsystem 229 and the various enumerated tools is designed to identify one or more unclassified or unknown object founds with a meal preparation area such as a new meal item, a promotional item, a limited time offer, a new combination of ingredients, and the like. The dynamic classification subsystem 229 may receive indications of unknown objects within a meal preparation area and determine using the various tools (e.g., clustering tool 276, permutation tool 277, matching tool 278, and menu learning tool 279) For example, a restaurant may introduce new recipes, menu items, ingredients, etc. Conventional machine learning systems often require extensive retraining in order to perform novel object detection. However, the dynamic classification subsystem 229 provides various process flows carried out by clustering tool 276, permutation tool 277, matching tool 278, and menu learning logic 279 to dynamically detect unclassified items and generate new class label to classify the newly detected items. The functionality and process flow of each of the dynamic classification tools is discussed at length in later portion of the application, however, a brief introduction to each tool is presented here.

The clustering tool 276 leverages a comparison between a feature characterization of an item currently perceived to be within the meal preparation area and previous feature characterizations of items that were deemed unclassified (e.g., did not meet classification conditions to be classified). This comparison identifies a clustering of the current meal preparation item to previous meal preparation items that have been perceived to be similar (e.g., proximity or clustering of associated feature characterizations). The clustering tool 276 may leverage clustering data 276 to identify (e.g., class label) the current meal preparation item. The contextual data may include input received from a user (e.g., an employee), POS data (e.g., data indicating details of one or more pending meal orders, KDS data (e.g., menu configuration data indicating details associated with one or more menu items (including promotional, temporary, or otherwise new) that may include ingredients, preparations steps, item customizations, and the like for items on the menu. Further details regarding the clustering tool 276 are described in association with FIG. 8.

The permutation tool 277 uses known (e.g., class labels) ingredients to detect and/or identify unclassified objects that are a combination of and/or permutations of known ingredients (and in some embodiments, one or more unknown ingredients). The permutation tool 277 leverages known ingredients to infer labels of a combination of meal preparation items (e.g., "a combo"). For example, a new combo may be introduced on the menu that may include a set of the ingredients. The set of ingredient may include all known ingredients, some known and some unknown ingredients, and all unknown ingredients. The permutation logic 315 may infer combination of ingredients that may have been permuted with some or all of the ingredients remaining in the new permuted item. For example, a new combo may include an "upside down" version of a meal item, another new combo may include an "inside out", another combo may include nearly all the same ingredients but may be repackaged in new packaging as a promotional item. The permutation tool 277 leverages knowns object labels of ingredients and determines potentially new combination labels (e.g., as defined in the KDS or POS). Further details regarding the permutation tool 277 are described in association with FIG. 9.

Matching tool 278 matches one or more unknown (e.g., unclassified) objects detected within a meal preparation area and matches them with one or more new or otherwise unknown (e.g., unclassified) menu items that the kitchen tracking system does not have visual data on. The matching tool 278 may track the process of adding new items to a menu configuration. For example, the matching tool 278 may leverage a process of elimination to match newly detected items within the kitchen to newly added entries in the POS and KDS. The matching tool 278 may determine that a new item is found within the kitchen and compare that new item with a current state of the POS and/or KDS. For example the POS may indicate one or more pending meal orders. The pending meal order may have only one item in the order data that is new or unknown. By process of elimination the matching logic 278 determines the newly detected meal item matches with the only new label provided by the POS. In another example, the KDS system may indicate to the kitchen management system that there is one new item to be detected. Once a new item is detected with the kitchen, the elimination logic may match that new item with the new item flagged by the KDS system. Further details regarding the matching tool 278 are described in association with FIG. 10.

Menu learning tool 279 uses detailed KDS and/or POS data to acquire and associate visual embedding (e.g., feature characterizations or feature vectors) to meal preparation items associated with a kitchen menu. The menu learning tool 279 relies upon detailed KDS data that provides the kitchen management system instructions to follow in capturing corresponding visual cues as a meal item is prepared. For example, the menu learning tool 279 may receive detailed instruction regarding how a meal item is prepared (e.g., ingredients, quantities of ingredients, meal preparation actions, and so forth). The menu learning tool 279 uses the detailed instructions from the KDS to track individual processing steps including identifying ingredients indicated by the KDS data, quantities of ingredients, and so forth. The menu learning tool 279 leverages thorough KDS instructions to capture visual image data of item that may be unclassified or unknown (e.g., new meal preparation items, promotional meal preparation items, temporary meal preparation items. The KDS instructions allow the menu learning logic 279 to build up a database (e.g., dynamic classification data 266) of visual data to train the object detection model using the new labels provided by the KDS instructions. Further details regarding the menu learning tool 279 are described in association with FIG. 11.

The drive-thru management system 228 may include a vehicle identification tool 242, an order association tool 243, a vehicle routing tool 244, a menu update tool 245, and a vehicle tracking tool 246. The drive-thru management system 228 may receive outputs generated based on processing image data from cameras 296, the outputs associated with a state of the drive-thru of a restaurant. Drive-thru management system 228 may additionally receive outputs associated with a state of the kitchen. For example, the vehicle identification tool 242, may identify vehicles by determining a visual indicator (e.g., license plate, make/model of the vehicle). The vehicle identification tool 142 may include a database of vehicles indicating an order history associated with each identified vehicle. The order association tool 234 may associate a vehicle disposed within the drive-thru area with a pending meal order. For example, the order association tool 243 may determine that a vehicle is associated with a pending meal order based on proximity of the vehicle to an order placement kiosk when the pending meal order is submitted to the POS system.

The vehicle routing tool 244 may direct vehicles through a drive-thru area. For example, the drive-thru management system 228 may receive data indicative of current availability of items in the kitchen (e.g., inventory analysis). The system may track the order fill rate, monitor wait time of the vehicles in the drive-thru, and make a determination that a given vehicle associated with an order should be rerouted to an alternative delivery procedure. The vehicle routing tool 244 may direct a vehicle to a waiting bay if the drive-thru management system 228 determines a wait time for an order associated with the vehicle is above a threshold value. In some embodiments, the threshold value may be associated with line length, time of day, state of the kitchen (e.g., inventory data, employee status, etc.).

The menu update tool 245 may receive input from other tool of the drive-thru management system 228. The menu update tool 245 may determine updates to a menu display based on determinations (e.g., vehicle identifications, order associations, order delivery times, etc.). For example, the menu update tool 245 may make a determination of whether to offer a promotion or attempt an up sale procedure based on the state of the drive-thru and/or past transactions with an identified vehicle and/or statistical data about a type of identified vehicle and instruct a display to update a menu display based on the determination (e.g., display the upsell in a prominent position a menu display).

The vehicle tracking tool 246 may receive image data and track vehicles over multiple image frames. For example, vehicles, may be tracked as they navigate through a drive-thru area (e.g., an order placement zone, order payment zone, meal delivery zone, etc.) In some embodiments, the vehicle tracking tool 246 tracks vehicles through drive-thru lane changes such as lane merging and lane splitting (e.g., to effectuate proper order payment and/or meal delivery by tracking the order and/or locations of multiple vehicles in the drive-thru area.

In some embodiments, outputs from the order accuracy tool 222, the anticipatory prep tool 224, operational metrics tool 226, clustering tool 276, permutation tool 277, matching tool 278, menu learning tool 279, vehicle identification tool 242, order association tool 243, vehicles routing tool 244, menu update tool 245, and/or vehicle tracking tool 246 may be consumed by the data integration system 204 (e.g., such as to provide live order accuracy data, anticipatory prep data, operational metrics data, drive-thru management data, limited time data as described herein, vehicle identification, vehicle order association data, vehicle routing data, menu update data, and/or vehicle tracking data). In some embodiments, outputs from the order accuracy tool 222 anticipatory prep tool 224, operational metrics tool 226, drive-thru management tool 228, and/or limited time offer tool 229 may be consumed by a client device 207 (e.g., using application 208 and/or browser 209).

The data integration system 202, client device 207, data acquisition system 230, kitchen management system 220, drive-thru management system 228, machine learning system 210, data store 250, server machine 270, and server machine 280 may be coupled to each other via a network 216 for monitoring the state of a kitchen and/or drive-thru. In some embodiments, the kitchen management system 220 and the drive-thru management system 228 are combined into a single system. In some embodiments, network 216 is a public network that provides client device 207 with access to the kitchen management server 212, data store 250, and other publically available computing devices. In some embodiments, network 216 is a private network that provides data integration system 202 access to the kitchen management system 220, data acquisition system 230, data store 250, and other privately available computing devices and that provides client device 207 access to the kitchen management server 212, data store 250, and other privately available computing devices. Network 216 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The data integration system 202, kitchen management server 212, data acquisition system 230, kitchen management system 220, drive-thru management system 228, server machine 270, and server machine 280 may each include one or more computing devices such as a rackmount server, a router computer, a server computer, a PC, a mainframe computer, a laptop computer, a tablet computer, a desktop computer, graphics processing unit (GPU), accelerator application-specific integrated circuit (ASIC) (e.g., tensor processing unit (TPU)), etc. In some embodiments, one or more of these systems and/or machines is combined into a single system/machine (e.g., that may run on a single server machine).

The kitchen management server 212 may include a kitchen management component 214. In some embodiments, the kitchen management component 214 may retrieve image data 252 from the data store and generate outputs 264 (e.g., action data, depth data, object data, etc.) In some embodiments, the kitchen management component 214 may use one or more trained machine learning models 290 to receive image data from one or more cameras and to determine the output for the image data (e.g., images acquired through camera(s) 232). The one or more trained machine learning models 290 may be trained using image data 252 to learn object detection, action recognition, object tracking, volumetric estimation, and/or geometric identification associated with image data of images of a kitchen. Based on the training, one or more model(s) 290 are trained to receive input images and to generate an output including detected objects, identified actions, tracking data, and so on. In some embodiments, the kitchen management component 214 makes determinations by providing image data (e.g., current image data) into the trained machine learning model 290, obtaining the outputs 264 from the trained machine learning model 290, and processing and/or using the output 264.

The drive-thru management server 213 may include a drive-thru management component 215. In some embodiments, the drive-thru management component 215 may retrieve image data 252 from the data store and generate outputs 264 (e.g., action data, depth data, object data, vehicle identification data, vehicle order association data, vehicle routing data, menu update data, vehicle tracking data, etc.) In some embodiments, the drive-thru management component 215 may use one or more trained machine learning models 290 to receive image data from one or more cameras and to determine the output for the image data (e.g., images acquired through camera(s) 296). The one or more trained machine learning models 290 may be trained using image data 252 to learn vehicle identification, vehicle order association, vehicle routing, menu update determination, and/or vehicle tracking associated with image data of images of a drive-thru area. Based on the training, one or more model(s) 290 are trained to receive input images and to generate an output including detected objects (e.g., vehicles), vehicle meal order association data, vehicle routing data, menu update data, vehicle tracking data, and so on. In some embodiments, the drive-thru component 215 makes determinations by providing image data (e.g., current image data) into the trained machine learning model 290, obtaining the outputs 264 from the trained machine learning model 290, and processing and/or using the output 264.

Data store 250 may be memory (e.g., random access memory), a drive (e.g., a hard drive, a flash drive), a database system, or another type of component or device capable of storing data. Data store 250 may include multiple storage components (e.g., multiple drives or multiple databases) that may span multiple computing devices (e.g., multiple server computers). The data store 250 may store image data 252, order data 254, menu data 256, inventory data 262, ML model outputs 264 (e.g., action data, depth data, and object data), and dynamic classification data (e.g., data indicating unclassified objects, new meal items, limited time promotional items, additions and/or alterations to a menu configuration of the KDS, and/or identified KOS and/or POS items lacking a corresponding feature characterization or class label). The image data 252, order data 254, menu data 256, inventory data 262, ML model outputs 264 may include historical data (e.g., for training the machine learning model 290).

Image data 252 may include images taken by the kitchen data acquisition system 230 (e.g. using camera(s) 232) and/or the drive-thru data acquisition system 230 (e.g., using cameras 296). Order data 254 may include data associated with orders previously filled and/or currently needing to be filled. Menu data 256 may include a listing of menu items, associated recipes, and/or preparation instructions for each menu item. Inventory data 262 may be data indicative of a past and/or current state of inventory of operational supplies (e.g., ingredients, tools and machines, food packaging, etc.) ML model outputs 264 may include object data, pacing data, action data, tracking data, instance segmentation data, depth data, and/or pose data, among other things. Action data may include past and/or current actions being performed by employees in the kitchen (e.g., scooping a first ingredient, cooking a second ingredient, packaging a first menu item, etc.) Instance segmentation data may include divisions between objects and/or zones. For example, instance segmentation may include data indicative of divisions of ingredient containers (e.g., ingredient containers 112). In some embodiments, instance segmentation data may be indicative of associating objects together. For example, instance segmentation data may make an association of a detected employee hand to the rest of their body and can later be used to determine what order an employee is currently filling (e.g., what actions is an employee performing). Depth data may include data associated with a depth of an ingredient in a bin. For example, depth data may be used to compute a volumetric estimation of how much sauce is left in a container based on known dimensions of the container (e.g., depth, width, length, etc.) Object data may include previously and/or currently detected objects in the kitchen. For example, object data may include a hamburger, packaging, a cooking tool, an employee, and the like. Pose data may include data indicative of a pose of an employee (e.g., employees 124A-C). Pose data may include poses and/or gestures of people and/or their body parts, such as hands in specific positions associated with certain actions. Pose data may include an indication of the location and current position of a hand of the employee. For example, pose data may be associated with an action being performed (e.g., an employee scooping a first ingredient). Tracking data may include an indication of where an object is located. The tracking data can be indicative of the last actions performed in association with an object (e.g., cheese placed on a burger, a side scooped into a meal container, meal items assembled into a combination meal, etc.). Tracking data may also be indicative of a current state of a meal or component of a meal (e.g., a burger is cooking, a portion of a combination meal is assembled, a meal is awaiting delivery to customer, etc.). Tracking data may also indicative a current state of a drive-thru area (e.g., vehicle location, vehicle order, and/or results of a lane merge, lane split, and/or lane change).

In some embodiments, the client device 207 may store current data (e.g., image data 252, ML model outputs 264) in the data store 250 and the kitchen management server 212 may retrieve the current data from the data store 250. In some embodiments, the kitchen management server 212 may store output (e.g., output generated based on processing image data) of the trained machine learning model 290 in the data store 250 and the client device 207 may retrieve the output from the data store 250.

In some embodiments, machine learning system 210 further includes server machine 270 and/or server machine 280. Server machine 270 includes a data set generator 272 that is capable of generating data sets (e.g., a set of data inputs and a set of target outputs) to train, validate, and/or test a machine learning model 290. Some operations of data set generator 272 are described in detail below with respect to FIGS. 4A-B. In some embodiments, the data set generator 272 may partition the image data 252 into a training set (e.g., sixty percent of the image data 252), a validating set (e.g., twenty percent of the image data 252), and a testing set (e.g., twenty percent of the image data 252). In some embodiments, the machine learning system 210 (e.g., via kitchen management component 214) generates multiple training data items each including one or more sets of features and associated labels (e.g., for object detection, action identification, object tracking, volumetric estimation, pacing determination, pose detection, etc.).

Server machine 280 may include a training engine 282, a validation engine 284, a selection engine 285, and/or a testing engine 286. An engine (e.g., training engine 282, a validation engine 284, selection engine 285, and/or a testing engine 286) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 282 may be capable of training a machine learning model 290 using one or more sets of features associated with the training set from data set generator 272. The training engine 282 may generate multiple trained machine learning models 290, where each trained machine learning model 290 may be trained based on a distinct set of features of the training set and/or a distinct set of labels of the training set. For example, a first trained machine learning model may have been trained using images and associated object labels, a second trained machine learning model may have been trained using images and associated pose labels, and so on. Additionally, one or more first ML models 290 may be trained to process kitchen images and one or more second ML models 290 may be trained to process drive-thru images.

The validation engine 284 may be capable of validating a trained machine learning model 290 using the validation set from data set generator 272. The testing engine 286 may be capable of testing a trained machine learning model 290 using a testing set from data set generator 272.

The machine learning model(s) 290 may refer to the one or more trained machine learning models that are created by the training engine 282 using a training set that includes data inputs and, in some embodiments, corresponding target outputs (correct answers for respective training inputs). Patterns in the data sets can be found that cluster the data input and/or map the data input to the target output (the correct answer), and the machine learning model 290 is provided mappings that captures these patterns. The machine learning model(s) 290 may include artificial neural networks, deep neural networks, convolutional neural networks, recurrent neural networks (e.g., long short term memory (LSTM) networks, convLSTM networks, etc.), and/or other types of neural networks. The machine learning models 290 may additionally or alternatively include other types of machine learning models, such as those that use one or more of linear regression, Gaussian regression, random forests, support vector machines, and so on. In some embodiments, the training inputs of a set of training inputs are mapped to target outputs in a set of target outputs.

Kitchen management component 214 may provide current data (e.g., kitchen data) to the trained machine learning model(s) 290 and may run the trained machine learning model(s) 290 on the input to obtain one or more outputs. The kitchen management component 214 may be capable of making determinations and/or performing operations from the output 264 of the trained machine learning model(s) 290. ML model outputs 264 may include confidence data that indicates a level of confidence that the ML model outputs (e.g., predictive data) 264 correspond to detected objects, identified actions, object tracking, detected poses and/or gestures, and so on. For example, the ML outputs may indicate a detected object does not meet threshold classification (e.g., level of confidence for the object is below a confidence criterion) criteria corresponding to a set of classifications. Kitchen management component 214 may perform volumetric quantity estimations based on image data and/or ML model outputs 264 in embodiments. The kitchen management component 214 may provide the ML model outputs 264 (e.g., detected objects, identified actions, object tracking data, volumetric quantity estimation) to one or more tools of the kitchen management system 220.

Drive-thru management component 215 may provide current data (e.g., drive-thru data) to the trained machine learning model(s) 290 and may run the trained machine learning model(s) 290 on the input to obtain one or more outputs. The drive-thru management component 215 may be capable of making determinations and/or performing operations from the output 264 of the trained machine learning model(s) 290. ML model outputs 264 may include confidence data that indicates a level of confidence that the ML model outputs (e.g., predictive data) 264 correspond to identified vehicles, vehicle meal order associations, vehicle routing, menu updates, vehicle tracking, and so on. Drive-thru management component 215 may perform vehicle identification, meal order association, vehicle routing, menu update determination, and/or vehicle tracking based on image data and/or ML model outputs 264 in embodiments. The kitchen management component 214 may provide the ML model outputs 264 (e.g., vehicle identification data, order association data, vehicle routing data, menu update data, vehicle tracking data) to one or more tools of the kitchen management system 220.

The confidence data may include or indicate a level of confidence that the ML model output 264 is correct (e.g., ML model output 264 corresponds to a known label associated with a training data item). In one example, the level of confidence is a real number between 0 and 1 inclusive, where 0 indicates no confidence that the ML model output 264 is correct and 1 indicates absolute confidence that the ML model output 264 is correct. Responsive to the confidence data indicating a level of confidence below a threshold level for a predetermined number of instances (e.g., percentage of instances, frequency of instances, total number of instances, etc.), the kitchen management server 214 may cause the trained machine learning model 290 to be retrained.

For purpose of illustration, rather than limitation, aspects of the disclosure describe the training of a machine learning model using image data 252 and inputting current image data into the trained machine learning model to determine ML model output 264 (e.g., detected object, identified actions, object tracking, volumetric quantity estimation, etc.). In other implementations, a heuristic model or rule-based model is used to determine an output (e.g., without using a trained machine learning model). Any of the information described with respect to input data (e.g., data acquired with data acquisition system 302 of FIG. 3) may be monitored or otherwise used in the heuristic or rule-based model.

In some embodiments, the functions of data integration system 202, client device 207, machine learning system 210, data acquisition system 230, kitchen management system 220, server machine 270, and server machine 280 may be provided by a fewer number of machines. For example, in some embodiments server machines 270 and 280 may be integrated into a single machine, while in some other embodiments, server machine 270, server machine 280, and predictive kitchen management server 212 may be integrated into a single machine. In some embodiments, kitchen management system 220, data acquisition system 230, and data integration system 202 may be integrated into a single machine.

In general, functions described in one embodiment as being performed by data integration system 202, client device 207, machine learning system 210, data acquisition system 230, kitchen management system 220, server machine 270, and server machine 280 can also be performed on kitchen management server 212 in other embodiments, if appropriate. In addition, the functionality attributed to a particular component can be performed by different or multiple components operating together. For example, in some embodiments, the kitchen management server 212 may process images. In another example, client device 207 may perform the image process based on output from the trained machine learning model.

In addition, the functions of a particular component can be performed by different or multiple components operating together. One or more of the kitchen management server 212, server machine 270, or server machine 280 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Figure 3A:
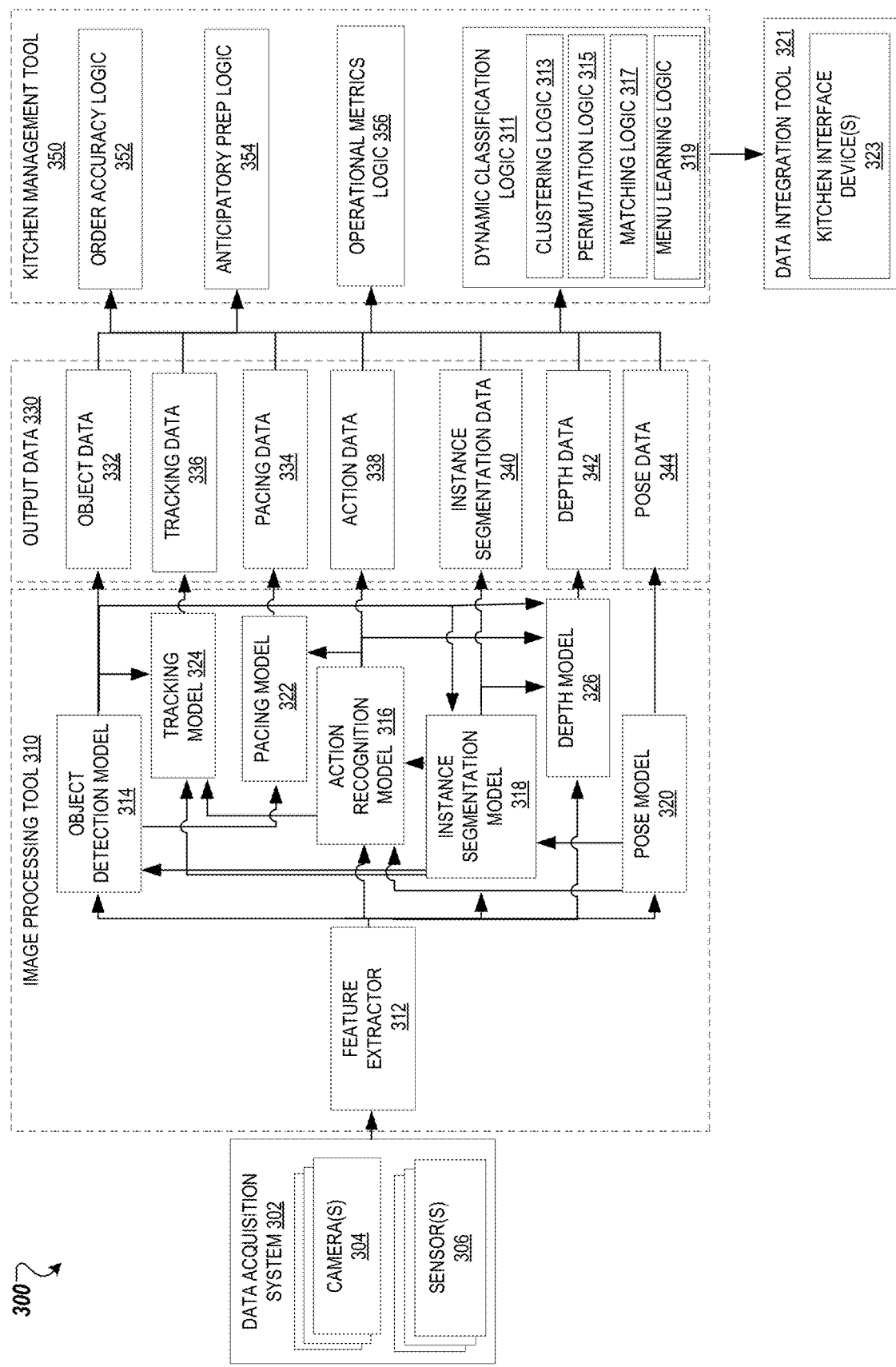
FIG. 3A-B is a block diagram illustrating image processing systems in which implementations of the disclosure may operate.

FIG. 3A is a block diagram illustrating an image processing system 300 in accordance with embodiments of the present disclosure. As shown in FIG. 3, the image processing system 300 includes a data acquisition system 302. The data acquisition system 302 may include one or more cameras 304 and/or sensors 306 to acquire image data (e.g., image data 252 of FIG. 2) associated with a state of the kitchen. For example, camera(s) 304 may be disposed within a meal preparation area to capture images of current food preparation items and/or actions. The cameras may include CCTV cameras, depth sensors (e.g. LIDAR cameras), depth optical cameras (e.g., stereo vision, structured light projection) and/or other sensors to capture kitchen data.

As shown in FIG. 3A the kitchen state data (e.g., image data) may be processed using an image processing tool 310. The image processing tool 310 may include a feature extractor 312. The feature extractor 312 can receive image data and generate synthetic data associated with various combinations, correlations, and/or artificial parameters of the image data. The feature extractor 312 can dimensionally reduce the raw sensor data into groups and/or features (e.g., feature vectors). For example, the feature extractor 312 may generate features that include images of a specified perspective (e.g., including a specified station).

In some embodiments, the feature extractor 312 includes a neural network trained to perform feature extraction. For example, the feature extractor may be trained to receive data for one or more images and to output features based on the received data. The output features may then be used by further logics and/or models of image processing tool 310.

In some embodiments, image data and/or outputs of the feature extractor 312 are used as inputs to various processing logic including data processing models, which may be or include one or more trained machine learning models. The data processing models may include an object detection model 314, an action recognition model 316, an instance segmentation model 318, a pose model 320, a tracking model 324, a pacing model 322, and/or a depth model 326. In some embodiments, feature extractor 312 is a layer of multiple layers of one or more neural networks, and object detection model 314, action recognition model 316, instance segmentation model 318, pose model 320, tracking model 324, pacing model 322, and/or depth model 326 are further layers of the one or more neural networks. In some embodiments, feature extractor 312 is omitted, and image data is input into object detection model 314, action recognition model 316, instance segmentation model 318, pose model 320, tracking model 324, pacing model 322, and/or depth model 326. The image processing model(s) receive input (e.g., image data, and/or a feature vector from feature extractor 312) and determine output data 330 (e.g., ML model outputs 264). In some embodiments, the output data 330 includes object data 332 (e.g., detected objects in an image), tracking data 334 (e.g., where an object is located, previous actions that have been applied to an object, tracking order through multiple images, and/or vehicle tracking in the drive-thru), pacing data 336 (e.g., paces of actions, recipes, food preparation steps, etc.), action data 338 (e.g., action being performed such as scooping an ingredient, cooking an ingredient, assembly a meal order, etc.), instanced segmentation data 340 (e.g., the last action to be performed on an order), data indicative of object association and/or segmentation, connecting object and employee, action and employee, division of macro-object such food preparation zones into individual ingredient containers), and so on. The data processing models may incorporate use of a machine learning model (e.g., trained using method 400A-B of FIG. 4, implemented using method 400C of FIG. 4, using processing architecture of machine learning system 210 of FIG. 2).

As shown in FIG. 3A, the object detection model 314 can receive image data from data acquisition system 302 (e.g., through feature extractor 312). In some embodiments, the object detection model 314 detects objects found within an image. For example, the object detection model 314 may identify objects such as food items (e.g., burgers, fries, beverages), meal packaging, ingredients, employees (e.g. hand, arms, etc.), vehicles (e.g., in the drive-thru queue), cooking equipment (e.g., ovens, utensils, preparation area, counters, machines, etc.), and the like. In some embodiments, the object detection tool receives data from a POS (e.g., POS 102 of FIG. 1). The received data from the POS may include data indicative of meals, kitchen items, ingredients, or other data indicative of potential objects to be detected in images by object detection model 314. In some embodiments, the data from the POS may be used to train the object detection model 314 on potential objects to be detected in the inputted image data. The object detection model outputs object data 332. The object data 332 may include information on an identified object as well as location data, employee data, meal data, and/or other identifiable information associated with the detected objects.

In some embodiments, the object detection model 314 may be unable to classify one or more detected objects within a meal preparation area. For example, an item may not have been previously processed by the image processing tool 310. The object detection model may output a feature characterization of an object that the object detection model 314 fails to classify. For example, an object may be detected and a feature characterization determined corresponding to the object. However, the feature characterization may not meet one or more condition for classifying the object one or more an object class (e.g., object identity labels). The object detection model 314 may output object data 332 that includes a feature characterization of an object (e.g., a visual embedding, feature vector, etc.) and/or an indication of a classification status (e.g., the detected object does not meet classification criteria for a set of object classifications).

As shown in FIG. 3A, the action recognition model 316 receives image data as input and outputs action data 338. The action recognition model 316 identifies actions being performed in association with the received image data. For example, a series of images may show an employee performing an action such as scooping a sauce. The action recognition model 316 receives the series of images and identifies the action performed (e.g., scooping the sauce), the location of the action (e.g., a first sauce station), and/or a time data (e.g., a timestamp) associated with the action. Some actions may include scooping an ingredient, placing an ingredient on a burger, filling a drink, placing an item in a toaster or a panini press, packing and/or assembly an item, and so on.

As shown in FIG. 3A, the image processing tool 310 may include an instance segmentation model 318. The instance segmentation model 318 may receive image data from the data acquisition system 302 (e.g., through the feature extractor 312). The instance segmentation model 318 may segment images into discreet boundaries. For example, the instance segmentation model 318 may receive an image, identify the boundaries of different ingredient containers (e.g., ingredient containers 112 of FIG. 1), and output the discretized ingredient containers as instance segmentation data 340. In another example, the instance segmentation model 318 may receive an image and identify the boundaries of different lanes associated with a drive-thru area. In some embodiments, the instance segmentation model 318 may associate various segmented and/or discretized boundaries. For example, the instance segmentation model 318 may receive object data 332 from the object detection model 314. The object data 332 may include a detected hand and a detected cooking utensil. The instance segmentation model 318 may identify an association between the hand and the cooking utensil and output the association as instance segmentation data 340. In another embodiment, the instance segmentation tool may output the data to the action recognition model 316 that determines an action (e.g., action data 338) being performed based on the detected hand and cooking utensil and the identified association between the detected objects. For example, the instance segmentation model 318 may receive image data indicative of multiple lanes in the drive-thru area and associate multiple lanes as merging into another lane. In some embodiments, the instance segmentation model 318 outputs instance segmentation data 340 that is used by tracking model 324 and/or depth model 326

As shown in FIG. 3A, the image processing tool 310 may include a tracking model 324. The tracking model 324 may receive object data 332, action data 338, instance segmentation data 340, and/or image data (e.g., from data acquisition system 302). The tracking model may track a detected object over a series of images and identify a current location of an object and/or historical tracking of an object. In some embodiments, the tracking model 324 tracks a status of an order. For example, the tracking model 324 may output tracking data 336 that includes an indication of top data or data indicative of the last action associated with an order. For example, the tracking model 324 may combine object data 332 with action data 338 to determine a series of actions associated with an order. In another example 324, tracking model 324 may receive a series of object detection associated with a vehicle moving through a drive-thru area. Tracking model 324 may track a route of a vehicle through a drive-thru (e.g., through an order placement area, an order payment area, and an order delivery area).

In some embodiments, the tracking model may track an object associated with instance segmentation data 340. For example, instance segmentation may include a discretization and/or segmentation of individual containers (e.g., to hold food items). The tracking model 324 may track a location of one or more individual containers over time. In a further embodiment, the tracking model 324 may further combine object data with instance segmentation data to determine the contents of each container is addition to tracking the containers. In another embodiment, the racking model may track a vehicle through a route of a drive-thru (e.g., tracking a vehicle through a merge of multiple lanes, through lanes changes generally, and the like). The tracking model may output data indicative of object tracking, order tracking, and/or action tracking as tracking data 336.

As shown in FIG. 3A, image processing tool 310 may include a pacing model 322. The pacing model 322 may receive object data 332 (e.g., from object detection model 314) and/or action data 338 (e.g., from action recognition model 316). The pacing model may determine pacing of various kitchen tasks associated with detected objects and/or actions. For example, not to be interpreted as an exhaustive list, the following could be pacing actions outputted by pacing model 322 and included in pacing data 334: prepping dough, placing toppings, loading and/or unloading a pizza to/from an oven, cutting a pizza, refilling ingredients, opening restaurant, prepping sides, hand washing, using POS system, checking temperature, using the cooler/freezer, assembling a product, packaging a product, attending a phone call, processing an order, counting inventory, delivering food to a customer, drive-thru queue, and so on.

As shown in FIG. 3A, image processing tool 310 may include a pose model 320. The pose model 320 receives image data and determines a pose of an employee. For example the pose model 320 may output pose data 344 indicative of locations and/or orientations of employees (e.g., hand, arms, body) and other kitchen equipment (e.g., utensils ovens, counters, etc.) In some embodiments, the pose data 344 is indicative of one or more locations of hands of employees in the presence of occlusions. For example, the pose data 342 may indicate a location and orientation of an arm that is visible in an image frame and determine the location and/orientation of a hand (e.g., that is not visible in an image frame). The pose data 344 may be outputted to the action recognition model 316 for determining actions that may be partially or fully occluded in the image data. The pose data 344 may be used further by instance segmentation model 318. For example, the instance segmentation model 318 may use the pose data 344 to make determination of object associations (e.g., a hand, an arm, and a cooking utensil).

Pose data 344 may include information indicative of a state of one or more hands of employees and associations between their hands and one or more meal preparation items. For example, a location of a hand may be detected within an image frame. In one or more further image frames the hands may be occluded from a field of view of a camera. The pose data 344 may infer a location of one or more hands occluded from the field of view. As will be discussed in later embodiments, the pose data may be tracked over time to infer one or more meal preparation items and/or object occluded or otherwise outside a field of view of a camera. In some embodiments, the pose data 344 is used by processing logic to make associations between segmented objects. For example, the pose data may be used to infer a detected hand is associated with a detected shoulder, elbow, head, etc.

As will be described in future embodiments pose data may be used to infer associations between segmented objects that links objects with pending meal orders. For example, a hand of an employee that is disposed in proximity to a first ingredient associated with a first pending meal order. Using these associations, processing logic may infer a connection between the first employee and the first pending meal order. Associations between pending meal order, stages of pending meal orders, ingredient preparation actions, and other kitchen actions and employees and/or preparations may be inferred based on the pose data 344. For example, pose data 344 may be used to associate an employee's left hand with their right hand and determine a first action performed by the left hand and a second action performed by the right hand is associated with the same order. In some embodiments, an employee may be associated with more than one order and/or part of an order.

As shown in FIG. 3A, image processing tool 310 may include a depth model 326. The depth model receives instance segmentation data 340 identifying individual segmented objects (e.g., individual kitchen containers). The depth data may receive sensor data 306 indicative of a detected depth of an image (e.g., an image taken using a LIDAR camera). The depth model 326 may further receive object specification data (e.g., dimensions of kitchen containers (e.g., length, width, and depth)). The depth model 326 may determine the depth and/or fill level of contents of individual containers.

In some embodiments, the action recognition model 316 may output action data 338 to the depth model 326. The depth model 326 may use action data 338 to determine a depth of a container during an identified action. For example, the presence of a food preparation utensil in a container can result in inaccurate depth data 342 of the enclosed kitchen item in the container (e.g., a sauce). The depth model 326 may determine a depth of the content of a container during a scooping actions where the kitchen utensil is removed from the container for a period of time.

In some embodiments, the depth model 326 makes a volumetric determination of the content of a container. In some embodiments, the depth model 326 receives object data 332 from object detection model 314. The depth model 326 may use the object data 332 to determine the content of a container. The depth model may then use volumetric determination methodology associated with the detected object. For example, the depth model 326 may receive object data 332 indicating that an object enclosed in the container is a thick sauce or a solid ingredient and the depth model 326 can account for this feature when determining a volumetric prediction of the enclosed item in the container.

The image processing system 300 may include a kitchen management tool 350. The kitchen management tool 350 may include order accuracy logic 352, anticipatory prep logic 354, an operational metrics logic 356, drive-thru management logic 358, and/or dynamic classification logic 311. The order accuracy logic 352 may receive output data 330 such as object data 332, action data 338 and/or order data, such as data managed by an order manager tool (e.g., order manager tool 203) and determine inaccuracies between what is being prepared in the kitchen (e.g., detected in the images) and what steps are to be performed (e.g., following recipes and predetermined order preparation instructions). In some embodiments, the order accuracy tool may include flagging or otherwise indicating an error to an employee. For example, order accuracy logic 352 may process data and output instructions for a display (e.g., display 205 of FIG. 2) to display a visual indication of the error.

In some embodiments, the order accuracy logic consumes tracking data 336. For example, the order accuracy logic 352 may identify the last action performed on an order from the tracking data 336 and one or more pending actions to be performed on an order. The order accuracy logic may then determine current actions being performed on an order and compare them against the pending action to be performed following menu/recipe data. In some embodiments, the order accuracy logic 352 may determine compound actions from the action data 338, tracking data 334, and/or pose data 344. The order accuracy logic 352 may identify which actions are associated with each order based on the instance segmentation data 340 to determine whether an error is or has occurred with an order.

The anticipatory prep logic 354 may consume output data 330 associated with objects detected (e.g. object data 332 including ingredients, menu items, packaging, etc.). The anticipatory prep logic 354 may consume depth data 342, instance segmentation data 340, and/or object data to determine a current inventory of the kitchen. The anticipatory prep logic 354 may monitor inventory over a period of time and predict when more of a given ingredient needs to be prepared. For example, the anticipatory prep logic can consume pacing data 334 and/or depth data 342 that indicates the rate of consumption of a first ingredient (e.g., grilled chicken). The anticipatory prep logic 354 may include a model that predicts output data 330, future preparation times and/or quantities. For example, to ensure a restaurant has a given ingredient available, the anticipatory prep logic 354 may indicate to an employee a future prep time and/or quantity of the given ingredient.

The operational metrics logic 356 may consume output data 330 and outputs from one or more of order accuracy logic 352, anticipatory prep logic 354, dynamic classification logic 311, and drive-thru management tool 390 to provide targeted, specific metrics associated with a restaurant's food preparation and delivery services. In some embodiments, operational metrics logic 356 receives pacing data 334 associated with different preparation times of given employees, menu items, and/or preparations steps. The operational metrics logic 356 may identify, using one or more of object data 332, action data 338, pacing data 334, and/or pose data 344, preparation and/or delivery times of individual employees, shifts, stations, and/or menu items. The operational metrics tool 226 may suggest incentives to increase one or more metrics for individuals, shifts, restaurants, and so on. The incentives may be tailored to specific metrics that may have values lagging expected and/or target values for those metrics. The operational metrics tool 226 may additionally suggest one or more trainings to be provided to specific employees and/or all employees. In some embodiments, visual assistance is automatically provided to employees as errors are identified and/or measured metrics (e.g., speed of a food preparation task) fall below a threshold. Such visual assistance may include showing a video or moving picture showing a correct technique to use for performing the food preparation task on a kitchen display system at a workstation where the errors were identified and/or the measured metrics were determined to fall below a threshold.

In some embodiments, the operational metrics logic 356 consumes pacing data 334 to determine various pacing related metrics. For example the operation metrics logic 356 may determine a preparation speed for a given employee, a preparation station, a particular task (e.g., taking an order, preparing ingredients, adding ingredients to an order, packing and/or bagging meal components, and the like). In some embodiments, the operational metrics logic 356 determines a duration of time that it takes to transport an item, a duration of time to complete a task, and/or a duration of time since a last error/mistake occurred for any given subsection of the meal preparation area (e.g., by employee, workstation, meal item, meal preparation action, and the like). The operation metrics logic 356 may leverage tracking data 336 to determine individual metrics for a given order including individual meal preparation steps.

In some embodiments, the operational metrics logic 356 consumes pose data to determine procedural and/or operation metrics. The operational metrics logic 356 may determine a frequency of use of a specified meal preparation technique. For example, the operational metrics logic 356 may determine a rate of utilization of a given form or posture such as, for example, the use of one hand or two hands for a given action. In another example, operational metrics logic 356 may determine whether proper equipment for a given task is used. The operational metrics logic 356 may include a comparison between a standard technique or process for carrying out one or more meal preparation tasks and what is actually being performed in the kitchen.

In some embodiments, the operational metrics logic 356, performs data analysis on the received data to determine additional patterns between pose data, meal order accuracy data, and/or pacing data. For example, the operational metrics logic 356 may perform one or more relational analyses on speed/throughput and accuracy with secondary metrics like pose data and/or compliance with meal preparation standards and/or policies. For example, operational metrics logic 356 may perform a regression between one or more of speed metrics, accuracy metrics, pose metrics, compliance with standards or procedures metrics, and so on so as to evaluate the effectiveness of meal preparation standards and policies.

In some embodiments, the operational metrics logic 356 may create categories of metrics for various conditions that may be present in the kitchen environment. For example, the operational metrics logic 356 may consume data indicating a state of a customer queue area (e.g., drive-thru queue data from drive-thru management tool 390, lobby queue area from an object detection model 314, etc.). Operational metrics logic 356 may determine one or more of the aforementioned metrics (e.g., speed, accuracy, efficiency, etc.) when customer demand is above a threshold amount (e.g., high demand, rush hour, etc.). Thresholds or criteria associated with one or more of the aforementioned metrics (e.g., order accuracy, efficiency, etc.) may be automatically adjusted in embodiments based on one or more criteria related to customer demand and/or a level of business of a restaurant. For example, as customer demand increases above one or more thresholds, an order accuracy threshold may be reduced. As a result, orders completed with certain errors (e.g., failure to add ketchup to packaging, failure to use proper packaging, etc.) during a time of low customer demand may be flagged for errors, but the same orders with the same errors during a time of high customer demand may not be flagged for errors. This can improve the efficiency of the restaurant at busy times. The operational metrics logic 356 may include one or more metrics associated with an effectiveness of employees to reduce a line length below a target queue length.

In some embodiments, the operational metrics logic 356 may determine one or more idleness and/or downtime metrics associated with a meal preparation entity. For example, the idleness and/or downtime metrics may be associated with a rate and/or a duration for which an employee is not working on a task. In another example, the idleness and/or downtime metrics may be associated with a rate and/or duration that a preparation station, a preparation appliance and/or tool is not in use (e.g., an oven, a Panini press, an ingredient maker, etc.). In some embodiments, the idleness and/or downtime metrics are computed as a ratio or fraction of downtime or idleness time to total time. In some embodiments, the idleness and/or downtime metrics are computed as a ratio or fraction of downtime or idleness time to active working or meal preparing time.

In some embodiments, operational metrics logic 356 consumes any of object data 332, tracking data 366, pacing data 334, action data 338, instance segmentation data 340, depth data 342, pose data 344, outputs of order accuracy logic 352, anticipatory prep logic 354, dynamic classification logic 311, and/or drive-thru management tool 390 to evaluate and determine one or more associated performance metric that may include patterns, trends, statistical analysis, etc. found within any of the aforementioned sets of data.

The dynamic classification logic 311 may consume object data 332, tracking data 336, action data 338, and/or instance segmentation data 340. The object data 332 may be associated with an item identified by the object detection model. However, in some cases, a restaurant may introduce new recipes, menu items, ingredients, etc. Conventional machine learning systems often require extensive retraining in order to perform novel object detection. However, the dynamic classification logic 311 provides various process flows categorized under clustering logic 313, permutation logic 315, elimination logic 366, and menu learning logic 319 to dynamically detect unclassified items and generate new class label to classify the newly detected items.

Clustering logic 362 may consume object data 322 that includes a new feature characterization of a new item detected within the kitchen. The new feature characterization may be compare with a set of object classification criteria for a set of object classes and determined that the new feature characterization does not meet conditions for classifying the new item within each of the set of object classes based on the comparison. Clustering logic 362 may compare the new feature characterizations and determine whether an item similar to the new item has been seen by the kitchen management system before. Clustering logic 362 performs comparison between the new feature characterization and previous feature characterizations of unclassified items. The comparison may any of calculating a distance between features vectors such as, for example, using a Euclidean distance algorithm, Cosine distancing algorithm, and/or the like. The clustering logic 313 determines that the new item has appeared before and is associated with one or more previously detected but unclassified items based on a clustering of the one or more feature vectors based on a distance between each of the new feature characterization and the previous feature characterization of the previous detected items. Clustering logic 362 may leverage various contextual data (e.g., KDS data, POS data, etc.) to determine a label for the newly detected object. In some embodiments clustering logic 313 prompts a user (e.g., a kitchen employee) to provide a label or classification for the newly detected item. Further details regarding the clustering logic 313 are described in association with FIG. 8.

Permutation logic 364 may consume object data 332 indicating one or more known ingredients and one or more unknown ingredients. The permutation logic 315 leverages known ingredients to infer labels of a combination of meal preparation items (e.g., "a combo"). For example, a new combo may be introduced on the menu that may include a set of the ingredients. The set of ingredient may include all known ingredients, some known and some unknown ingredients, and all unknown ingredients. The permutation logic 315 may infer combination of ingredients that may have been permuted with some or all of the ingredients remaining in the new permuted item. For example, a new combo may include an "upside down" version of a meal item, another new combo may include an "inside out", another combo may include nearly all the same ingredients but may be repackaged in new packaging as a promotional item. The permutation logic 315 take knowns object labels of ingredients and determines potentially new combination labels (e.g., as defined in the KDS or POS). Further details regarding the permutation logic 315 are described in association with FIG. 9.

Matching logic 366 may consume object data 332, POS data, and/or KDS data. The matching logic 317 tracks the process of adding new items to a menu configuration. For example the elimination logic 366 a processing of elimination to match newly detected items within the kitchen to newly added entries in the POS and KDS. The matching logic 317 may determine that a new item is found within the kitchen and compare that new item with a current state of the POS and/or KDS. For example the POS may indicate one or more pending meal orders. The pending meal order may have only one item in the order data that is new or unknown. By process of elimination the matching logic 317 determines the newly detected meal item matches with the only new label provided by the POS. In another example, the KDS system may indicate to the kitchen management system that there is one new item to be detected. Once a new item is detected with the kitchen, the elimination logic may match that new item with the new item flagged by the KDS system. Further details regarding the matching logic 317 are described in association with FIG. 10.

Menu learning logic 368 consumes object data 332 and KDS data. The menu learning logic 319 relies upon detailed KDS that provides the kitchen management system instructions to follow in capturing corresponding visual cues as a meal item is prepared. For example, the menu learning logic 319 may receive detailed instruction regarding how a meal item is prepared (e.g., ingredients, quantities of ingredients, meal preparation actions, and so forth). The menu learning logic 319 uses the detailed instructions from the KDS to track individual processing steps including identifying ingredients indicated by the KDS data, quantities of ingredients, and so forth. The menu learning logic 319 leverages thorough KDS instructions to capture visual image data of item that may be unclassified or unknown (e.g., new meal preparation items, promotional meal preparation items, temporary meal preparation items. The KDS instructions allow the menu learning logic 319 to build up a database of visual data to train the object detection model using the new labels provided by the KDS instructions.

In some embodiments one or more of the order accuracy logic 352, the anticipatory prep logic 354, the operational metrics logic 356, the drive-thru logic 358, and/or the dynamic classification logic 311 include a machine learning model (e.g., trained using method 400A-B of FIG. 4, implemented using method 400C of FIG. 4, using processing architecture of machine learning system 270 of FIG. 2).

Figure 3B:
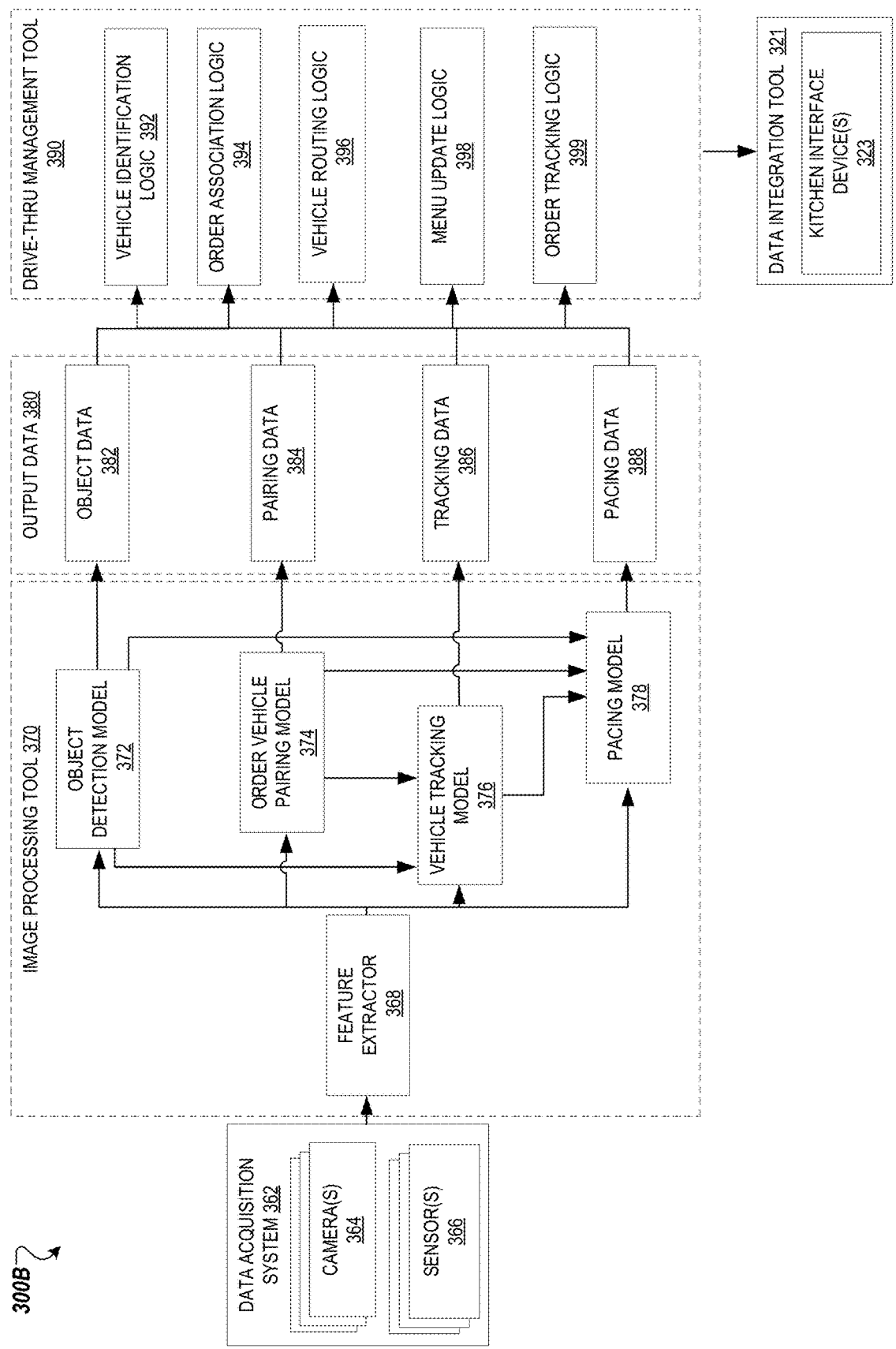

As shown in FIGS. 3A-B, image processing system 300A-B includes a data integration tool 321 which receives output data 330, data from kitchen management tool 350, output data 380, and/or data from drive-thru management tool 390. In some embodiments, the data integration tool 321 includes hardware and/or processing logic associated with connecting and communicating with external devices. For example, the data integration tool 321 may include an application programming interface (API) configured to connect with the kitchen management system 220 of FIG. 2 and transmit data (e.g., data associated with the order manager tool 203) between the systems (e.g., using network 216 of FIG. 2).

The data integration tool 321 may include a kitchen interface device 323. The kitchen interface device 323 may receive inputs from the meal preparation area and provide outputs to the meal preparation area. For example the kitchen interface device may include a display (e.g., a kitchen display system (KDS)). The data integration tool 321 may work with the kitchen management tool 350 to integrate output data 330 and outputs of the kitchen management tool 350 to be presented (e.g., displayed) with other kitchen operation data (e.g., KDS data, POS data, etc.). For example, the data integration tool 321 may communicate and/or otherwise work with an order manager tool to display upcoming orders and associated menu items and recipes for the upcoming orders. In some embodiments, multiple displays are used. For example, a display may be associated with a particular station (e.g., cooking station, assembly station, etc.) and order steps associated with that particular station may be displayed.

In some embodiments, the data integration tool 321 may present (e.g., using kitchen interface device(s) 323) a current status of a pending meal order. For example, a meal order may include a set of meal items. During preparation of the meal order one or more of the meal items of the set of meal items may be completed before other items and a status indicative of partial completion of the set may be displayed in association with the completed items (e.g., by affirmatively indicating one or more tasks as completed) and/or the incomplete item (e.g., by providing an indication of the tasks needed to be performed to complete a pending meal order).

In some embodiments, the data integration tool 321 may present (e.g., using kitchen interface device(s) 323) the orders in a priority order. The order may be based on a temporal association between the orders (e.g., oldest order is displayed with the highest priority (i.e., first on the list)) and/or based on a position in one or more drive-thru line of vehicles associated with orders. In some embodiments, the employee interface may receive input that alters a current display state of the pending meal orders on a display. The employee interface may receive input (e.g., from an employee) associated with an order. In some embodiments, the one or more employee inputs may be provided by the kitchen management tool 350. For example, the employee interface may receive an input that a first preparation stage of a meal item has been completed and can update a status of a pending meal order based on the received input by the employee interface. The employee interface may receive input associated with altering a priority of one or more pending meal orders presented on the display of the data integration system. For example, a sequence of pending meal orders may be adjusted based on input received by the employee interface. The display may update a state and/or manner of displayed information based on an input received by the employee interface. For example, the display may present one or more tasks remaining to complete an order and can update the list of remaining tasks based on the input received by the employee interface.

In some embodiments, the data integration tool 321 may present (e.g., using kitchen interface device(s) 323) a live update of contents of a meal package or a bag enclosing one or more meal preparation items. For example, a bag may enclose one or more meal preparation items and as items are added to (and in some cases removed from) the bag the contents of the bag may be updated on the screen. Some meal items have similar appearance such as various packaging used to wrap meal items, and the ability to see the contents of the bag may allow for improved efficiency and accuracy in preparing and/or delivering meals to customers. In some embodiments, the data integration tool 321 may present (e.g., using kitchen interface device(s) 323) what is still needed to be input into a bag or other container to complete an order. For example, the display may indicate that a first item is in the bag by showing the item in a positive position on the kitchen interface device 323. For example, the first item may be shown in green, with a checkmark next the item name, faded out, and the like to show that the first item is accounted for in the contents of a bag or other container. On the other hand, items that are not currently in a bag or other container but are still needed to complete the order may be displayed in a prominent position. For example, a second item that is needed in a first bag may be presented on the kitchen interface device 323 with a red color, highlighted, or otherwise indicated that the second item needs to be added to the bag.

In some embodiments, the data integration tool 321 may present (e.g., using kitchen interface device(s) 323) an overlay or provide visual, auditory, and/or haptic cues for indicating an action to be performed next in a meal preparation process. For example, an LED, speaker, haptic device (e.g., vibration device such as a haptic touch screen), etc. may indicate a subsequent meal preparation item or a meal preparation action associated with a new step in preparing a corresponding meal item. In some embodiments, the visual, auditory, and/or haptic cues may be provided after a delay in determining a new action is detected. For example, the display may act as a training mechanism that displays cues indicating the next action to perform after the employee has had an opportunity to make an attempt. In some embodiments, the same or analogous cues may indicate whether an action performed (e.g., a meal item being used in a corresponding action) is correct. For example, a negative cue such as a red light, a buzzer, or rapid haptic vibration, and the like may indicate a negative response and that a meal preparation error has occurred and/or is currently occurring. In some embodiments, analogous cues may be used to indicate an action is correctly performed. For example, a green light, a positive auditory cue, or light haptic vibrations may be used to indicate a correct action has been performed.

In some embodiments, the data integration tool 321 may present (e.g., using kitchen interface device(s) 323) an overlay or other visual indicators on a screen contemporaneously with a live video feed of the meal preparation area. A visual indicator such as, for example, an arrow, a boundary box, a color filter, and the like may be used to identify a meal preparation item and/or a location within the kitchen associated with a meal preparation action. For example, a packaging station may include multiple lights (e.g., such as light emitting diodes (LEDs)), where each light is at a different region of the packaging station and is associated with a different order. A light proximate to a particular region may light up as an employee approaches the packaging station with a menu item (e.g., a hamburger) to indicate that the menu item should be placed into the container at that region. In another example, a display may show a pointer pointing to a particular region of the packaging station to show which container a menu item should be placed in. The system may know which menu item is in a hand of the employee (e.g., based on processing by image processing tool 310), and may know which order the menu item is associated with and where at the preparation station that order is being assembled. Accordingly, the system may provide indicators, such as visual indicators, to guide an employee to place the menu item in the correct packaging associated with that order.

In some embodiments, the data integration tool 321 may present (e.g., using kitchen interface device(s) 323) specific instructions to employees to carry out specific tasks. For example, the kitchen interface device 323 may indicate that an employee needs to correct an order by performing a set of actions. In another example, the kitchen interface device 323 may indicate to an employee one or more remaining tasks to complete an order and/or walk an employee through preparing a specific meal. In some embodiments, the data integration tool 321 may present (e.g., using kitchen interface device(s) 323) a status of a customer queue area (e.g., line queue metrics such as how long queue line is, how long the wait, a duration or rate of time the line is above a target or threshold line length, and the like).

In some embodiments, the data integration tool 321 may present (e.g., using kitchen interface device(s) 323) a live feed of operational metrics within the kitchen. As will be discussed further in other embodiments, various operational metrics may be acquired and/or computed about various tasks, operations, inventories, employee performance, customer queue analytics, among other things from the image frame(s) captured via cameras in the kitchen and cameras disposed in the drive thru. For example, analytics data on drive-thru queue time may be evaluated. In another example, analytics data on average pacing of employees per shift for specific actions (e.g., pacing chicken preparation) may be evaluated. The various analytics data may be used as to determine rewards such as by identifying employees or combinations of employees that exceed target performance goals (e.g., speed, accuracy, efficiency, etc.). The various analytics may be displayed live on the kitchen interface device(s) 323. In some embodiments, the data integration tool 321 may present (e.g., using kitchen interface device(s) 323) a rank or score associated with a current state of the kitchen. For example, a first employee may be listed with a score and/or ranking relative to other employees. In another example, a current store may be given a score and/or ranking relative to other stores. In another example, a specific workstation, combination of employees, meal preparation task, meal item, etc. may be scored, analogously ranked, and displayed on kitchen interface device 323.

FIG. 3B is a block diagram illustrating an image processing system 300B in accordance with embodiments of the present disclosure. As shown in FIG. 3B, the image processing system 300B includes a data acquisition system 362. The data acquisition system 362 may include one or more cameras 364 and/or sensors 366 to acquire image data (e.g., image data 252 of FIG. 2) associated with a state of the drive-thru area. For example, camera(s) 364 may be disposed within a meal delivery area. The cameras may include CCTV cameras, depth sensors (e.g. LIDAR cameras), depth optical cameras (e.g., stereo vision, structured light projection) and/or other sensors to capture kitchen data.

As shown in FIG. 3B the drive-thru state data (e.g., image data) may be processed using an image processing tool 370. The image processing tool 370 may include a feature extractor 368. The feature extractor 368 can receive image data and generate synthetic data associated with various combinations, correlations, and/or artificial parameters of the image data. The feature extractor 368 can dimensionally reduce the raw sensor data into groups and/or features (e.g., feature vectors). For example, the feature extractor 368 may generate features that include images of a specified perspective (e.g., including a zone of a drive-thru area such as order placement zone, order payment zone, meal delivery zone, etc.).

In some embodiments, the feature extractor 368 includes a neural network trained to perform feature extraction. For example, the feature extractor may be trained to receive data for one or more images and to output features based on the received data. The output features may then be used by further logics and/or models of image processing tool 370.

In some embodiments, image data and/or outputs of the feature extractor 368 are used as inputs to various processing logic including data processing models, which may be or include one or more trained machine learning models. The data processing models may include object detection model 372, order vehicle pairing model 374, vehicle tracking model 376, and/or pacing model 378. In some embodiments, feature extractor 368 is a layer of multiple layers of one or more neural networks, object detection model 372, order vehicle pairing model 374, vehicle tracking model 376, and pacing model 378 are further layers of the one or more neural networks. In some embodiments, feature extractor 368 is omitted and image data is input into object detection model 372, order vehicle pairing model 374, vehicle tracking model 376, and/or pacing model 378. The image processing model(s) receiving input (e.g., image data and/or feature vector from feature extractor 368) and determine output data 380 (e.g., ML model outputs 264). In some embodiments, the output data 380 includes vehicle data 382 (e.g., vehicles detected in a drive-thru area), pairing data 384 (e.g., timing and location data associated with pending meal orders and vehicles in a drive-thru area), tracking data (e.g., data indicating one or more vehicle trajectories/routes through a drive-thru area, tracking a vehicle through multiple frames, etc.), and/or pacing data 388 (e.g., pace of vehicles in and out of a drive-thru, pace of individual drive-thru stations, pace of filling orders associated with vehicles in the drive-thru).

As shown in FIG. 3B, the object detection model 372 can receive image data from data acquisition system 362 (e.g., through feature extractor 368). In some embodiments, the object detection model 372 detects vehicles found within an image associated with a drive-thru area. For example, the object detection model 372 may identify a license plate number, make and/or model of a vehicle, and/or other visual indicators associated with a vehicle. In another embodiments, the object detection model may determine a location of a vehicle based on a location within an image frame and/or based a relative location of other identifiable indicators in an image (e.g., lane marker, building boundaries, order kiosks, drive-thru windows, etc.) The vehicle data 382 may include data indicating a location of a vehicle within a drive-thru area.

As shown in FIG. 3B, the order vehicle pairing model 374 can receive image data from data acquisition system 362 (e.g., through feature extractor 368). The order vehicle pairing model 374 may determine associations between pending meal orders and vehicles disposed within a drive-thru area. For example, the order vehicle paring model 374 may receive order data and image data to determine a proximity of a vehicle to an order placement location when an ordered is received/entered by a POS system. The associations between vehicles and meal orders as pairing data 384.

As shown in FIG. 3B, the vehicle tracking model 376 can receive image data from data acquisition system 362 (e.g., through feature extractor 368). The vehicle tracking model 376 may receive vehicle data 382 (e.g., from object detection model 372). The vehicle tracking model may track a detected vehicle over a series of image and identify a current location of the vehicles and/or historical tracking of the vehicle. In some embodiments, the vehicle tracking model 376 may also track pending meal orders using pairing data 384. For example, a vehicle may be tracked and associated with a pending meal and as a result a meal order may be tracked. The vehicle tracking model 376 may track a route of a vehicle through a drive-thru area (e.g., through an order placement area, an order payment area, and an order delivery area).

As shown in FIG. 3B, image processing tool 370 may include a pacing model 378. The pacing model 378 may receive vehicle data 382 from object detection model 372, pairing data 384 from order vehicle pairing model 374, and vehicle tracking model 376. The pacing model 378 may determine pacing of various drive-thru events. For example, the rate of ingress and egress associated with a drive through may be determine. Rates associated with ordering, payment, and meal delivery may be calculated to identify relative pacing of vehicles. In some embodiments, the pacing model may determine pacing of various kitchen tasks associated with detected objects and/or actions. For example, not to be interpreted as an exhaustive list, the following could be pacing actions outputted by pacing model 378 and included in pacing data 388: prepping dough, placing toppings, loading and/or unloading a pizza to/from an oven, cutting a pizza, refilling ingredients, opening restaurant, prepping sides, hand washing, using POS system, checking temperature, using the cooler/freezer, assembling a product, packaging a product, attending a phone call, processing an order, counting inventory, delivering food to a customer, drive-thru queue, and so on. In some embodiments, the pacing model 378 may output pacing data 388 that include predicted time to fill orders (e.g., time to deliver a meal to a vehicle in the drive-thru).

The drive-thru management logic may consume output data 330 associated with kitchen status and drive-thru status. The drive-thru management tool 228 may identify a status of the drive-thru from one or more of the object data 382, the pairing data 384, the tracking data 386 and/or the pacing data 338. The image processing system 300B may include a drive-thru management tool 390. The drive-thru management tool 390 may include vehicle identification logic 392, order association logic 394, vehicle routing logic 396, menu update logic 398, and order tracking logic 399.

The vehicle identification logic 392 may determine a visual indicator associated with the vehicle based on the output data 380. The visual indicator may include one or more features of the vehicle that identifies the vehicle from other vehicles. For example, the vehicle identification logic 392 may determine a color of the vehicle, a make and/or model of the vehicle, a license plate number of the vehicle, and/or one or more objects detected on, within, or otherwise proximate the vehicle. For example, one or more objects disposed on a windshield (e.g., registration information or a depicted logo or icon) may be used to identify the vehicle. In another example, one or more objects located within the vehicle (e.g., on a dashboard) may be detected. In another example, pictures, logos, or other visual indicators on the body of the car (e.g., bumper stickers) may be used to identify the vehicle. In some embodiments, alterations to a traditional make and/or model of a vehicle may be detected and used to identify the vehicle. For example, a custom paint job (e.g., the vehicle includes a first part with a first color and a second part with a second color) associated with the vehicle may be used to identify the vehicle. In another example, a vehicle may include identifying features such scratches, cracked parts, missing parts (e.g., corresponding to a prior accident associated with the vehicle) that may be detected by processing logic to identify the vehicle from other vehicles.

The order association logic 394 may determine an association between a vehicle and the pending meal order based on the output data 380. Order association logic 394 may determine a location associated with the vehicle based on the image data. For example, one or more pixels of the one or more image frames may be associated with a specific location of the drive-through area. A vehicle may be depicted in a first portion of one or more image frames that is associated with a location proximate an order placement area of the drive-thru area. The association between the vehicle and the pending meal order may be based on a proximity of the vehicle to an order placement location when the order data is received (e.g., entered into the POS system). For example, a vehicle that is ordering is likely near the order placement area (e.g., a kiosk) of the drive-thru area and can be associated with an order that is entered in temporal proximity to determining that the vehicle is located proximate the order placement area. In some embodiments, processing logic may tag a vehicle with the order such that when the vehicle is detected in further image frames the identified vehicle is linked to data indicative of the associated pending meal order.

In some embodiments, as will be discussed further in association with other embodiments, an order may be associated with a vehicle based on which lane the vehicle is determined to be disposed. For example, a drive-thru area may include multiple meal order areas (e.g., multiple order kiosks) and an order entered into the POS may be associated with a specific lane of the drive-thru. The received order may be associated with a kiosk disposed proximate a first lane. A vehicle may be determined to be located in the first lane and can further be associated with the received order.

The vehicle routing logic 396 may consume the output data 330 to identify a current availability of items in the kitchen (e.g., inventory analysis). The vehicle routing logic 396 may track the rate (e.g., throughput of vehicles, duration of time each vehicle is disposed within the drive-thru area) and wait time of the vehicles in the drive-thru and make a determination that a given vehicle associated with an order should be rerouted to an alternative delivery procedure. For example, the drive-thru management logic may output a determination that a vehicle is to be directed to a waiting bay when an order associated with the vehicle is above a threshold value.

The menu update logic 398 may determine an update to an order display device based on the visual indicator (e.g., license plate, make/model of vehicle, or other vehicle identifying information as described herein.). In some embodiments, an order display device may include a display showing various meals capable of being prepared within an associated meal preparation area. The order display device may be capable of dynamic updating. For example, the order display device may include a digital menu display that is capable of receiving data and updating one or more elements on the display. In some embodiments, an update to the order display device may include updates to positioning and/or sizing of displayed elements, alignment of the one or more displayed elements, spacing between other displayed elements, visibility of one or displayed elements. In another example, the order display device may receive an update associated with an updated price of a meal item or combination of meal items and display the update in an updated menu display configuration (e.g., showing the updated price in proximity to the corresponding element). In another example, the order display device may update which items to display, which may be accompanied with changes in price, size, etc. Accordingly, a menu display may be customized to a customer based on properties of the vehicle (e.g., kids meals displayed to a minivan).

The order tracking logic 399 can receive output data 380 from image processing tool 370. The order tracking logic 399 may receive object data 382, pairing data 384, tracking data 386, and/or pacing data 388. The order tracking logic 399 may track a detected vehicle over a series of image and identify a current location of the vehicles and/or historical tracking of the vehicle. In some embodiments, the order tracking logic 399 may also track pending meal orders using pairing data 384. For example, a vehicle may be tracked and associated with a pending meal and as a result a meal order may be tracked. The vehicle tracking model 376 may track a route of a vehicle through a drive-thru area (e.g., through an order placement area, an order payment area, and an order delivery area).

Figure 4A:
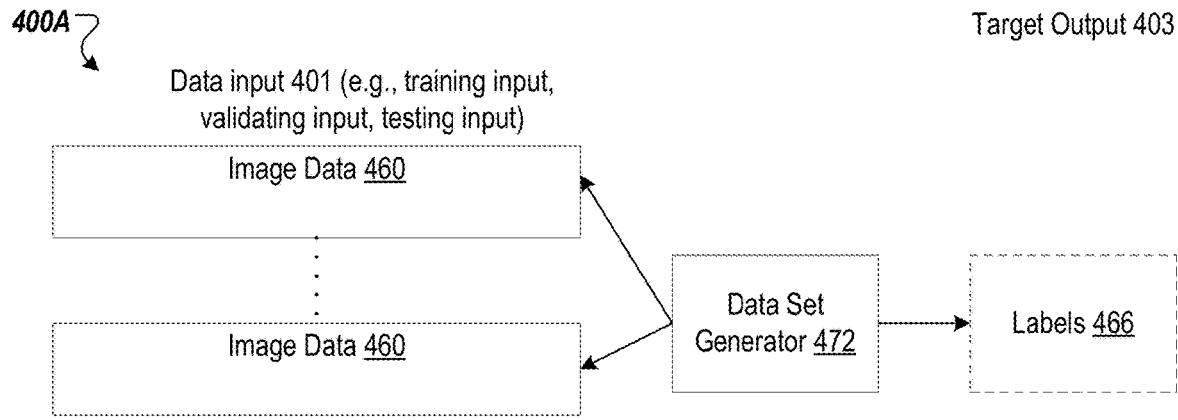
FIG. 4A is an example data set generator to create data sets for a machine learning model, according to certain embodiments.

FIG. 4A is an example data set generator 472 (e.g., data set generator 272 of FIG. 2) to create data sets for a machine learning model (e.g., model 290 of FIG. 2) using image data 460 (e.g., images captured by cameras 108A-C of FIG. 1), according to certain embodiments. System 400A of FIG. 4A shows data set generator 472, data inputs 401, and target output 403.

In some embodiments, data set generator 472 generates a data set (e.g., training set, validating set, testing set) that includes one or more data inputs 401 (e.g., training input, validating input, testing input). In some embodiments, the data set further includes one or more target outputs 403 that correspond to the data inputs 401. The data set may also include mapping data that maps the data inputs 401 to the labels 466 of a target output 403. Data inputs 401 may also be referred to as "features," "attributes," or information." In some embodiments, data set generator 472 may provide the data set to the training engine 282, validating engine 284, and/or testing engine 286, where the data set is used to train, validate, and/or test the machine learning model 290. Some embodiments of generating a training set may further be described with respect to FIG. 5A.

In some embodiments, data set generator 472 generates the data input 401 based on image data 460. In some embodiments, the data set generator 472 generates the labels 466 (e.g., object data 332, pacing data 334, tracking data 336, location data 338, depth data 342) associated with the image data 460. In some instances, labels 466 may be manually added to images by users. In other instances, labels 466 may be automatically added to images.

In some embodiments, data inputs 401 may include one or more images (e.g., a series of image frames) for the image data 460. Each frame of the image data 460 may include various objects (e.g., ingredients such as condiments, entrees, packaging materials, etc.), actions being performed (e.g., cooking, cutting, scooping, packaging, etc.), tracked orders, locations within the kitchen and drive-thru, depth of containers holding ingredients, and so on.

In some embodiments, data set generator 472 may generate a first data input corresponding to a first set of features to train, validate, or test a first machine learning model and the data set generator 472 may generate a second data input corresponding to a second set of features to train, validate, or test a second machine learning model.

In some embodiments, the data set generator 472 may discretize one or more of the data inputs 401 or the target outputs 403 (e.g., to use in classification algorithms for regression problems). Discretization of the data input 401 or target output 403 may transform continuous series of image frames into discrete frames with identifiable features. In some embodiments, the discrete values for the data input 301 indicate discrete objects, actions, location, etc. to be identified to obtain a target output 303 (e.g., output generated based on processing image data).

Data inputs 401 and target outputs 403 to train, validate, or test a machine learning model may include information for a particular facility (e.g., for a particular restaurant location and/or branch). For example, the image data 460 and labels 466 may be used to train a system for a particular floorplan and/or menu associated with a specific restaurant location.

In some embodiments, the information used to train the machine learning model may be from specific types of food preparation equipment (e.g., pizza oven, panini press, deep fryer) of the restaurant having specific characteristics and allow the trained machine learning model to determine outcomes for a specific group of food preparation equipment based on input for image data 460 associated with one or more components sharing characteristics of the specific group. In some embodiments, the information used to train the machine learning model may be for data points from two or more kitchen management functions and may allow the trained machine learning model to determine multiple output data points from the same image (e.g., a detectable object and an identifiable action are used to train the machine learning model using the same image).

In some embodiments, subsequent to generating a data set and training, validating, or testing machine learning model 290 using the data set, the machine learning model 290 may be further trained, validated, or tested (e.g., further image data 252 and labels) or adjusted (e.g., adjusting weights associated with input data of the machine learning model 290, such as connection weights in a neural network).

Figure 4B:
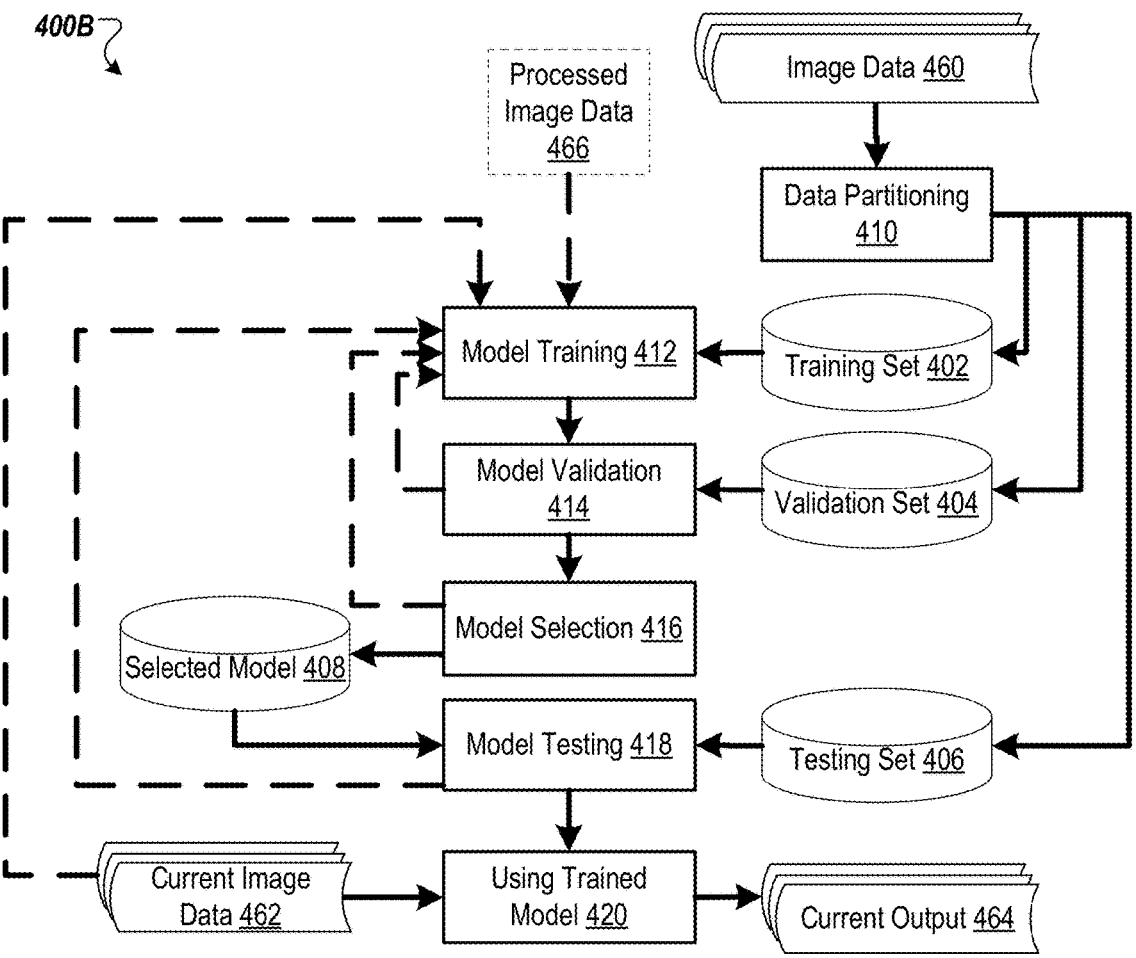
FIG. 4B is a block diagram illustrating determining predictive data, according to certain embodiments.

FIG. 4B is a block diagram illustrating a system 400B for training a machine learning model to generate outputs 464 (e.g., object data 332, pacing data 334, tracking data 336, action data 338, instance segmentation data 340, depth data 342 and/or pose data 344 of FIG. 3), according to certain embodiments. The system 400B may be used to train one or more machine learning models to determine outputs associated with image data (e.g., images acquired using cameras 108A-C).

At block 410, the system (e.g., machine learning system 210 of FIG. 2) performs data partitioning (e.g., via data set generator 272 of server machine 270 of FIG. 1) of the image data 460 (e.g., series of image frame, and in some embodiments outputs 466) to generate the training set 402, validation set 404, and testing set 406. For example, the training set may be 60% of the image data 460, the validation set may be 20% of the image data 460, and the testing set may be 20% of the image data 460. The system 400 may generate a plurality of sets of features for each of the training set, the validation set, and the testing set.

At block 412, the system 400 performs model training (e.g., via training engine 282 of FIG. 2) using the training set 402. The system 400 may train one or multiple machine learning models using multiple sets of training data items (e.g., each including sets of features) of the training set 402 (e.g., a first set of features of the training set 402, a second set of features of the training set 402, etc.). For example, system 400 may train a machine learning model to generate a first trained machine learning model using the first set of features in the training set (e.g., a first camera) and to generate a second trained machine learning model using the second set of features in the training set (e.g., a second camera). The machine learning model(s) may be trained to output one or more other types of predictions, classifications, decisions, and so on. For example, the machine learning model(s) may be trained to perform object detection for particular types of objects found in a restaurant kitchen, to perform tracking of one or more objects found in a kitchen, to determine pacing for food preparation in a kitchen, to identify actions performed in a kitchen, and so on.

In one embodiment, training a machine learning model includes providing an input of a training data item into the machine learning model. The input may include one or more image frames indicative of a state of a kitchen. In some embodiments, the machine learning model receives order data indicative of one or more pending meal orders. The machine learning model processes the input to generate an output. The output may include a prediction, inference, and/or classification associated with a state of the kitchen. For example, the machine learning may output objects and/or actions associated with the one or more image frames. In another example, the machine learning model may output order accuracy data (e.g., associated with order accuracy logic 352), anticipatory preparation data (e.g., associated with anticipatory prep logic 354), operational metrics data (e.g., associated with operational metrics logic 356), drive-thru management data (e.g., associated with operational metrics logic 356), dynamic classification data (e.g., associated with dynamic classification logic 311), object data (e.g., object data 332), tracking data (e.g., tracking data 334), pacing data (e.g., pacing data 336), action data (e.g., action data 338), instance segmentation data (e.g., instance segmentation data 340), depth data (e.g., depth data 342), pose data (e.g., pose data 344). Processing logic then compares the output to one or more labels associated with the input. Processing logic determines an error based on differences between the output and the one or more labels. Processing logic adjusts weights of one or more nodes in the machine learning model based on the error.

Processing logic determines if a stopping criterion is met. If a stopping criterion has not been met, the training process repeats with additional training data items, and another training data item is input into the machine learning model. If a stopping criterion is met, training of the machine learning model is complete.

In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., overlapping regions captured by multiple cameras).

At block 414, the system 400 performs model validation (e.g., via validation engine 284 of FIG. 2) using the validation set 404. The system 400 may validate each of the trained models using a corresponding set of features of the validation set 404. For example, system 400 may validate the first trained machine learning model using the first set of features in the validation set (e.g., image data from a first camera) and the second trained machine learning model using the second set of features in the validation set (e.g., image data from a second camera). In some embodiments, the system 400 may validate hundreds of models (e.g., models with various permutations of features, combinations of models, etc.) generated at block 412. At block 414, the system 400 may determine an accuracy of each of the one or more trained models (e.g., via model validation) and may determine whether one or more of the trained models has an accuracy that meets a threshold accuracy. Responsive to determining that one or more of the trained models has an accuracy that meets a threshold accuracy, flow continues to block 416. In some embodiments, model training at block 412 may occur at a first meal preparation area (e.g., at a first kitchen location) and model validation (block 414) may occur at a second meal preparation area (e.g., at a second kitchen location). For example, training of the one or more machine learning models may occur at a first restaurant location of a franchise chain and validation of the machine learning model may occurs at a second restaurant location of the franchise chain. The layout and footprint of the validation location may be similar to the training location, however, logistical differences (e.g., storage location of items, small layout differences, etc.) may be used to further refine the one or more machine learning models.

At block 418, the system 400 performs model testing (e.g., via testing engine 286 of FIG. 2) using the testing set 406 to test the selected model 408. The system 400 may test, using the first set of features in the testing set (e.g., image data from a first camera), the first trained machine learning model to determine the first trained machine learning model meets a threshold accuracy (e.g., based on the first set of features of the testing set 406). Responsive to accuracy of the selected model 408 not meeting the threshold accuracy (e.g., the selected model 408 is overly fit to the training set 402 and/or validation set 404 and is not applicable to other data sets such as the testing set 406), flow continues to block 412 where the system 400 performs model training (e.g., retraining) using further training data items. Responsive to determining that the selected model 408 has an accuracy that meets a threshold accuracy based on the testing set 406, flow continues to block 420. In at least block 412, the model may learn patterns in the image data 469 to make predictions and in block 418, the system 400 may apply the model on the remaining data (e.g., testing set 406) to test the predictions.

At block 420, system 400 uses the trained model (e.g., selected model 408) to receive current data (e.g., current image data) and receives a current output 464 based on processing of the current image data 462 by the trained model(s) 420.

In some embodiments, outputs 464 corresponding to the current data 462 are received and the model 408 is re-trained based on the current data 462 and the outputs 464.

In some embodiments, one or more operations of the blocks 410-420 may occur in various orders and/or with other operations not presented and described herein. In some embodiments, one or more operations of blocks 410-420 may not be performed. For example, in some embodiments, one or more of data partitioning of block 410, model validation of block 414, model selection of block 416, or model testing of block 418 may not be performed.

Figure 4C:
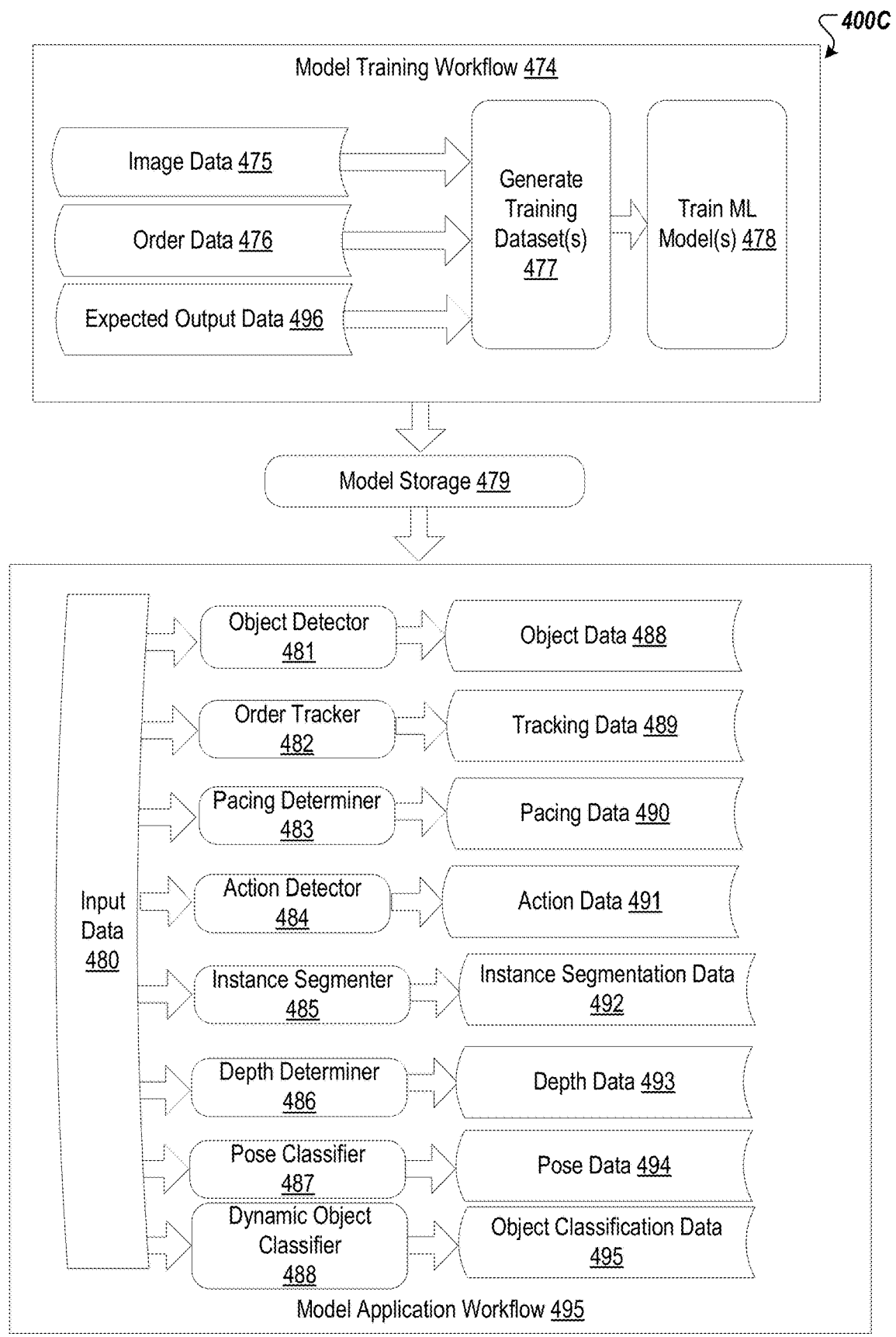
FIG. 4C illustrates a model training workflow and a model application workflow for an image-based kitchen management system, in accordance with an embodiments of the present disclosure.

FIG. 4C illustrates a model training workflow 474 and a model application workflow 495 for an image-based kitchen management system, in accordance with embodiments of the present disclosure. In embodiments, the model training workflow 474 may be performed at a server (e.g., server 116 of FIG. 1) which may or may not include a kitchen management application, and the trained models are provided to a kitchen management application (e.g., on client device 207 or machine learning system 210 of FIG. 2), which may perform the model application workflow 495. The model training workflow 474 and the model application workflow 495 may be performed by processing logic executed by a processor of a computing device. One or more of these workflows 474, 495 may be implemented, for example, by one or more machine learning modules implemented in an image processing tool 234, order accuracy tool 222, anticipatory prep tool 224, operational metrics tool 226, drive-thru management tool 228, dynamic classification subsystem tool 229, and/or other software and/or firmware executing on a processing device as shown in FIG. 2.

The model training workflow 474 is to train one or more machine learning models (e.g., deep learning models) to perform one or more classifying, segmenting, detection, recognition, decision, etc. tasks associated with a kitchen management system (e.g., detecting objects and/or actions, tracking meal preparation items and/or orders, determining pacing or kitchen processes, segmenting image data, determining container depths, etc.). The model application workflow 495 is to apply the one or more trained machine learning models to perform the classifying, segmenting, detection, recognition, determining, etc. tasks for image data (e.g., one or more image frames indicative of a state of a meal preparation area). Various machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting.

In embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained ML model is a single shared neural network that has multiple shared layers and multiple higher level distinct output layers, where each of the output layers outputs a different prediction, classification, identification, etc. The tasks that the one or more trained machine learning models may be trained to perform are as follows:

a. Object detector—The object detector can receive image data (e.g., from data acquisition system 302), and can detect objects found within an image. For example, processing logic may identify objects such as food items (e.g., burgers, fries, beverages), meal packaging, ingredients, employees (e.g. hand, arms, etc.), vehicles (e.g., in the drive-thru queue), cooking equipment (e.g., ovens, utensils, preparation area, counters, machines, etc.), and the like. In some embodiments, the processing logic receives data from a POS (e.g., POS 102 of FIG. 1). The received data from the POS may include data indicative of meals, kitchen items, ingredients, or other data indicative of potential objects to be detected in images by object detection model. Processing logic may output object data (e.g., object data 332). The object data may include information on an identified object as well as location data, employee data, meal data, and/or other identifiable information associated with the detected objects.

b. Order tracker—Processing logic may receive object data (e.g., object data 332, action data (e.g., action data 338), instance segmentation data (e.g., instance segmentation data 340), and/or image data (e.g., from data acquisition system 302). The tracking model may track a detected object over a series of images and identify a current location of an object and/or historical tracking of an object. In some embodiments, the processing logic tracks a status of an order. For example, processing logic may output tracking data that includes an indication of top data or data indicative of the last action associated with an order. Processing logic may combine object data with action data to determine a series of actions associated with an order. For example, order tracker may track a vehicle as the vehicle is routed through a drive-thru area. In another example, the order may track a meal preparation of an order within a meal preparation area.

c. Pacing determiner—Processing logic may receive object data (e.g., object data 332 from object detection model 314) and/or action data (e.g., action data 338 from action recognition model 316). Processing logic may determine pacing of various kitchen tasks associated with detected objects and/or actions. Pacing data time stamps associated with actions including one or more action durations. Pacing data may be aggregated into a broader statistical data such as an average time duration for an associated action. For example, not to be interpreted as an exhaustive list, the following could be pacing actions outputted by the processing logic: prepping dough, placing toppings, loading and/or unloading a pizza to/from an oven, cutting a pizza, refill ingredients, opening a restaurant, prepping sides, hand washing, using POS system, checking temperature, using the cooler/freezer, assembling a product, packaging a product, attending a phone call, processing an order, counting inventory, delivering food to customer, drive-thru queue, and so on.

d. Action determiner—processing logic receives image data as an input and outputs action data (e.g., action data 338). Processing logic identifies actions being performed in association with the received image data. For example, a series of images may show an employee performing an action such as scooping a sauce. Processing logic receives the series of images and identifies the action performed (e.g., scooping the sauce), the location of the action (e.g., a first sauce station), and/or a time data (e.g., a timestamp) associated with the action. Some actions may include scooping an ingredient, placing an ingredient on a burger, filling a drink, placing an item in a toaster or a panini press, packing and/or assembly an item, and so on.

e. Instance segmenter—Processing logic may receive image data (e.g., from the data acquisition system 302 through the feature extractor 312). Processing logic may segment images into discreet boundaries. For example, processing logic may receive an image, identify the boundaries of different ingredient containers (e.g., ingredient containers 112 of FIG. 1), and output the discretized ingredient containers as instance segmentation data. In some embodiments, processing logic may associate various segmented and/or discretized boundaries. For example, processing logic may receive object data that includes a detected hand and/or a detected cooking utensil. In another example, instance segmenter may receive an image, and identify the boundaries of one or more vehicle lanes disposed within a drive-thru area. In a further example, instance segmenter may associate lane through merging location of one or more lane into another lane.

f. Depth determiner—Processing logic identifies individual segmented objects (e.g., individual kitchen containers) from received image data. Process logic may receive sensor data indicative of a detected depth of an image (e.g., an image taken using a LIDAR camera). Processing logic may further receive object specification data (e.g., dimensions of kitchen containers (e.g., length, width, and depth)). From one or more of the described inputs, processing logic may determine the depth and/or fill level of contents of individual containers.

g. Pose classifier—Process logic receives image data and determines a pose of an employee. For example, processing logic may output pose data 344 indicative of locations and/or orientations of employees (e.g., hand, arms, body) and other kitchen equipment (e.g., utensils ovens, counters, etc.). In some embodiments, pose data is indicative of one or more locations of hands of employees in the presence of occlusions. For example, pose data may indicate a location and orientation of an arm that is visible in an image frame and determine the location and/orientation of a hand (e.g., that is not visible in an image frame).

h. Drive-thru object detector (e.g., vehicle or lane detector)—Processing logic can detect vehicles found within an image associated with a drive-thru area. For example, the drive-thru object detector may identify a license plate number, make and/or model of a vehicle, and/or other visual indicators associated with a vehicle. In another embodiments, the object detection model may determine a location of a vehicle based on a location within an image frame and/or based a relative location of other identifiable indicators in an image (e.g., lane marker, building boundaries, order kiosks, drive-thru windows, etc.) Vehicle data may include data indicating a location of a vehicle within a drive-thru area.

i. Order Vehicle Classifier—Order vehicle classifier can receive image data. The order vehicle classifier may determine associations between pending meal orders and vehicles disposed within a drive-thru area. For example, the order vehicle classifier may receive order data and image data to determine a proximity of a vehicle to an order placement location when an ordered is received/entered by a POS system. The associations between vehicles and meal orders may be output as pairing data.

j. Vehicle Tracker—Vehicle tracker can receive image data and track a detected vehicle over a series of images and identify a current location of the vehicles and/or historical tracking of the vehicle. In some embodiments, the vehicle tracker may also track pending meal orders using pairing data that pairs a vehicle with a pending meal order (e.g., at the time of ordering at a kiosk). For example, a vehicle may be tracked (e.g., using the pairing data) and associated with a pending meal order and as a result a meal order may be tracked. The vehicle tracker may track a route of a vehicle through a drive-thru area (e.g., through an order placement area, an order payment area, and an order delivery area).

k. Dynamic object classifier—Dynamic object classifier receives feature characterization of objects that are deemed unclassified (e.g., do not meet threshold classification conditions) such as, for example, new item, temporary items, promotional items, and so forth. The dynamic object classifier may perform a comparison or proximity analysis between feature characterizations of different objects such as identifying clusters of feature characterizations (e.g. feature vectors, visual embeddings) of unclassified objects detected within the meal preparation area. The dynamic object classifier may further use user input, KDS data, and/or POS data to identify a label or object classification for the cluster of unclassified objected detected in the meal preparation area.

In some embodiments, one or more of the above tasks are performed using rule-based logic rather than trained machine learning models. For example, depth determiner may determine depth based on sensor measurements and without the assistance of machine learning. In another example, order tracker may track orders and pacing determine may determine a pacing of orders based on the output of one or more machine learning models, but may not itself be a machine learning model. For example, order tracker may include rules on how to track orders based on received metadata from multiple frames of one or more video feeds.

One type of machine learning model that may be used is an artificial neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In objection detection, for example, the raw input may include one or more image frames indicative of a state of a meal preparation area including one or more meal preparation items; the second layer may compose feature data associated with a meal preparation area (e.g., appliance locations, kitchen floorplan, and/or layout, etc.); the third layer may include one or more meal preparation items a model is expecting to be disposed within the one or more image frames (e.g., one or more meal preparation items identified in one or more pending meal orders). Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, one or more machine learning models is a recurrent neural network (RNN). An RNN is a type of neural network that includes a memory to enable the neural network to capture temporal dependencies. An RNN is able to learn input-output mappings that depend on both a current input and past inputs. The RNN will address past and future received image frames and make predictions based on this continuous processing information. RNNs may be trained using a training dataset to generate a fixed number of outputs (e.g., to detect an amount of objects and/or actions associated with the image frames). One type of RNN that may be used is a long short term memory (LSTM) neural network.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset.

For the model training workflow 474, a training dataset containing hundreds, thousands, tens of thousands, hundreds of thousands, or more image frames (e.g., image data 475) should be used to form a training dataset. In embodiments, the training dataset may also include associated pending meal orders (e.g., order data 476). In embodiments, the training dataset may also include expected output data 496 (e.g., output data 330), for forming a training dataset, where each data point and/or associated output data may include various labels or classifications of one or more types of useful information (e.g., object detection, action detection, pose classification, pacing data, instance segmentation data, and so on). Each case may include, for example, one or more image frames and labels associated with one or more meal preparation items, poses and/or actions. This data may be processed to generate one or multiple training datasets 477 for training of one or more machine learning models. The machine learning models may be trained, for example, to detect objects and/or actions associated with the images, among other things.

In one embodiment, generating one or more training datasets 477 includes receiving one or more image frames indicative of a state of a meal preparation area. The labels that are used may depend on what a particular machine learning model will be trained to do. For example, to train a machine learning model to perform object detection, a training dataset 477 may include data indicative of meal preparation items (e.g., ingredients, appliances, meal preparations stations, etc.).

To effectuate training, processing logic inputs the training dataset(s) 477 into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above. Training may be performed by inputting one or more of the image data 475, order data 476, and expected output data 496 into the machine learning model one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction, and/or output that the machine learning model can produce.

Accordingly, the output may include one or more predictions or inferences. For example, an output prediction or inference may include a detected object associated with one or more image frames. Processing logic may then compare the predicted or inferred output to known labels of the one or more expected output data 496 (e.g., known objects associated with the image frames, known actions associated with the image frames, known outputs associated with the one or more image frames) that was included in the training data item. Processing logic determines an error (i.e., a classification error) based on the differences between the output of a machine learning model and the known classification (e.g., known objects, known actions, known pacing data, known poses, known segmented image data, known order tracking, etc.). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria are met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

As an example, in one embodiment, a machine learning model (e.g., object detector 481, order tracker 482, pacing determiner 483, action detector 484, instance segmenter 485, depth determiner 486, pose classifier 487) is trained to determine output data (e.g., object data 488, tracking data 489, pacing data 490, action data 491, instance segmentation data 492, depth data 493, pose data 494). A similar process may be performed to train machine learning models to perform other tasks such as those set forth above. A set of many (e.g., thousands to millions) image frames (e.g., image frames indicative of a state of a meal preparation area) may be collected and combined with order data (e.g., one or more pending meal orders associated with a current state of the meal preparation area) and expected output data 496 (e.g., known objects, known actions, know order tracking data, know pacing determinations, known segmented image data, known depth data, known pose classifications, etc.).

Once one or more trained machine learning models 478 are generated, they may be stored in model storage 479, and may be added to a kitchen management application (e.g., kitchen management component 118 on server 116 of FIG. 1). Kitchen management application may then use the one or more trained ML models 478 as well as additional processing logic to implement an automatic mode, in which user manual input of information is minimized or even eliminated in some instances.

In one embodiment, the one or more machine learning models are trained using data from one or multiple kitchens, and once trained may be deployed to other kitchens that may be different from those from which the training data was generated. In such an instance, a brief retraining may or may not be performed for one or more of the kitchens to tune the machine learning model for those kitchens. The brief retraining may begin with the trained machine learning model and then use a small additional training data set of data from a specific kitchen to update the training of the machine learning model for that specific kitchen.

In one embodiment, model application workflow 474 includes one or more trained machine learning models that function as one or more of an object detector 481, order tracker 482, pacing determiner 483, action detector 484, instance segmenter 485, depth determiner 486, and/or pose classifier 487. These logics may be implemented as separate machine learning models or as a single combined machine learning model in embodiments. For example, one or more of object detector 481, order tracker 482, pacing determiner 483, action detector 484, instance segmenter 485, depth determiner 486, and/or pose classifier 487 may share one or more layers of a deep neural network. However, each of these logics may include distinct higher level layers of the deep neural network that are trained to generate different types of outputs. The illustrated example is shown with only some of the functionality that is set forth in the list of tasks above for convenience. However, it should be understood that any of the other tasks may also be added to the model application workflow 495.

For model application workflow 495, according to one embodiment, input data 480 may be input into object detector 481, which may include a trained neural network. Based on the input data 480, object detector 481 outputs information (e.g., object data 488) indicative of objects associated with one or more image frames associated with a state of the kitchen. This may include outputting a set of classification probabilities for one or more objects of the object data 488. For example, processing logic may identify objects such as food items (e.g., burgers, fries, beverages), meal packaging, ingredients, employees (e.g. hand, arms, etc.), vehicles (e.g., in the drive-thru queue), cooking equipment (e.g., ovens, utensils, preparation area, counters, machines, etc.), and the like.

For model application workflow 495, according to one embodiment, input data 480 (e.g., one or more outputs of object detector 481 and/or location data associated with the object data 488) may be input into action detector 484, which may include a trained neural network. Based on the input data 480, action detector 484 outputs information (e.g., action data 491) indicative of actions associated with one or more image frames associated with a state of the kitchen. This may include outputting a set of classification probabilities for one or more actions of the action data 491. For example, action detector 484 may output the action performed (e.g., scooping the sauce), the location of the action (e.g., a first sauce station), and/or a time data (e.g., a timestamp) associated with the action. Some actions may include scooping an ingredient, placing an ingredient on a burger, filling a drink, placing an item in a toaster or a panini press, packing and/or assembly an item, and so on.

For model application workflow 495, according to one embodiment, input data 480 (e.g., outputs of one or more object detector 481, action detector 484), may be input into instance segmenter 485, which may include a trained neural network. Based on the input data 480, instance segmenter 485 outputs information (e.g., instance segmentation data 492) indicative of segmented image data of the received one or more image frames indicative of a state of the meal preparation area. For example, instance segmenter 485 may receive an image, identify the boundaries of different ingredient containers (e.g., ingredient containers 112 of FIG. 1), and output the discretized ingredient containers as instance segmentation data. In some embodiments, processing logic may associate various segmented and/or discretized boundaries. For example, instance segmenter 485 may receive object data that includes a detected hand and/or a detected cooking utensil. In another example, instance segmenter 485 may receive an image, and identify the boundaries of one or more vehicle lanes disposed within a drive-thru area. In a further example, instance segmenter 485 may associate lane through merging location of one or more lane into another lane.

For model application workflow 495, according to one embodiment, input data (e.g., ranging data, LIDAR data 480 may be input into depth determiner 486. Based on the input data 480, depth determiner 486 outputs information (e.g., depth data 493) indicative of detected depth of an image (e.g., an image taken using a LIDAR camera). Depth determiner 486 may further receive object specification data (e.g., dimensions of kitchen containers (e.g., length, width, and depth)). From one or more of the described inputs, the depth determiner 486 may determine the depth and/or fill level of contents of individual containers.

For model application workflow 495, according to one embodiment, input data 480 may be input into pose classifier 487, which may include a trained neural network. Based on the input data 480, pose classifier 487 outputs information (e.g., pose data 494) indicative of locations and/or orientations of employees (e.g., hand, arms, body) and other kitchen equipment (e.g., utensils, ovens, counters, etc.) In some embodiments, pose data is indicative of one or more locations of hands of employees in the presence of occlusions. For example, pose data may indicate a location and orientation of an arm that is visible in an image frame and determine the location and/orientation of a hand (e.g., that is not visible in an image frame).

For model application workflow 495, according to one embodiment, input data 480 may be input into order tracker 482. Based on the input data 480 (e.g., one or more outputs of object detector 481, action detect 484, pose classifier 487), order tracker 482 outputs information (e.g., tracking data 489) indicative of one or more order associations, locations, and/or statuses associated with one or more image frames indicative of a state of the kitchen. This may include outputting a set of order tracking classification probabilities for one or more objects of the object data 488. For example, there may be probabilities associated with detected associations, statuses, and/or locations of a currently pending order currently being prepared. For example, processing logic may output tracking data that includes an indication of top data or data indicative of the last action associated with an order. For example, processing logic may combine object data with action data to determine a series of actions associated with an order.

For model application workflow 495, according to one embodiment, input data 480 (e.g., one or more outputs of object detector 481, action detect 484, order tracker 482), may be input into pacing determiner 483. Based on the input data 480, pacing determiner 483 outputs information (e.g., pacing data 490) indicative of a pace of one or more meal preparation procedures. For example, not to be interpreted as an exhaustive list, the following could be pacing actions outputted by the processing logic: prepping dough, placing toppings, loading and/or unloading a pizza to/from an oven, cutting a pizza, refilling ingredients, opening a restaurant, prepping sides, hand washing, using a POS system, checking temperature, using the cooler/freezer, assembling a product, packaging a product, attending a phone call, processing an order, counting inventory, delivering food to customer, drive-thru queue, and so on.

Figure 5A:
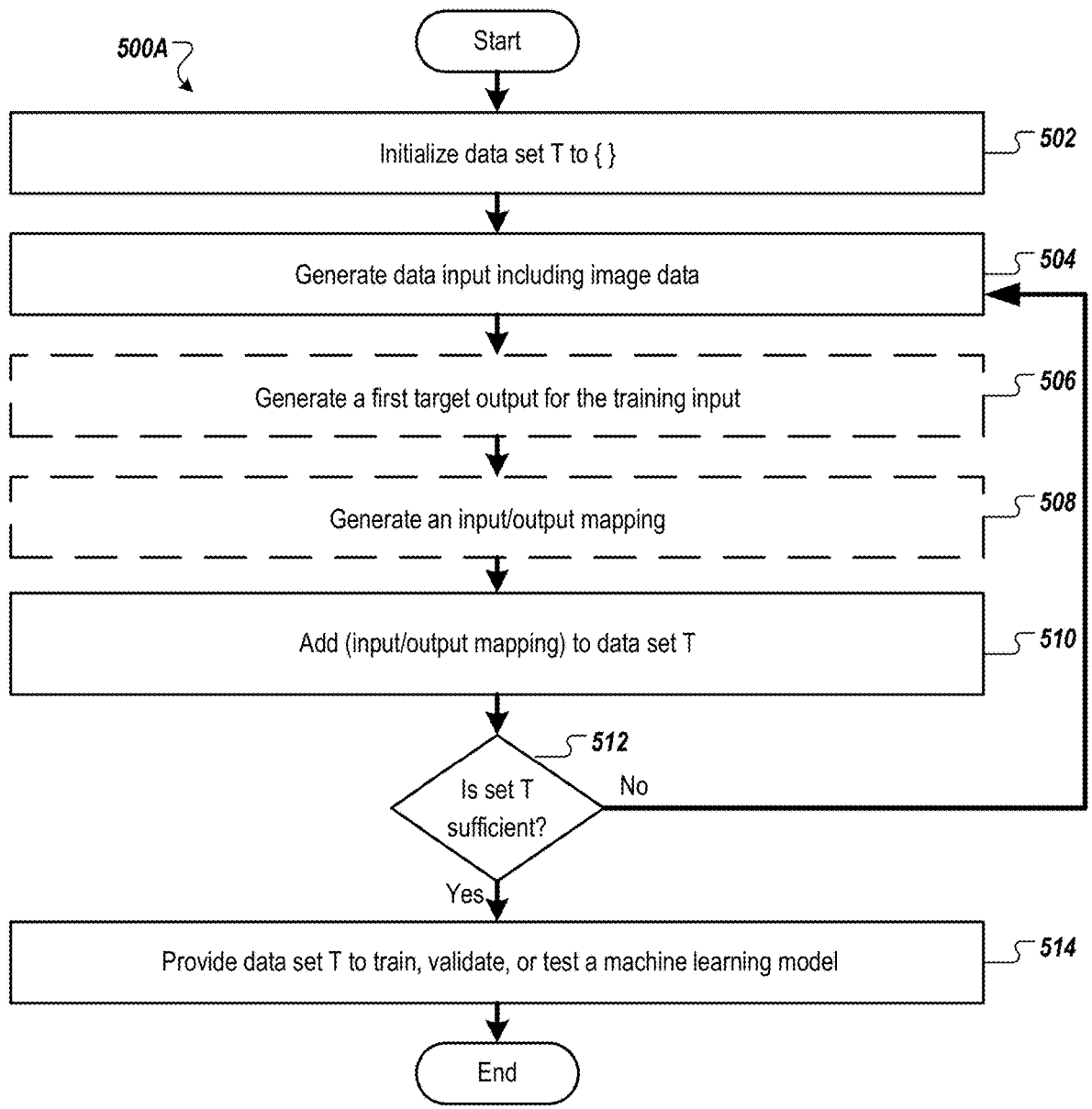
FIGS. 5A-C are flow diagrams of methods associated with processing image-based data, in accordance with some implementations of the present disclosure.
Figure 5B:
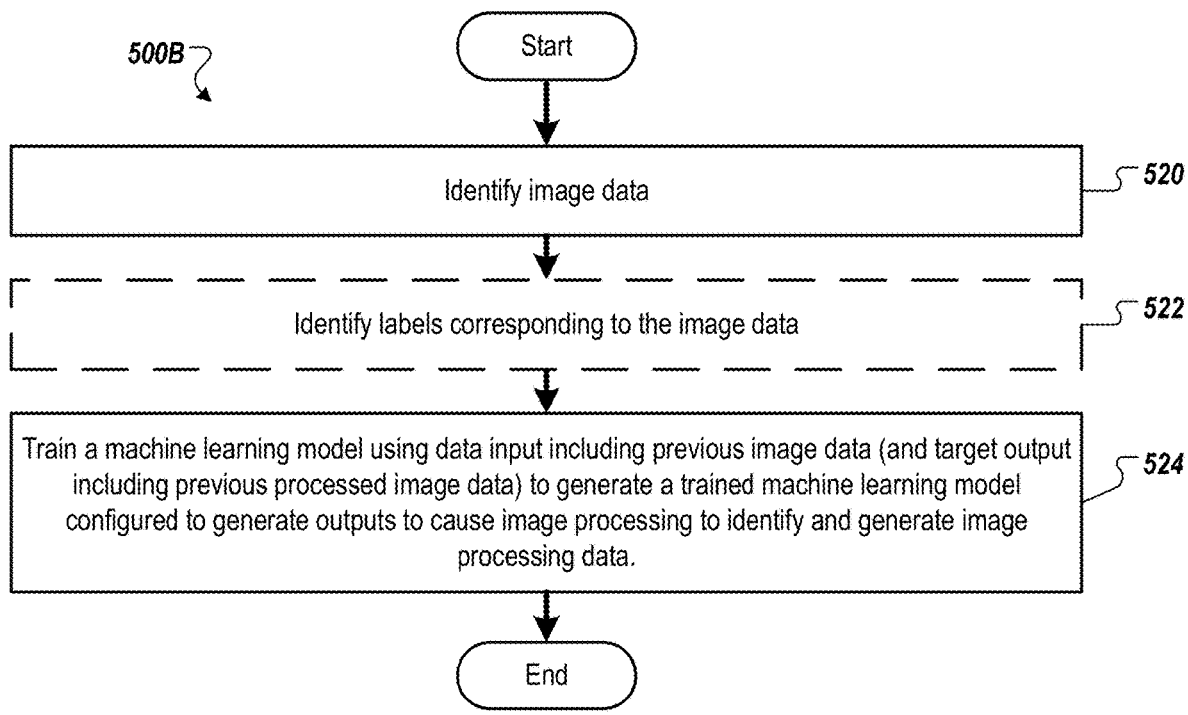
Figure 5C:
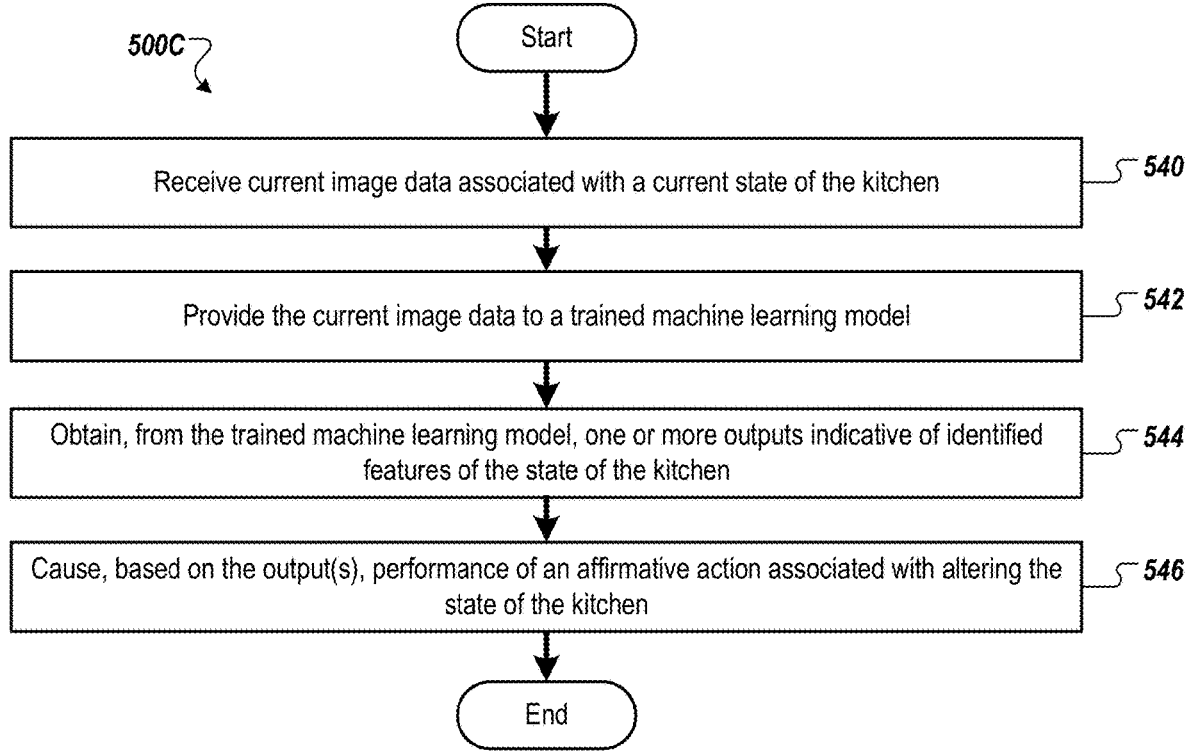

FIG. 5A-C are flow diagrams of methods 500A-C associated with processing image-based data, in accordance with some implementations of the present disclosure. Methods 500A-C may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 500A may be performed, in part, by machine learning system 210 (e.g., server machine 270, data set generator 272, etc.). Machine learning system 210 may use method 500A to at least one of train, validate, or test a machine learning model, in accordance with embodiments of the disclosure. In some embodiments, one or more operations of method 500A may be performed by data set generator 272 of server machine 270 as described with respect to FIGS. 2 and 4A. In some embodiments, methods 500B-C may be performed, in part, by machine learning system 210 (e.g., kitchen management server 212, kitchen management component 214, etc.). Machine learning system 210 may use method 500B to train a machine learning model, in accordance with embodiments of the disclosure. Machine learning system 210 may use method 500C to use a trained machine learning model, in accordance with embodiments of the disclosure. In some embodiments, one or more operations of methods 500B-C may be performed by kitchen management component 214 of kitchen management server 212 as described with respect to FIGS. 2 and 4B. It may be noted that components described with respect to one or more of FIGS. 1, 2, 3, 4A-B may be used to illustrate aspects of FIGS. 5A-C. In some embodiments, a non-transitory storage medium stores instructions that when executed by a processing device (e.g., of machine learning system 210) cause the processing device to perform methods 500A-C.

For simplicity of explanation, methods 500A-C are depicted and described as a series of acts. However, acts in accordance with this disclosure can occur in various orders concurrently, in parallel with multiple instances per store, and/or with other acts not presented and described herein. Furthermore, not all illustrated acts may be performed to implement the methods 500A-C in accordance with the disclosed subject matter. In addition, those skilled in the art will understand and appreciate that the methods 500A-C could alternatively be represented as a series of interrelated states via a state diagram or events.

Referring to FIG. 5A, method 500A is associated with generating a data set for a machine learning model for processing images to generate outputs 330.

At block 502, the processing logic implementing method 500A initializes a training set T to an empty set.

At block 504, processing logic generates first data input (e.g., first training input, first validating input) that includes image data (e.g., image frames captured using cameras 108A-C).

In some embodiments, at block 506, processing logic generates a first target output for one or more of the data inputs (e.g., first data input). The first target output may be, for example, object data 332, pacing data 334, tracking data 336, action data 338, etc. The processing logic may generate the target output based on the image data 252.

At block 508, processing logic optionally generates mapping data that is indicative of an input/output mapping. The input/output mapping (or mapping data) may refer to the data input (e.g., one or more of the data inputs described herein), the target output for the data input (e.g., where the target output identifies output data 264), and an association between the data input(s) and the target output. Processing logic may perform gradient descent and back propagation to update weights for nodes at one or more layers of a machine learning model, for example.

At block 510, processing logic adds the data input generated at block 504 and/or the mapping data generated at block 508 to data set T.

At block 512, processing logic branches based on whether data set T is sufficient for at least one of training, validating, and/or testing machine learning model 290. If so, execution proceeds to block 514, otherwise, execution continues back at block 504. In some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 514, processing logic provides data set T (e.g., to server machine 280) to train, validate, and/or test machine learning model 290. In some embodiments, data set T is a training set and is provided to training engine 282 of server machine 280 to perform the training. In some embodiments, data set T is a validation set and is provided to validation engine 284 of server machine 280 to perform the validating. In some embodiments, data set T is a testing set and is provided to testing engine 286 of server machine 280 to perform the testing. In the case of a neural network, for example, input values of a given input/output mapping (e.g., numerical values associated with data inputs 401) are input to the neural network, and output values (e.g., numerical values associated with target outputs 403) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 514, machine learning model (e.g., machine learning model 290) can be at least one of trained using training engine 282 of server machine 280, validated using validating engine 284 of server machine 280, or tested using testing engine 286 of server machine 280. The trained machine learning model may be implemented by kitchen management component 214 (of kitchen management server 212) to generate output data 330 for further use by kitchen management procedures (e.g., order accuracy tool 222, anticipatory preparation tool 224, operational metrics tool 226, drive-thru management tool 228, and/or limited time offer tool 229.

Referring to FIG. 5B, method 500B is associated with training a machine learning model for processing images to generate outputs (e.g., ML model outputs 264) that are actionable by a kitchen management component.

At block 520, processing logic identifies image data associated with a state of a kitchen. The image data may be acquired through cameras (e.g., cameras 108A-C). The sets of image data (e.g. image data 252) may be historical data corresponding images indicative of a past or previous state of the kitchen.

In some embodiments, at block 522, processing logic identifies labels corresponding to the image data. In some embodiments, the labels indicate object data (e.g., detected object in the image), pacing data (e.g., paces of action, recipes, food preparation steps, etc.), tracking data (e.g., tracking order through multiple images), location data (e.g., where a detected object or action is taking place), depth data (e.g., amount of ingredient left in a bin), and/or top data (e.g., the last action to be performed on a recipe).

At block 524, processing logic trains a machine learning model using data input including the image data (e.g., and target output including the labels) to generate a trained machine learning model configured to generate outputs (e.g., kitchen state data) that can be consumed by kitchen management application and/or tools.

In some embodiments, the machine learning model is trained based on data input (e.g., without target output) to generate a trained machine learning model using unsupervised learning (e.g., to cluster data). In some embodiments, the machine learning model is trained based on data input and target output to generate a trained machine learning model using supervised learning.

Referring to FIG. 5C, method 500C is associated with using a machine learning model for processing images to generate outputs (e.g., ML model outputs 264) that are actionable by a kitchen management component.

At block 540, processing logic receives current data. In some embodiments, the current data is image data associated with a current state of the kitchen and/or drive-thru. In some embodiments, the current data images including LIDAR data. The current data may include current frames of video captured by one or more cameras of a kitchen, for example.

At block 542, processing logic provides the current data (e.g., image data) to a trained machine learning model. The trained machine learning model may be trained by method 500B.

At block 544, processing logic obtains, from the trained machine learning model, one or more outputs. In some embodiments, the outputs include object data (e.g., object data 332), pacing data (e.g., pacing data 334), tracking data (e.g., tracking data 336), action data (e.g., action data 338), instance segmentation data (e.g., instance segmentation data 340), depth data (e.g., depth data 342), and/or pose data (e.g., pose data 344). At block 546, processing logic sends the generated outputs to an associated kitchen management subsystem. For example, processing logic may send the outputs to one of an order accuracy tool 222, anticipatory prep tool 224, operational metrics tool 226, drive-thru management tool 228, and/or limited time offer tool 229 as described in FIG. 2.

Figure 6:
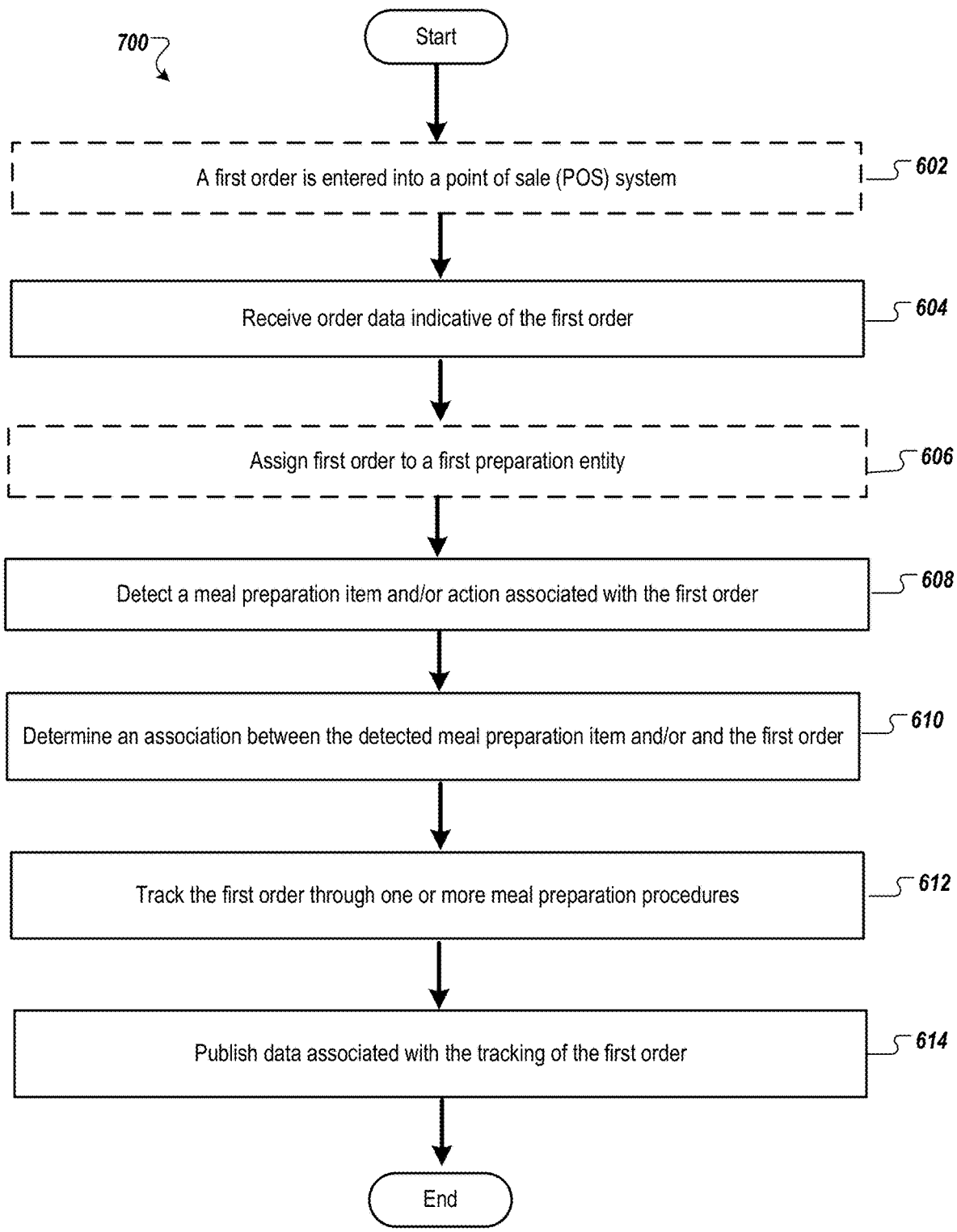
FIG. 6 depicts a flow diagram of one example method for assembly of an order throughout one or more meal preparation procedure, in accordance with some implementations of the present disclosure.

FIG. 6 depicts a flow diagram of one example method 600 for assembly of an order throughout one or more meal preparation procedures, in accordance with some implementations of the present disclosure. Method 600 is performed by processing logic that may comprise hardware (circuitry, dedicated logic, etc.), software (such as is run on a general purpose computer system or a dedicated machine), or any combination thereof. In one implementation, the method is performed using image processing tool 310 (e.g., tracking model 324) and/or kitchen management tool 350 (e.g., order accuracy tool 222, order accuracy logic 352) of FIG. 3, while in some other implementations, one or more blocks of FIG. 6 may be performed by one or more other machines not depicted in the figures.

At block 602, a first order is, optionally, entered into a point of sale (POS) system. The POS system may include one or more features and/or descriptions associated with POS system 102 and/or data integration system 202 of FIG. 1 and FIG. 2, respectively. In some embodiments, the first order is entered into the POS system by an employee interface (e.g., a register with POS interface capabilities).

For example, order may be received in a lobby of a restaurant. In another example, order may be received through at a drive-thru. In some embodiments, the first order may be received electronically from a location a distance away from an associated restaurant.

At block 604, processing logic may receive order data indicative of the first order. The order data may include a list of one or more meal components to prepare and/or one or more meal preparation procedures to perform to complete the first order. In some embodiments, processing logic is integrated with a kitchen display system (KDS). For example, the first order may be displayed on the KDS, responsive to receiving the data indicative of the first order.

At block 606, processing logic, optionally, may assign the first order to a first preparation entity. The meal preparation area may operate with a one-to-one relationship between orders and meal preparation areas. For example, an order may be received and proceed through an assembly line of procedures before being completed where each order is filled sequentially one after another. The first order may be assigned to a first meal preparation station and/or meal preparation order and may be reassigned to another preparation entity and upon processing logic detecting completion of one or more meal preparation procedures. For example, the order may be presented to a first preparation station where a first meal preparation procedure is performed (e.g., preparing pizza dough), and then transferred to a second preparation station where a second meal preparation procedure is performed. In some embodiments, the POS may provide data to a kitchen display indicating information associated with an order. For example, the POS may indicate an order number and the contents of the order to the KDS.

In some embodiments, one or more actions may be detected. Processing logic may determine compound actions based on detecting the one or more actions. For example, processing may track a hand and detect the hand picking up an ingredient, tracking the hand, and then detecting the hand putting down the ingredient. Processing logic may string the action together and determine a compound action of relocating the ingredient from a first location to a second location. The series of multiple frame may occur across multiple image frames. For example, Pose data (e.g., pose data 344) may include data indicative of a pose of an employee. Pose data may include poses and/or gestures of people and/or their body parts, such as hands in specific positions associated with certain actions. Pose data may include an indication of the location and current position of a hand of the employee. For example, pose data may be associated with an action being performed (e.g., an employee scooping a first ingredient).

At block 608, processing logic may detect a meal preparation item or action associated with the first order. Processing logic may detect a first meal preparation item (e.g., pizza dough). Processing logic may detect movement of a meal preparation item to another meal preparation station and/or proximity to employee to perform a second meal preparation procedure (e.g., applying toppings to the pizza dough).

At block 610, processing logic may determine an association between the detected meal preparation item and/or action and the first order. Processing logic may associate an order with a preparation entity (e.g., an employee, preparation station) with the detected meal preparation item and/or action. For example, an employee proximate the detected meal item may be associated with preparing the first order (e.g., an employee who is actively contacting pizza dough may be associated with preparing an order associated with the instance of pizza dough).

In some embodiments, a state of the kitchen may include having more than one pending meal order. Orders may be assigned as they come in and newly detected objects may be compared against one or more pending meal order that have not been assigned to one or more meal preparation items, stations, and/or employees. For example, a state of the kitchen may include 6 pending meal orders currently being prepared. Processing logic can determine based on what meal preparation items have left the meal preparation area (e.g., delivered to a customer), whether one or more of the pending meal orders has been fulfilled. Based on the orders that remain unfulfilled, a detected meal preparation item or action may be associated with one or more of the unfulfilled pending meal orders.

In some embodiments, matching a detected meal preparation item and/or meal preparation action may include comparing a set of components of a first order to the detected meal preparation item. One of the set of components of the first order may have been associated with a previously prepared meal preparation item. For example, a hamburger may be detected. Another hamburger may have previously detected and assigned to a first order. The hamburger may be assigned to a second order based on the first order already assigned the first hamburger. In some embodiments, a distance algorithm (Euclidean distance, Cosine distance, etc.) may be used with data (metadata, embedded feature vectors, etc.) indicative of one or more detected meal preparation items and/or meal preparation actions to determine a proximity between the one or more detected meal preparation items and/or meal preparation actions. Processing logic may assign an order most proximate (e.g., feature vectors determined to be closest) to the one or more detected meal preparation items and/or actions.

In some embodiments, orders are assigned during the assembly of the one or more components at the end of the one or more meal preparation procedures. For example, at the conclusion of meal preparation the one or more meal components are assembled (e.g., packaged in a common container (e.g., bag)). As will be discussed in later embodiments, processing logic may compare an order prepped for delivery (e.g., at a bagging area where components of an order are compiled together in a bag) with a list of pending meal orders to determine one or more errors in the completed order. For example, processing logic may determine an absence of a meal preparation item based on a comparison between a detected meal prepped for delivery and the one or more pending meal orders.

In some embodiments, it may be determined from image data that an order (or subset of an order) is completed. Processing logic may compare the completed order (or subset of the order) against order data and determine whether the completed order (or subset of the order) is identified with one or more of the pending order of the order data. For example, processing logic may determine an employee is packaging a cheeseburger. For example, processing logic may search the order data and determine whether a cheeseburger is found within one of the pending meal orders. As will be discussed further in association with FIG. 8, processing logic may determine a meal preparation error, for example, by failing to identify a cheeseburger within the pending meal orders. For example, a field of view of a camera may include a food delivery area to a drive-thru. An order may be tracked as components are placed into a bag. Processing logic can track which items are placed in the bag and track the bag as it is delivered to a customer. Processing logic can determine errors associated with food delivery. The items associated with each bag may be accounted for as the one or more bags are delivered to a customer within a vehicle. Processing logic may detect a customer leaving and indicate one or more meal preparation items that were missing from the delivered meal.

At block 612, processing logic tracks the first order through one or more meal preparation procedures. Processing logic may continue to track the pending meal order through a meal preparation area by detecting relocation of one or more meal preparation items associated with the first order and detecting further meal preparation procedures (e.g., cooking the pizza, boxing the pizza, delivering the pizza, etc.).

In some embodiments, tracking of meals within the restaurant occurs frame by frame as the one or more meal preparation items relocate within the meal preparation area. Alternatively or additionally, meals may be tracked based on predicted actions to be performed. Processing logic may predict a time duration a meal preparation item may be occluded from a view of a camera. Processing logic may predict a future location of a meal preparation item. For example, a current meal may include instructions to cook a first item for a first duration and processing logic may predict the first item may be disposed proximate a cooking appliance. In a further example, processing logic may infer that first item may be occluded from the view of the camera when placed inside the cooking appliance. Processing logic may also determine a future location of the first item after cooking is completed (e.g., a pizza oven may have a first location to input the item and a second location to output the item). Processing logic may infer the absence of object detections of the first item for a duration and may infer the present of object detections of the first item a second location (e.g., output from the oven).

In some embodiments, processing logic tracks a "top" action and/or meal preparation item. A "top" item/action may indicate the meal preparation item and/or meal preparation action most recently associated with a meal being prepared. Often the top meal preparation item is located on top of a meal currently being prepared. For example, an employee may add a hamburger to a bun. The hamburger may be the top meal preparation item. An employee may add tomato to the burger. The tomato may then be the top meal preparation item. The top meal item may be tracked over the course of preparing a meal order to determine any meal preparation errors. In some embodiments, preparing one or more pending meal orders may include performing actions in a specific order. Tracking what action and/or meal item on top allows for processing logic to determine meal preparation errors associated with ordering of meal preparation steps.

In some embodiments, processing logic tracks an order based on actions associated with pose data (e.g., pose data 344 of FIG. 3). As previously described, pose data may include detecting the location of hands and meal preparation tools (e.g., scooping utensil) and making associations between the detected hands and meal preparation tools. In some embodiments, processing logic may determine a meal preparation tool (e.g., a serving utensil, a meal delivery tool, etc.) based on the image data. For example, a serving spoon may be identified. Processing logic may determine an association between one or more pending meal order and a preparation entity. For example, based on the image data, processing logic may determine an association between a serving spoon and a first employee responsive to detecting a proximity between the employee and the serving spoon (e.g., the employee is hold the serving spoon).

Processing logic may determine an association between a meal preparation item or meal preparation action and the preparation entity. For example, the employee may scoop a first ingredient into a bowl associated with a meal order. The employee may then be associated with preparing the meal order. Processing logic may assign or otherwise associate the employee with the meal order.

In some embodiments, processing logic tracks a list of ingredients and some metadata about those ingredients. The metadata may include actions and timestamps associated with the list of ingredients. For example, the metadata may include a location of where the ingredient was added and a timestamp when they were added to a meal being prepared. Metadata may also indicate a state of the ingredient. For example, an ingredient may be occluded (e.g., the ingredient is packaged or placed in a bag). The metadata may include instructions for processing logic to continue tracking an object when an ingredient changes state (e.g., placed into a bag).

At block 614, processing logic may publish data associated with the tracking of the first order. The published data may be used by one or more kitchen management processes. For example, order accuracy logic (e.g., order accuracy logic 352 of FIG. 3), anticipatory prep logic (e.g., anticipatory prep logic 354 of FIG. 3), operational metrics logic (e.g., operational metrics logic 356 of FIG. 3), drive-thru management logic 358 of FIG. 3), and/or dynamic classification logic 311 (e.g., dynamic classification logic 311 360 of FIG. 3) may utilize the published order tracking data.

The data may include a list of ingredients, actions, timestamps, and/or other information associated with an order. The data may be used by pacing logic (e.g., pacing model 334 or method 700 of FIG. 7) to further determine pacing data (e.g., pacing data 322) based on the published data. For example, the published data may include a tabulation of all actions that were performed on an order at different time and which objects were detected for that order at different times. The published data may also include data indicative of identified image frames and locations within the image frames where detections (e.g., actions, objects, etc.) occurred (e.g., pixel locations). The data may include instructions for a display device to highlight or otherwise indicate where detections are being made on one or more image frames.

In some embodiments the published data can be accessible by an endpoint device such as a client device (e.g., client device 207 of FIG. 2) or kitchen display system (e.g., KDS 104 of FIG. 1). An endpoint device can receive a video feed for one or more particular orders. For example, a particular order may be requested (e.g., order number 'x' on a given day). The published data may include image data (e.g., a video stream) of the detections made by the processing logic over the course of preparing that particular meal. The published data may include a list of timestamps that are associated with that particular order. The image data may include a segmented video stream with image data spliced together of the timestamps where one or more detections are made by the processing logic.

Figure 7:
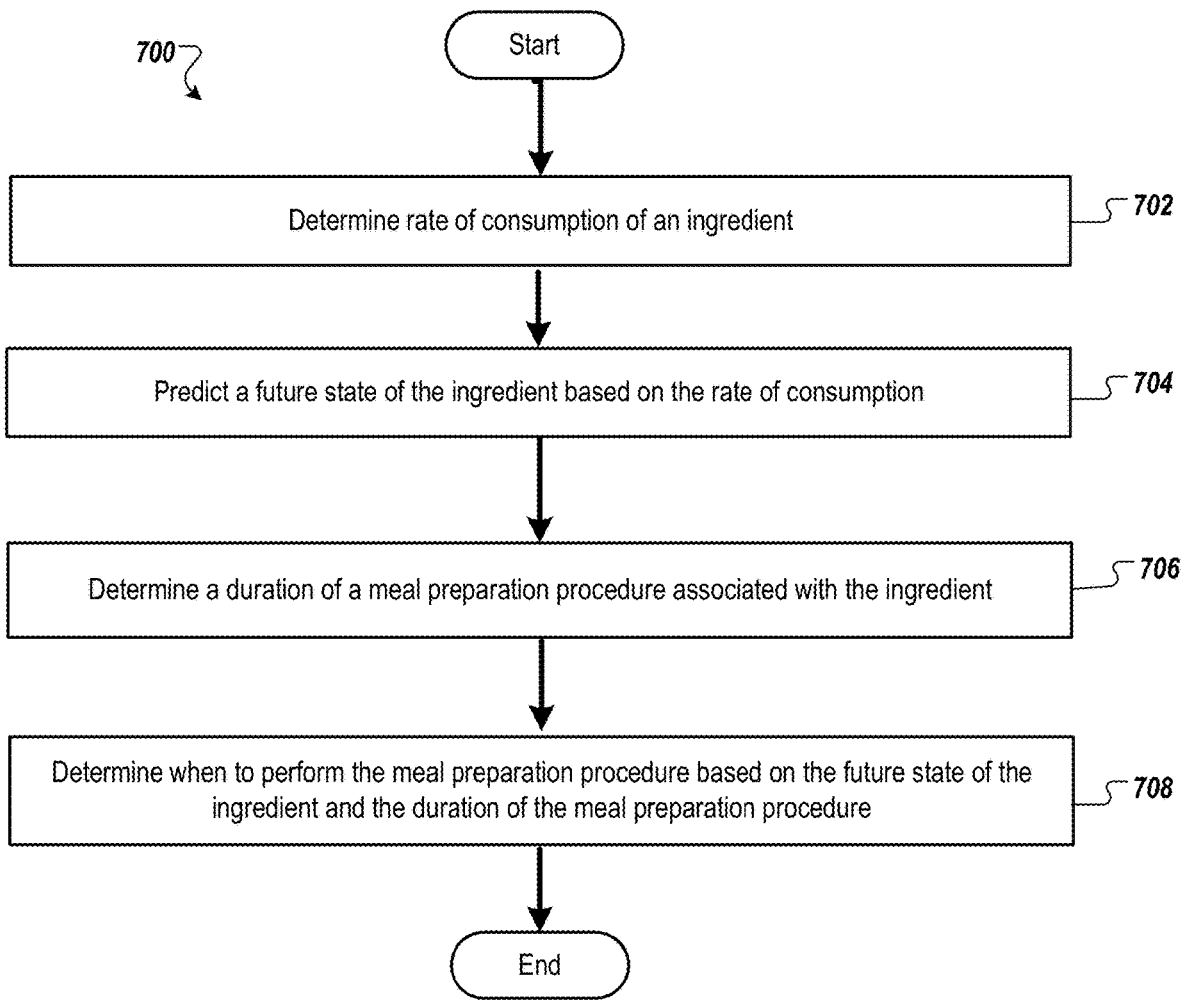
FIG. 7 depicts a flow diagram of one example method for processing one or more image data to determine pacing data, in accordance with some implementations of the present disclosure.

FIG. 7 depicts a flow diagram of one example method 700 for processing one or more image data to determine pacing data, in accordance with some implementations of the present disclosure. Method 700 may be performed by processing logic that may comprise hardware (circuitry, dedicated logic, etc.), software (such as is run on a general purpose computer system or a dedicated machine), or any combination thereof. In one implementation, the method is performed using image processing tool 310 (e.g., pacing model 322) and/or kitchen management system 220 (e.g., order accuracy tool 222, anticipatory prep tool 224, operational metrics tool 226, drive-thru management tool 228) of FIG. 3 and FIG. 2, respectively, while in some other implementations, one or more blocks of FIG. 7 may be performed by one or more other machines not depicted in the figures.

At block 702, processing logic may determine a rate of consumption of an ingredient. In some embodiments the rate of consumption includes an inventory forecast over an upcoming time duration. Processing logic may receive a current quantity of the ingredient. For example, methodology associated with FIGS. 9 and 12 may be used to determine a volume of an ingredient with the bin and determine an overall quantity of an ingredient. Processing logic may use a historical rate of change of the ingredient to determine the rate of consumption of the ingredient. For example, process logic may receive past image frames and determine actions associated with the ingredient and how much of an ingredient is being used with each action.

In some embodiments, customer flow data may be received by processing logic and used to determine the rate of consumption of the ingredient. For example, processing logic may determine an average consumption of the ingredient per order (e.g., 70% of orders order a meal item with the first ingredient, or on average 1.2 units of the first ingredient are consumed per order) and predict using customer flow data (e.g., amount of people and/or cars entering an order placement area) how many upcoming orders are expected over an upcoming time duration. In some embodiments, image data including one or more image frames indicative of a quantity of cars in the drive-thru or order queue line may be leveraged to determine the customer flow data.

At block 704, processing logic may predict a future state of the ingredient based on the rate of consumption. The future state may be indicative of consuming a first prepared ingredient. The first ingredient may include one or more preparation steps. For example, fries may need to be cut, cooked, salted and the future state may be associated with the consumption of the prepared fries. The future state may be indicative of the consumption of a first ingredient within a first container. For example, a first container may include a condiment that whose quantity within the first container is consumed. The condiment may or may not require additional preparation steps to replace an inventory of the condiment disposed within the first container. The future state of the ingredient may be associated with an expiration or a time duration associated with a time of use deadline. For example, after a predicted time, a first ingredient should be replaced to prevent expiration of the ingredient.

At block 706, processing logic may determine a duration of a meal preparation procedure associated with the ingredient. As previously described, image data may be received and processing logic may detect one or more action outputs from one or more image frames. The one or more action outputs may be associated with a start and/or end time of an action. The start and end time of an action may be indicative of how long an action has occurred. Processing logic may query multiple image frames to determine an average action duration. The average action duration may take into account the state of the kitchen or a predicted future state of the kitchen. For example, processing logic may determine a number of employees currently available to perform the action, resource commitments to other actions (e.g., an oven being used by another meal preparation procedure), an inventory forecast (e.g., a quantity of available resources or a prediction of a future quantity of an available resource), prerequisite actions (e.g., a pan must first be cleaned to be used to cook an ingredient, chicken must be battered before cooked). In some embodiments, the duration of the meal preparation action is a time duration for a compound action (e.g., an action requiring multiple steps).

In some embodiments, the meal preparation procedure may include preparing a meal preparation tool associated with the ingredient. For example, preheating an oven, cleaning equipment, preparing secondary ingredients, and so on is associated with the meal preparation procedure and may be attributed to a portion of the duration of the meal preparation procedure.

At block 708, processing logic may determine when to perform the meal preparation procedure based on the future state of the ingredient and the duration of the meal preparation procedure. In some embodiments, the meal preparation procedure is displayed on a graphical user interface (GUI). For example, processing logic may determine that the preparation of a first quantity of fries should be initiated within a future time window (e.g., 5-10 minutes). The instruction to initiate preparation of the French fried may be displayed on a KDS (e.g., KDS 104 of FIG. 1).

In some embodiments, pacing data (e.g., a duration of a meal preparation procedure determined at block 706) may be used in associated with order tracking methodology (e.g., method 600 of FIG. 6) to determine pacing data associated with one or more orders as they are assembled. A time duration of one or more steps of order preparation may be tabulated and aggregated into pacing data associated with an example. For example, a time duration for making a hamburger from start to finish may be aggregated by adding up the action times of the individual steps. For example, metadata stored in association with an order may store and aggregate pacing data (e.g., timestamps of actions performed, list of meal preparation steps, etc.).

In some embodiments, pacing data may be used to perform inventory forecasting for an operational duration of the kitchen. For example, processing logic may determine a number of bins of a first ingredient to prepare at the beginning of a day. Processing logic may determine whether the inventory prepared in the morning will last the entirety of the day and if more inventory of the first ingredient needs to be prepared. Processing logic may predict a future time associated with the first ingredient being consumed and a future time in which a meal preparation action should be performed to maintain an active prepared inventory of the first ingredient throughout the day. In some embodiments, the inventory forecasting determined by the processing device may be based on macroscopic changes in the inventory (e.g., a rate of inventory consumption through a minimum threshold window). For example, sudden changes in inventory over a smaller window of time (e.g., microscopic) inventory change may be calculated with many small windows of time to get an average macroscopic inventory rate of consumption.

In some embodiments, processing logic publishes pacing data (e.g., one or more action durations, rate of consumptions, meal preparation time durations, etc.) for other processing logic to utilize. In some embodiments, the pacing data may include data associated with a testing pacing of various meal preparation actions and can be sorted and organized associated with an employee, an action, a meal item, etc. An endpoint may access the pacing data and/or query the pacing data using one or more of these pacing data associations. For example, the pacing data may be filtered by pacing of actions performed by a first employee, actions performed at a first preparation station, actions performed in associated with a specific order, among other filtering limitations. In some embodiments, the pacing data may be aggregated from many actions to provide a broader statistical representation of one or more meal preparation actions associated with the kitchen. For example, a time duration between filling sequential orders of orders within a requested time period may be accessed. In another example, the pacing analytics can be filtered more granularly. Pacing data for a specific action (e.g., scooping the chicken and/or sprinkling the lettuce) may be determined for the orders that occurred within the requested time period. The pacing data may be filtered and aggregated to form data selected flexible data analytics associated with the state of the kitchen as various timestamps throughout operation.

In some embodiments, process logic may associate the pacing data with financial data. Processing logic may determine a financial cost associated with one or more meal preparation actions durations. For example, an action duration may be compared with one or more of an employee hourly rate, inventory cost, equipment operation costs, and/ or the like in determining a cost to perform an action. Processing logic may determine one or more revenue and profits determinations associated with one or more meal preparation actions based on an aggregation of financial costs of individual actions (e.g., determining a first action costs x amount of money based on determining the time is takes and the employee hourly cost). Pacing data associated with one or more meal preparation items may be indicative of one or more meal preparation dependencies. For example, pacing data of one or more action steps may be indicative of a bottleneck associated with one or more meal preparation items and/or actions. A set of actions may be delayed based on equipment limitations (e.g., awaiting an oven to be available), and/or ingredient preparation instructions (e.g., topping a pizza is delayed due to awaiting the ingredients to be prepped to top the pizza, and the like).

Figure 8:
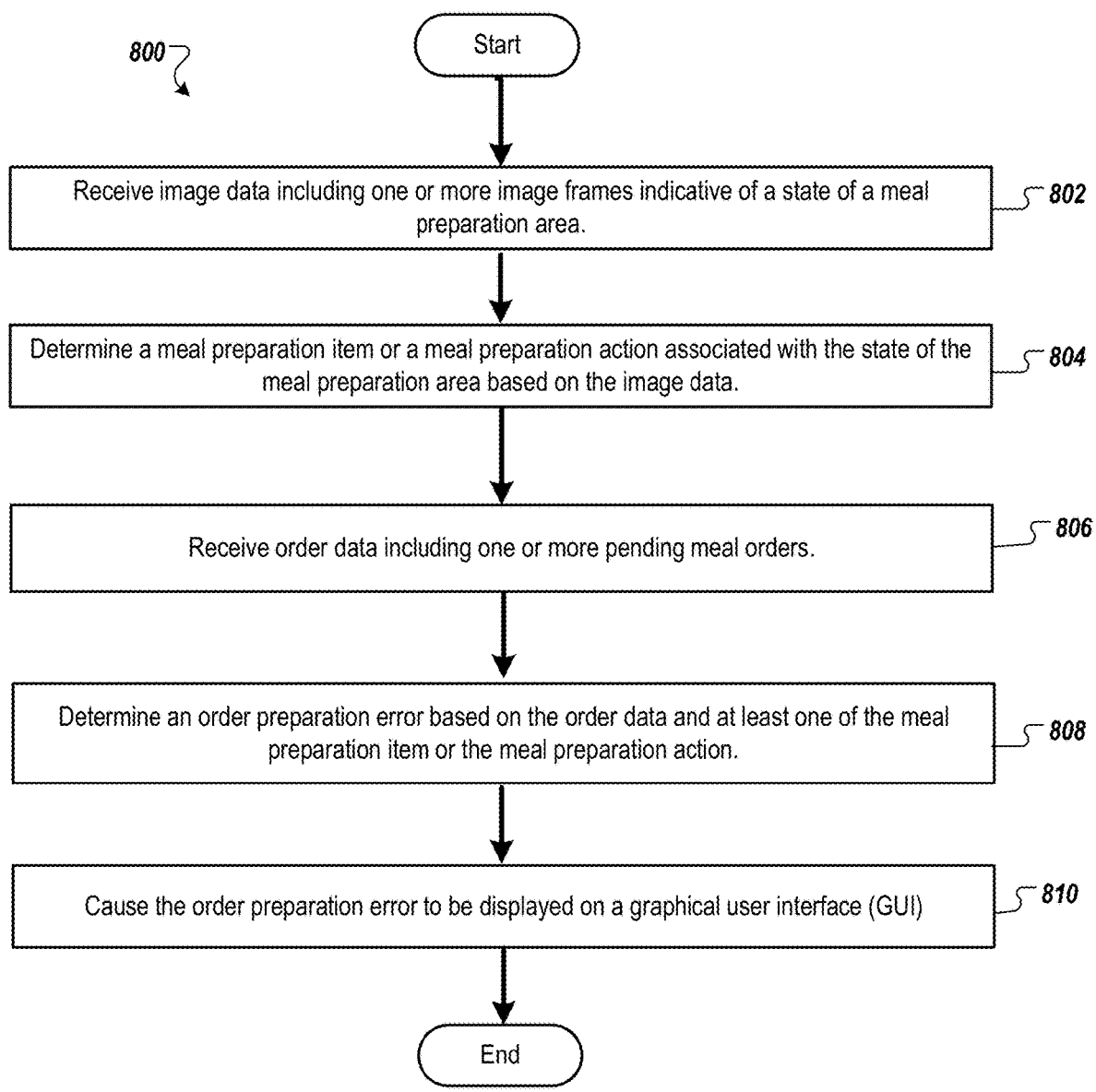
FIG. 8 depicts a flow diagram of one example method for processing image data to determine an order preparation error, in accordance with some implementations of the present disclosure.

FIG. 8 depicts a flow diagram of one example method 800 for processing image data to determine an order preparation error, in accordance with some implementations of the present disclosure. Method 800 is performed by processing logic that may comprise hardware (circuitry, dedicated logic, etc.), software (such as is run on a general purpose computer system or a dedicated machine), or any combination thereof. In one implementation, the method is performed using kitchen management tool 350 (e.g., order accuracy tool 222, order accuracy logic 352) of FIG. 3, while in some other implementations, one or more blocks of FIG. 8 may be performed by one or more other machines not depicted in the figures.

Method 800 may include receiving image data (e.g., through data acquisition system 230 of FIG. 2) associated with a state of a meal preparation area and processing the image data to determine a meal preparation item or meal preparation action associated with the image data. The determined meal preparation item or meal preparation action is further used with order data (e.g., a list of pending meal orders) to determine an order preparation error.

At block 802, image data including one or more image frames indicative of a state of a meal preparation is received. As described in association with other embodiments, the image data may include one or more image frames captures by one or more cameras disposed at or proximate to a meal preparation area. For example, one or more cameras may be disposed at an elevated location (e.g., ceiling) and orientated to capture image frames of a meal being prepared in a meal preparation area (e.g., kitchen). The one or more image frames of the image data may be sequential image frames taken by the same camera with a similar point of view. In some embodiments, the images data may include one or more non sequential image frames (e.g., images taken earlier or later). In some embodiments, the image data may include one or more image frames captured by different cameras with different points of view of a meal preparation area (e.g., simultaneously or at different times). For example, one camera may be positioned in a drive-thru area while another camera may be positioned at an ingredient preparation area.

At block 804, processing logic determines at least one of a meal preparation item or a meal preparation action associated with the state of the meal preparation area based on the image data. The image data may include various image frames of a state of the meal preparation area. In some embodiments, the image frames may include multiple meal preparation items (e.g., ingredients, packaging, kitchen appliances, storage containers, and so on) within the captured images. In some embodiments, the image frame may capture actions performed within the kitchen (e.g., scooping an ingredient, cooking an ingredient, packaging an ingredient, delivering a prepared meal, etc.). The image data may be processed (e.g., using image processing tool 310) to determine objects, recognize actions, and track orders, among other things.

In some embodiments, image data is used as input to one or more trained machine learning models. The machine learning model(s) may be trained to receive the image data and generate one or more outputs. The one or more outputs may be indicative of a meal preparation item and/or a meal preparation action. For example, one or more image frames indicative of a state of a kitchen may be received by the one or more trained machine learning model. The trained machine learning model(s) may each generate an output indicating a detected ingredient (e.g., a hamburger, fries, a drink, etc.) and/or that an action is being performed (e.g., cooking a hamburger, salting fries, filling a drink, etc.). The detected meal preparation item and/or meal preparation action may be associated with one or more pending meal orders. For example, order tracking methodology (e.g., method 600 of FIG. 6) may be employed to associate with one or more meal preparation item and/or actions with an associated pending meal order.

In some embodiments, the machine learning model(s) generates one or more outputs that indicate a level of confidence that the meal preparation item or the meal preparation action is associated with the order data and the image data. Processing logic may further determine that the level of confidence satisfies a threshold condition. For example, the machine learning model may receive image data and generate a first output that identifies a first ingredient and a second output that indicate a level of confidence of the first output. Processing logic may determine whether the level of confidence meets a threshold condition (e.g., a minimum level of confidence) before proceeding to further steps of method 600.

In some embodiments, processing logic may determine or infer a first meal preparation action by determining one or more related meal preparation actions. For example, a first meal preparation action may be inferred even if it is not captured in image data. Processing logic may determine a second meal preparation action based on a first image frame of image data. Processing logic may determine the first meal preparation action based on the second meal preparation action. The first meal preparation action may occur outside a line of sight (LOS) of an image capture device associated with the image data. As discussed in later embodiments, actions performed in the meal preparation area may be performed outside a LOS of a camera. For example, ingredient retrieval from a storage location (e.g., freezer) may occur outside the field of view of a camera. In another example, actions may be obstructed from view of a camera. An employee may obstruct the view of the camera and the camera may not capture an action being performed, however, a later action may be used to determine that the obstructed action was performed. For example, an employee may be preparing a hamburger and reach for a tomato and place the tomato on the hamburger. However, the placement of the tomato on the hamburger may be obstructed from view of the camera. The camera may capture the employee retrieving the tomato from a bin and processing logic may determine that the tomato was placed on the hamburger. Accordingly, processing logic may use information on a first state of a food preparation area from a first time and a later second state of the food preparation area at a second time to determine that a particular action must have been performed to transition the food preparation area from the first state to the second state. In some embodiments, image data showing the first state and image data showing the second state may be input into a trained machine learning model, which may generate an output indicating the performed action was performed at a time between the first time and the second time.

At block 806, processing logic receives order data including one or more pending meal orders. In some embodiments, the systems may receive order data by pulling data from a kitchen management (e.g., point of sale (POS) system) application programming interface (API). Order data may include one or more pending meal orders. A pending meal order may include one or more meal preparation items and/or one or more meal preparation actions (e.g., preparation instructions) to be prepared for a customer. In some embodiments, a pending meal order may include a set of items associated with a combination of meal items (e.g., a "combo"). In some embodiments, meal preparation may include a target quantity. For example, a "chicken nugget meal" may include a target quantity of 6 chicken nuggets. A target quantity may be associated with a meal preparation action. For example, a meal item may include a "bowl of ice cream" and a target quantity may include two scoops. In another example, a meal may include a set of target meal components based on the order data. The processing logic may determine an absence of one of the set of target meal components based on the image data.

In some embodiments, tracking of meals within the restaurant occurs frame by frame as the one or more meal preparation items relocate within the meal preparation area. For example, for each frame of a video feed, one or more actions, poses and/or objects associated with a particular order may be identified and marked. Metadata may be generated indicating the order, the detected action, pose, object, etc., the location in the frame that the action, pose, object, etc. was detected, and so on. Alternatively or additionally, meals may be tracked based on predicted actions to be performed. Processing logic may predict a time duration that a meal preparation item may be occluded from a view of a camera. Processing logic may then expect the meal preparation item to enter a field of view of the camera after the time duration has expired. Processing logic may predict a future location of a meal preparation item based on a current location of the meal preparation item, a detected action being performed on the meal preparation item, a user post, and/or other information. For example, a current meal may include instructions to cook a first item for a first duration and processing logic may predict that the first item may be disposed proximate to a cooking appliance at the end of the first duration. In a further example, processing logic may infer that a first item may be occluded from the view of the camera when placed inside the cooking appliance. Processing logic may also determine a future location of the first item after cooking is completed (e.g., a pizza oven may have a first location to input the item and a second location to output the item). Processing logic may infer the absence of object detections of the first item for a duration and may infer the presence of object detections of the first item at a second location (e.g., output from the oven). In some embodiments, to determine errors, processing logic uses one or more order tracking methodology such as process logic associated with FIG. 6.

At block 808, processing logic determines an order preparation error based on the order data and at least one of the meal preparation item or the meal preparation action. An order preparation error may include, but is not limited to, determining an inaccurate ingredient (e.g., missing lettuce or too little of an ingredient), incorrect item (e.g., missing drink), inaccurate packaging (e.g., used cheeseburger packaging but should have used hamburger packaging), incorrect number of items (e.g., seven chicken pieces instead of six) missing miscellaneous item (e.g., missing sauce packets, utensils, etc.), missing or incorrect sets of items in a completed order (e.g., missing a hamburger, or used chicken taco instead of chicken burrito), incorrect quantity of items, and other meal preparation errors.

In some embodiments, processing logic may include determining an order density based on the order data. For example, processing logic may determine a number of orders that are currently pending. In some embodiments, the order data may be given a classification. For example, the order density may be classified as light, average, or heavy based on a number of currently pending orders. As discussed previously, order density may be used to alter a threshold condition for accepting and/or further processing outputs from one or more of the machine learning models discussed herein.

In some embodiments, processing logic tracks a "top" action and/or meal preparation item. A "top" item/action may indicate the meal preparation item and/or meal preparation action most recently associated with a meal being prepared. Often the top meal preparation item is located on top of a meal currently being prepared. For example, an employee may add a hamburger to a bun. The hamburger may be the top meal preparation item. An employee may add tomato to the burger. The tomato may then be the top meal preparation item. The top meal item may be tracked over the course of preparation a meal order to determine any meal preparation errors. In some embodiments, preparing one or more pending meal orders may include performing actions in a specific order. Tracking what action and/or meal item on top allows for processing logic to determine meal preparation errors associated with ordering of meal preparation steps.

In some embodiments, order data may include a one-to-one mapping between meal items to prepare and preparation entities (e.g., employee, preparation stations) to prepare the meal item. For example, a meal item (e.g., a sandwich) may be prepared entirely by the same employee and/or at the same preparation station. In some embodiments, processing logic may determine a meal preparation tool (e.g., a serving utensil, a meal delivery tool, etc.) based on the image data. For example, a serving spoon may be identified. Processing logic may determine an association between one or more pending meal orders and a preparation entity. For example, based on the image data, processing logic may determine an association between a serving spoon and a first employee responsive to detecting a proximity between the employee and the serving spoon (e.g., the employee is holding the serving spoon).

Processing logic may determine an association between a meal preparation item or meal preparation action and the preparation entity. For example, the employee may scoop a first ingredient into a bowl associated with a meal order. The employee may then be associated with preparing the meal order. Processing logic may assign or otherwise associate the employee with the meal order.

In some embodiments, processing logic may determine a meal preparation error based on an identified meal preparation item or action and an association between an employee or preparation station and a meal order. Processing logic may determine an error when an employee who has been assigned with making a meal order performs an action not used or not associated with the preparation of the assigned meal preparation item. For example, processing logic may determine an error when an employee who has been assigned to prepare a hamburger picks up a hot dog. In some embodiments, an employee or preparation station may be assigned or otherwise associated with preparing a portion of an order. For example, a first employee may cook a first ingredient and a second employee may retrieve and assemble the first ingredient into a packaged meal combination.

In some embodiments, it may be determined from image data that an order (or subset of an order) is completed. Processing logic may compare the completed order (or subset of the order) against order data and determine whether the completed order (or subset of the order) is identified with one or more of the pending orders of the order data. For example, processing logic may determine an employee is packaging a cheeseburger. Processing logic may search the order data and determine whether a cheeseburger is found within one of the pending meal orders. Processing logic may determine a meal preparation error by failing to identify a cheeseburger within the pending meal orders.

In some embodiments, processing logic may determine a meal preparation error based on an inferred quantity of the meal preparation item associated with one or more pending meal orders. For example, processing logic can determine that a quantity of a scoop of an ingredient is outside a threshold target quantity range (e.g., above an upper target threshold or below a lower target threshold). The quantity estimation of the scoop may be determined using quantity estimation described in association with FIG. 10.

In some embodiments, the determined meal preparation error may be associated with an error severity indicator. Processing logic may further determine if the error severity indicator meets a severity threshold condition. In some embodiments, a first error may be assigned as a level one error, and a second error may be assigned as a level two error. For example, a first error level may be associated with missing one or more auxiliary meal preparation items (e.g., napkins). A second error level may be associated with missing one or more components of a combination order (e.g., missing hamburger, fries, and/or a beverage of a meal combination). The order severity threshold may be modified by other received inputs and/or conditions. Processing logic may alter or use different severity threshold conditions based on the state of the meal preparation area. For example, as will be discussed further in later embodiments, processing logic may determine an order density of upcoming meal orders. In one instance, an order density may include a current volume of orders corresponding to a current state of the kitchen. In another instance, an order density may include a volume of orders within a target meal delivery time window. In another instance, image data captured of an order placement area (e.g., at a register, drive thru, etc.) may be used to predict an upcoming order volume which can be used to determine the order density. During conditions when the order density is above a threshold density level, the severity threshold condition may include a higher severity level requirement. For example, during busy (e.g., high order density) states of the kitchen, detected errors only of a high level of severity (e.g., second severity level) will be further processed relative to less busy (e.g., lower order density) states of the kitchen. Accordingly, during busy periods minor errors such as missing napkins may not be corrected. However, during less busy periods such minor errors may be corrected.

At block 810, processing logic may cause the order preparation error to be displayed on a graphical user interface (GUI). In some embodiments, the order preparation error is displayed on a kitchen display system (e.g., KDS 104 of FIG. 1). The order preparation error may be displayed proximate to an associated order. The order preparation error may include remedial instructions associated with correcting the order preparation error. For example, the error may include incorrect packaging for a first meal item, and remedial instruction may include replacing incorrect packaging with correct packaging. In another example, an error may include an incorrect quantity of a meal item and remedial instruction may include adding or removing an amount of the meal item to satisfy a target quantity. In another example, the processing logic may determine a quantity does not meet target quantity.

In some embodiments, the order preparation error is indicated to a meal preparation area via an auditory or visual feedback system. An auditory and/or visual feedback may alert one or more employees to a meal preparation error determined by the processing logic. In some embodiments the order preparation error is indicated to one or more employees dynamically (e.g., while steps of a meal order are concurrently occurring). The error may be indicated prior to the completion of the order and/or after the order is complete. For example, later meal preparation items may be saved from use on an incorrectly prepared order by alerting the one or more employees while preparation is occurring. In some embodiments, the auditory or visual feedback system may include an auditory device that emanates a sound (e.g., a tone or song) associated with a meal preparation error. For example, processing logic may cause a sound to play when one or more meal preparation errors are determined in a live meal preparation environment. In another example, processing logic may provide a positive indication when a meal is prepared correctly some as positively reinforcing visual effects (e.g., green lights, or celebratory visuals), auditory signals (e.g., uplifting and/or pleasant sounds, etc.) In some embodiments, the auditory or visual feedback system includes a light source (e.g., a light emitting diode (LED)). The light source may be visible in a meal packaging area and may emit a light responsive to processing logic determining a meal preparation error. In some embodiments, the auditory or visual feedback system may include one or more other visual, audio, and/or haptic (e.g., device vibrations) feedback output by (e.g., displayed, emitted from, etc.) by a meal preparation component (e.g., a KDS, speak system, POS, etc.).

In some embodiments, the order preparation error may be indicated to one or more employees at or near the end of a meal preparation procedure. For example, an employee may receive a notification indicating the order preparation error during packaging (e.g., bagging) an order into a deliverable container. In some embodiments, the notification may include an animation on a graphical user interface (GUI) (e.g., on a KDS monitor near a packaging/bagging area). In some embodiments, processing logic may cause a digital model (e.g., popup model) indicating a location of the error within a meal preparation area on a GUI.

In some embodiments, processing logic may prevent a meal order from being processed or may otherwise alter processing of a meal order based on determining a meal preparation error. Processing logic may prevent an order from being closed on a POS system. For example, processing logic may be prevent marking an order as complete on a touchscreen KDS system (e.g., in or near a packaging/bagging area). In another example, processing logic may prevent one or more inputs (e.g., press a button, dragging action (a "swipe"), etc.) on a touchscreen KDS (e.g., in or near a packaging/bagging area) responsive to determining the meal preparation error.

In some embodiments, processing logic may leverage one or more of the aforementioned feedback mechanisms (e.g., auditory or visual feedback system) independent of the determined specific type of meal preparation errors. For example, one or more feedback mechanism may be employed to indicate meal preparation mistakes, such as using an incorrect type and/or quantity of a meal preparation item throughout and/or at the completion of preparation of a meal order. In another example, the one or more feedback mechanisms may be employed to indicate when one more meal items are delivered to the wrong customer. In another example, one or more feedback mechanisms may be employed to determine meal preparation and/or quality deficiencies identified through processing methodology described herein.

In some embodiments, processing logic may receive an input from the one or more employees indicative of an accuracy or inaccuracy of the displayed meal preparation error. For example, processing logic may display a meal preparation error that is inaccurate. The employee may provide an input (e.g., using employee interface 206 of FIG. 2). The input may indicate the error was proper or improper. The input associated with the properness of the error may be used to further train the machine learning model (e.g., to increase accuracy of object detection model 314, tracking model 324, action recognition model 316, and/or order accuracy logic 352). In some embodiments, an input may be received to label meal preparation errors. For example, labels may include labeling meal preparation errors as proper and/or improper.

In some embodiments, the meal preparation errors may be aggregated and presented collectively on a graphical user interface. For example, many meal preparation errors may be stored and viewed together (e.g., in a post-mortem analysis of kitchen operations). Algorithms may be performed on the meal preparation errors to determine statistics of the meal preparation errors such as most common meal preparation errors, error density, relationships between error densities to order densities, and so on.

Figure 9:
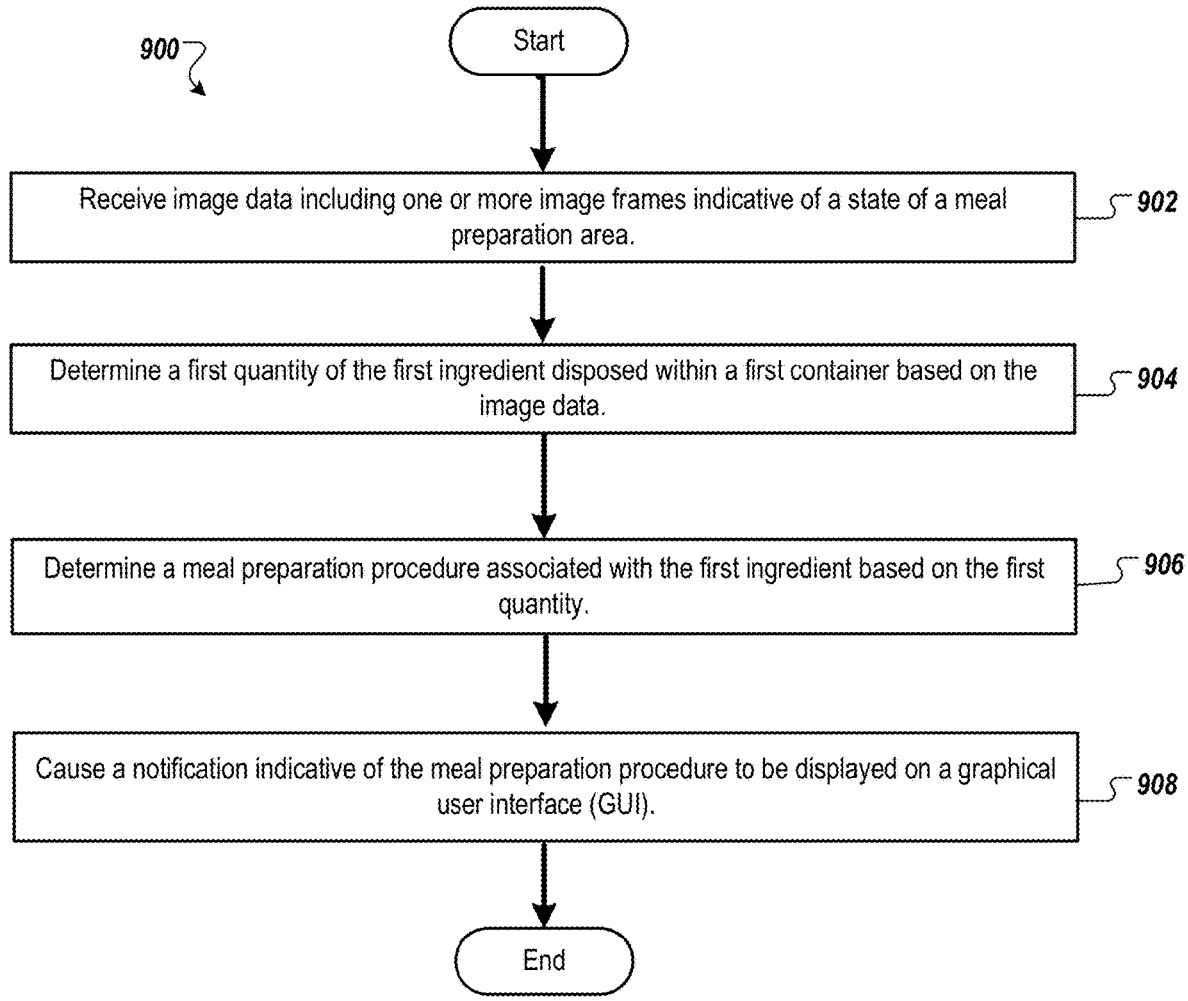
FIG. 9 depicts a flow diagram of one example method for processing image data to determine meal preparation procedures to be performed in anticipation of a future state of a meal preparation area, in accordance with some implementations of the present disclosure.

FIG. 9 depicts a flow diagram of one example method for processing image data to determine meal preparation procedures to be performed in anticipation of a future state of a meal preparation area, in accordance with some implementations of the present disclosure. Method 900 is performed by processing logic that may comprise hardware (circuitry, dedicated logic, etc.), software (such as is run on a general purpose computer system or a dedicated machine), or any combination thereof. In one implementation, the method is performed using kitchen management tool 350 (e.g., anticipatory prep logic 354) of FIG. 3, while in some other implementations, one or more blocks of FIG. 9 may be performed by one or more other machines not depicted in the figures.

Method 900 may include receiving image data (e.g., through data acquisition system 230 of FIG. 2) associated with a state of a meal preparation area and processing the image data to determine a first quantity of an ingredient disposed within a first container based on the image data. The determined quantity may be used further to determine an order preparation procedure associated with the ingredient.

At block 902, image data including one or more image frames indicative of a state of a meal preparation are received. As described in association with other embodiments, the image data may include one or more image frames captured at or proximate to a meal preparation area. For example, one or more cameras may be disposed at an elevated location (e.g., ceiling) and orientated to capture image frames of meals being prepared in a meal preparation area (e.g., kitchen). The one or more image frames of the image data may be sequential image frames taken by the same camera with a similar point of view. In some embodiments, the image data may include one or more non-sequential image frames (e.g., images taken earlier or later). In some embodiments, the image data includes one or more image frames taken by different cameras with different points of view of a meal preparation area (e.g., simultaneously or at different times). For example, one camera may be positioned in a drive-thru area while another camera may be positioned at an ingredient preparation area.

At block 904, processing logic determines a first quantity of a first ingredient disposed within a first container based on the image data. In some embodiments, as will be discussed in association with FIG. 12, processing logic may determine depth data from image data and/or from ranging data to determine a depth of one or more containers storing one or more meal preparation items. Depth data (e.g., an array of distances from the one or more cameras to a first ingredient stored within a meal preparation container) may be used to determine how much of an ingredient is remaining within a meal preparation container. In some embodiments, a cross-sectional area of the meal preparation container may be used with the depth data to determine the remaining volume of an ingredient stored within a container.

In some embodiments, as will be discussed further in association with FIG. 8, processing logic may segment the image data into regions associated with one or more containers. For example, a meal preparation area may include multiple ingredient containers used to store individual ingredients to be used to prepare an order. Processing logic may determine a first container location of a first container within the meal preparation area. Processing logic may identify a first ingredient based on the first container location. Processing logic may determine a first quantity of the first ingredient based on identifying the first ingredient. For example, a first ingredient (e.g., sliced tomatoes) may be stored at a first location. Processing logic may identify the first ingredient (e.g., sliced tomatoes) based on the location of the associated container storing the tomatoes. Processing logic may further determine a quantity of the sliced tomatoes (e.g., using depth/ranging data as described previously). In some embodiments, the identity of an ingredient may be used with the depth data to determine a first quantity. For example, a first ingredient may include an average density, an average thickness, an average diameter, and/or an average chunkiness, which process logic may use to determine a remaining quantity of the first ingredient disposed within a container. For example, processing logic may have access to information indicating a depth of a container, and indicating a distance between a camera and the top of the storage container when the storage container is full. Processing logic may determine a depth of the contents of the container below the top of the container and use that determined depth to determine a remaining depth and volume of the container is full. Processing logic may further determine a quantity of food preparation items in the container based on known average geometries of the food preparation items in the container and the remaining volume of the container occupied by the food preparation items.

In some embodiments, the processing logic may determine a container moved from a first location to a second location within a meal preparation area based on the image data (e.g., depth/ranging data). For example, a container housing a first ingredient may be identified at a first location. From the image data, processing logic can determine that the first container holding the first ingredient has moved to a second location. Actions associated with the second location can be associated with the first ingredient based on determining the location change.

In some embodiments, processing logic may determine a rate of consumption of an ingredient. In some embodiments the rate of consumption includes an inventory forecast over an upcoming time duration. Processing logic may receive a current quantity of the ingredient. Processing logic may use a historical rate of change of the ingredient to determine the rate of consumption of the ingredient. For example, process logic may receive past image frames and determine actions associated with the ingredient and how much of an ingredient is being used with each action. Estimated rate of change of the ingredient may be based on types of orders, time of day, a business state of the kitchen, and/or other information, for example.

At block 906, processing logic determines a meal preparation procedure associated with the first ingredient based on the first quantity. The meal preparation procedure may be a procedure that prepares the first ingredient so that it is ready to be used in orders. Processing logic may receive pacing data (e.g., pacing data 334 of FIG. 3) and/or data indicative of a state of the kitchen and/or predicted future state of the kitchen. Processing logic may determine a duration of a meal preparation procedure associated with the ingredient. As previously described, image data may be received and processing logic may detect one or more action outputs from one or more image frames. The one or more action outputs may be associated with a start and/or end time of an action. The start and end time of an action may be indicative of how long an action requires to be completed. Processing logic may query multiple image frames to determine an average action duration. The average action duration may take into account the state of the kitchen. Determining the meal preparation procedure may be based on pacing data using one or more pacing methodologies (e.g., using method 700 of FIG. 7).

The meal preparation procedure may include refilling the first ingredient within the first container and/or replacing the first container with a second container including the first ingredient. In some embodiments, the meal preparation procedure may include preparing a meal preparation tool. For example, the meal preparation procedure may include turning on/off meal preparation equipment (e.g., preheating an oven, starting up a cutting device, etc.) In another example, the meal preparation procedure may include packaging/unpackaging equipment, preparing a store for opening/closing, and/or relocating one or more meal preparation items (e.g., delivering a completed order).

In some embodiments, processing logic determines a time duration indicative of an amount of time the first ingredient is disposed within a container. The processing logic may use the amount of time to determine a meal preparation procedure. For example, a first ingredient may have a lifetime time duration before expiration or safe consumption. A time duration may indicate when the ingredient may be replaced to prevent expiration.

In some embodiments, processing logic receives (e.g., from a point of sale (POS) system) order data indicative of one or more pending meal orders. Processing logic may determine a meal preparation procedure further using the order data. For example, order tracking methodology (e.g., method 600 of FIG. 6) may be used to track one or more orders within a meal preparation order. The order tracking methodology may associate one or more meal preparation items and/or orders to one or more pending meal orders of the order data. A quantity of pending meal orders may be indicative of an order density. As previously noted, processing logic may predict a depletion rate of the first ingredient based on image data and use the current quantity to predict a future meal preparation procedure time. The depletion rate may be used along with a time an ingredient is disposed within a container to predict a replacement time at which the container may be empty and need to be refilled and/or replaced.

In some embodiments, processing logic may predict a duration of a meal preparation procedure associated with the ingredient. As previously described, image data may be received and processing logic may detect one or more action outputs from one or more image frames. The one or more action outputs may be associated with a start and/or end time of an action. The start and end time of an action may be indicative of how long an action has taken. Processing logic may query multiple image frames to determine an average action duration. Predicting the duration of the meal preparation procedure may be based on the average action duration. Predicting the duration of the meal preparation action may further be based on a predicted future state of the kitchen. For example, processing logic may determine a number of employees available to perform the action, resource commitments to other actions (e.g., an oven being used by another meal preparation procedure), an inventory forecast (e.g., a quantity of available resources), and/or prerequisite actions (e.g., a pan must first be cleaned to be used to cook an ingredient, chicken must be battered before cooked). In some embodiments, the duration of the meal preparation action is a time duration for a compound action (e.g., an action requiring multiple steps).

In some embodiments, the meal preparation procedure may include preparing a meal preparation tool associated with the ingredient. For example, preheating an oven, cleaning equipment, preparing secondary ingredients, and so on is associated with the meal preparation procedure and may be attributed to a portion of the duration of the meal preparation procedure.

In some embodiments, image data is used as input to a machine learning model. The machine learning model may be trained to receive the image data and generate one or more outputs. The one or more outputs may be indicative of a meal preparation procedure. For example, an image of a kitchen may be received by the machine learning model. The machine learning model may generate an output indicating an anticipatory preparation procedure (e.g., a future time and/or action to prepare a meal preparation item).

In some embodiments, the machine learning model generates one or more outputs that indicate a level of confidence that the meal preparation procedure should be performed. Processing logic may further determine that the level of confidence satisfies a threshold condition. For example, the machine learning model may receive image data and generate a first output that identifies a first anticipatory action and a second output that indicates a level of confidence of the first output. Processing logic may determine whether the level of confidence meets a threshold condition (e.g., a minimum level of confidence) before proceeding.

At block 908, processing logic causes a notification indicative of the meal preparation procedure to be displayed on a graphical user interface (GUI). In some embodiments, the meal preparation procedure is displayed on a kitchen display system (KDS) (e.g., KDS 104 of FIG. 1). The meal preparation procedure may include a time and action to be performed. For example, the display may indicate instructions such as "cook chicken in 5 minutes."

Figure 10:
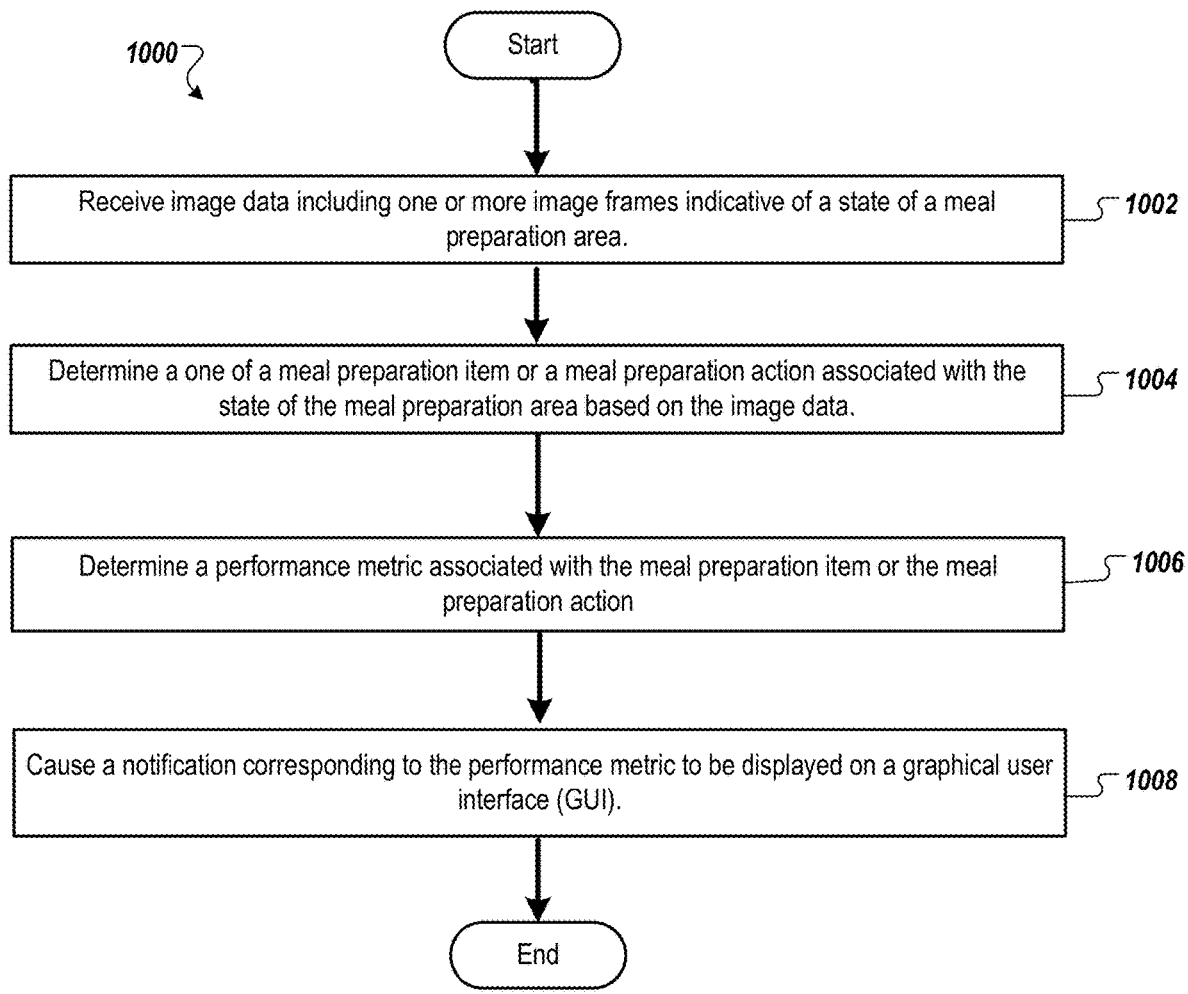
FIG. 10 depicts a flow diagram of one example method for processing image data to determine operationalized kitchen metrics, in accordance with some implementations of the present disclosure

FIG. 10 depicts a flow diagram of one example method 1000 for processing image data to determine operationalized kitchen metrics, in accordance with some implementations of the present disclosure. Method 1000 is performed by processing logic that may comprise hardware (circuitry, dedicated logic, etc.), software (such as is run on a general purpose computer system or a dedicated machine), or any combination thereof. In one implementation, the method is performed using kitchen management tool 350 (e.g., operational metrics logic 356) of FIG. 3A, while in some other implementations, one or more blocks of FIG. 10 may be performed by one or more other machines not depicted in the figures.

At block 1002, image data including one or more image frames indicative of a state of a meal preparation is received. As described in association with other embodiments, the image data may include one or more image frames captured by one or more cameras disposed at or proximate to a meal preparation area. For example, one or more cameras may be disposed at an elevated location (e.g., ceiling) and orientated to capture image frames of a meal being prepared in a meal preparation area (e.g., kitchen). The one or more image frames of the image data may be sequential image frames taken by the same camera or multiple cameras with a similar point of view. In some embodiments, the image data may include one or more non sequential image frames (e.g., images taken earlier or later). In some embodiments, the image data may include one or more image frames captured by different cameras with different points of view of a meal preparation area (e.g., simultaneously or at different times). For example, one camera may be positioned in a drive-thru area while another camera may be positioned at an ingredient preparation area.

At block 1004, processing logic determines at least one of a meal preparation item or a meal preparation action associated with the state of the meal preparation area based on the image data. The image data may include various image frames of a state of the meal preparation area. In some embodiments, the image frames may include multiple meal preparation items (e.g., ingredients, packaging, kitchen appliances, storage containers, and so on) within the captured images. In some embodiments, the image frame may capture actions performed within the kitchen (e.g., scooping an ingredient, cooking an ingredient, packaging an ingredient, delivering a prepared meal, etc.). The image data may be processed (e.g., using image processing tool 310) to determine objects, recognize actions, and track orders, among other things.

In some embodiments, image data is used as input to one or more trained machine learning models. The machine learning model(s) may be trained to receive the image data and generate one or more outputs. The one or more outputs may be indicative of a meal preparation item and/or a meal preparation action. For example, one or more image frames indicative of a state of a kitchen may be received by the one or more trained machine learning model. The trained machine learning model(s) may each generate an output indicating a detected ingredient (e.g., a hamburger, fries, a drink, etc.) and/or that an action is being performed (e.g., cooking a hamburger, salting fries, filling a drink, etc.). The detected meal preparation item and/or meal preparation action may be associated with one or more pending meal orders. For example, order tracking methodology (e.g., method 600 of FIG. 6) may be employed to associate with one or more meal preparation item and/or actions with an associated pending meal order.

In some embodiments, the machine learning model(s) generates one or more outputs that indicate a level of confidence that the meal preparation item or the meal preparation action is associated with the order data and the image data. Processing logic may further determine that the level of confidence satisfies a threshold condition. For example, the machine learning model may receive image data and generate a first output that identifies a first ingredient and a second output that indicate a level of confidence of the first output. Processing logic may determine whether the level of confidence meets a threshold condition (e.g., a minimum level of confidence) before proceeding to further steps of method 600.

In some embodiments, processing logic may determine or infer a first meal preparation action by determining one or more related meal preparation actions. For example, a first meal preparation action may be inferred even if it is not captured in image data. Processing logic may determine a second meal preparation action based on a first image frame of image data. Processing logic may determine the first meal preparation action based on the second meal preparation action. The first meal preparation action may occur outside a line of sight (LOS) of an image capture device associated with the image data.

At block 1006, processing logic determines a performance metric associated with the meal preparation item or the meal preparation action based on the image data. In some embodiments, the performance is associated with preparation time associated with the meal preparation item or the meal preparation action.

In some embodiments, processing logic determines preparation times of given employees, menu items, and/or preparations steps. Processing logic may determine preparation and/or delivery times of individual employees, shifts, stations, and/or menu items. For example, conventional systems may rely on sales data or start to end inventory changes. However, processing logic may provide for more granular metric measurements such as those metrics previously described. In embodiments, preparation times and/or other times that it takes to perform one or more actions associated with meal preparation are determined by processing logic. The preparation times and/or other times may be determined by determining when a particular action begins and when the particular action ends (e.g., when processing logic identifies that a place ingredient action has begun and when the place ingredient action has ended). Each processed image frame may be associated with a time stamp, and the time stamps of the frames together with identification of menu items, ingredients and/or actions associated with those frames can be used to determine such start times and end times.

In some embodiments, the processing logic can evaluate various granular efficiencies for a myriad of kitchen tasks and/or responsibilities (e.g., time to prepare a meal item, time to take an order, time to deliver orders, accuracy of order preparation, time since last order error/mistake, amount of waste attributed to an employee, and so on). Processing logic may employ a scoring system that evaluates individual employees, shifts, menu items, ingredient preparation, and the like. Processing logic may determine and/or provide incentives to increase one or more metrics for individuals, shifts, restaurants, and so on. Processing logic may also provide training to employees based on metrics having values that fall below certain thresholds. Incentives may be tailored to specific metrics that may have values lagging expected and/or target values for those metrics.

In some embodiments, processing logic determines, based on the image data, a first pose of a meal preparation entity (e.g., an employee) associated with the one of the meal preparation item or the meal preparation action. Processing logic further determines, based on the first pose, a meal preparation technique. The performance metric may correspond to a utilization (e.g., a frequency or rate of use) of the meal preparation technique. Processing logic consumes pose data (e.g., pose data 334 of FIG. 3A) to determine procedural and operational metrics. Processing logic may determine a frequency of use of a specified meal preparation technique. For example, processing logic may determine a rate of utilization of a given form or posture such as, for example, the use of one hand or two hands for a given action. In another example, processing logic may determine whether proper equipment for a given task is used. Processing logic may compare standard techniques or processes for carrying out one or more meal preparation tasks and what is actually being performed in the kitchen based on the image data.

In some embodiments, processing logic may compare the performance metric with one or more target condition (e.g., an upper threshold or lower threshold). For example, processing logic may determine that the performance metrics does not meet a target speed or accuracy condition (e.g., a lower threshold, a minimum standard, etc.) associated with the meal preparation item or the meal preparation action. Processing logic may further determine, responsive to determining that the performance metric does not meet the target speed or accuracy, a training procedure associated with a meal preparation item or the meal preparation action associated with the performance metric. In another example, processing logic may determine that the performance metric meets a target speed condition or a target accuracy condition (e.g., an upper threshold, a threshold indicating excellence meal preparation metrics) associated with the meal preparation item or the meal preparation action. Processing logic may further determine, responsive to determining that the performance metric meets the target speed condition or the target accuracy condition, determining a reward corresponding to the first meal preparation identify, wherein the notification indicates the reward.

In some embodiments, the performance metric(s) may be associated with a condition of the meal preparation and/or drive-thru area. For example, processing logic may determine, based on image data, a state of a customer queue area (e.g., drive-thru queue data, lobby queue area, etc.). Processing logic may determine one or more of the aforementioned metrics (e.g., speed, accuracy, efficiency, etc.) when customer demand is above a threshold amount (e.g., high demand, rush hour, etc.). Processing logic may include one or more metrics associated with an effectiveness of employees to reduce a line length below a target queue length. For example, a performance metric may be associated with a rate or a duration a queue length is above a threshold length. The threshold length may be associated with a line length that statistical deters a majority of customers from queueing.

In some embodiments, the performance metric is associated with idleness and/or downtime metrics associated with a meal preparation entity. For example, the idleness and/or downtime metrics may be associated with a rate and/or duration an employee is not working on a task. In another example, the idleness and/or downtime metrics may be associated with a rate and/or duration that a preparation station, a preparation appliance and/or a tool is not in use (e.g., an oven, a Panini press, an ingredient maker, etc.).

At block 1008, processing logic causes a notification corresponding to the performance metric(s) to be displayed on a graphical user interface (GUI). In some embodiments, the meal preparation procedure is displayed on a kitchen display system (KDS) (e.g., KDS 104 of FIG. 1). In some embodiments, the performance metric(s) is used in a post mortem analysis such as for statistical analysis and/or to determine what training to provide ton one or more employees. In some embodiments the performance metric(s) is displayed live within the meal preparation area. For example, within the meal preparation area an employee may see an indication that they just made the fastest burger or have the longest streak for filling orders without a mistake, and so on.

Figure 11:
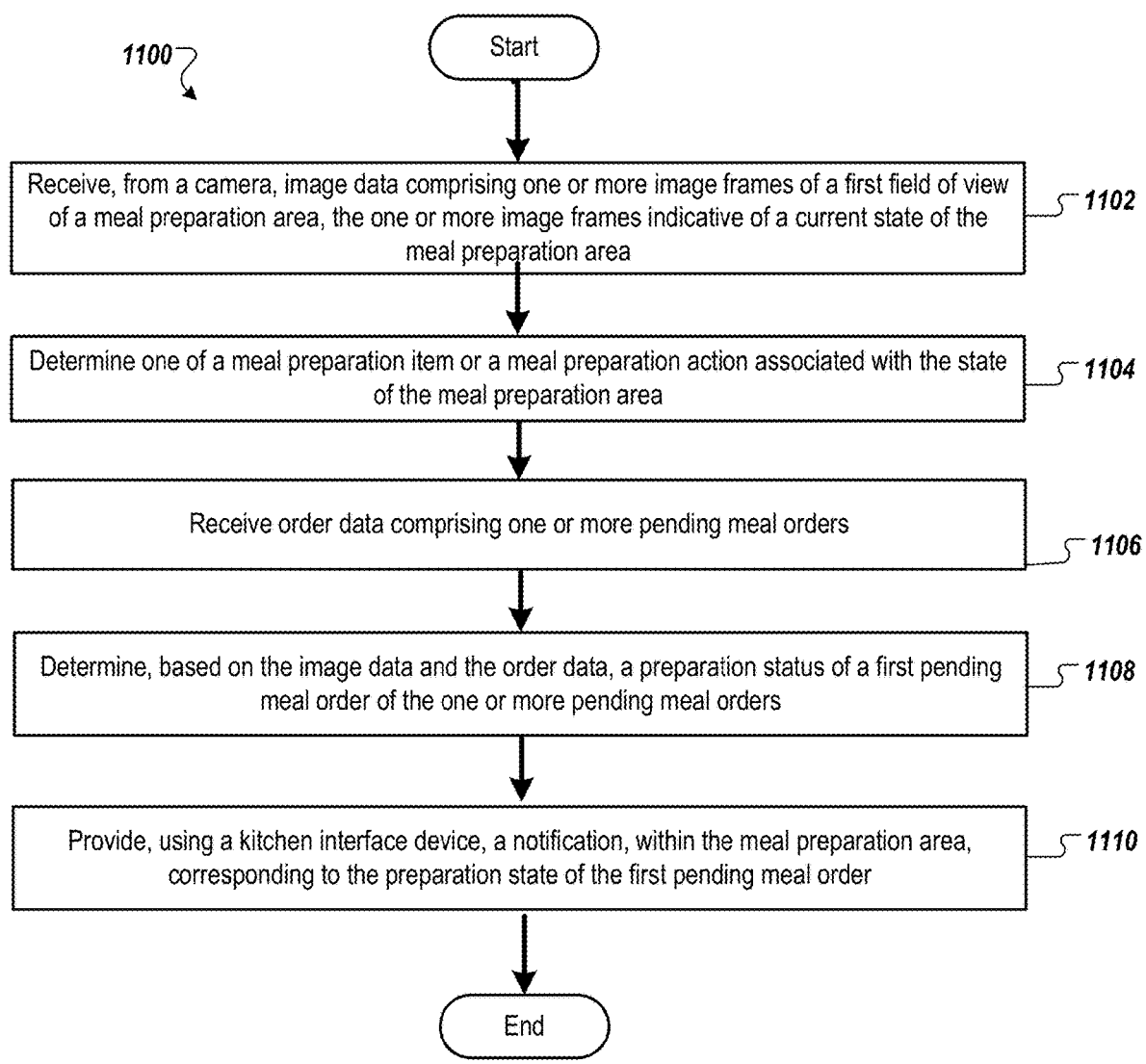
FIG. 11 depicts a flow diagram of one example method for processing image data to determine a preparation status of a pending meal order including providing a notification using a kitchen interface device, in accordance with some implementations of the present disclosure.

FIG. 11 depicts a flow diagram of one example method 1100 for processing image data to determine a preparation status of a pending meal order including providing a notification using a kitchen interface device, in accordance with some implementations of the present disclosure. Method 1100 is performed by processing logic that may comprise hardware (circuitry, dedicated logic, etc.), software (such as is run on a general purpose computer system or a dedicated machine), or any combination thereof. In one implementation, the method is performed using image process tool 300 (e.g., data integration tool 321) of FIG. 3, while in some other implementations, one or more blocks of FIG. 11 may be performed by one or more other machines not depicted in the figures.

At block 1102, processing logic receives, from a camera, image data comprising one or more image frames of a first field of view of a meal preparation area. The one or more image frames may be indicative of a current state of the meal preparation area. As described in association with other embodiments, the image data may include one or more image frames captured by one or more cameras disposed at or proximate to a meal preparation area. For example, one or more cameras may be disposed at an elevated location (e.g., ceiling) and orientated to capture image frames of a meal being prepared in a meal preparation area (e.g., kitchen). The one or more image frames of the image data may be sequential image frames taken by the same camera with a similar point of view. In some embodiments, the images data may include one or more non sequential image frames (e.g., images taken earlier or later). In some embodiments, the image data may include one or more image frames captured by different cameras with different points of view of a meal preparation area (e.g., simultaneously or at different times).

For example, one camera may be positioned in a drive-thru area while another camera may be positioned at an ingredient preparation area.

At block 1104, processing logic determines one of a meal preparation item or a meal preparation action associated with the state of the meal preparation area. The image data may include various image frames of a state of the meal preparation area. In some embodiments, the image frames may include multiple meal preparation items (e.g., ingredients, packaging, kitchen appliances, storage containers, and so on) within the captured images. In some embodiments, the image frames may capture actions performed within the kitchen (e.g., scooping an ingredient, cooking an ingredient, packaging an ingredient, delivering a prepared meal, etc.). The image data may be processed (e.g., using image processing tool 310) to determine objects, recognize actions, and track orders, among other things.

At block 1106, processing logic receives order data comprising one or more pending meal orders. In some embodiments, the systems may receive order data by pulling data from a kitchen management (e.g., point of sale (POS) system) application programming interface (API). Order data may include one or more pending meal orders. A pending meal order may include one or more meal preparation items and/or one or more meal preparation actions (e.g., preparation instructions) to be prepared for a customer. In some embodiments, a pending meal order may include a set of items associated with a combination of meal items (e.g., a "combo"). In some embodiments, meal preparation may include a target quantity. For example, a "chicken nugget meal" may include a target quantity of 6 chicken nuggets. A target quantity may be associated with a meal preparation action. For example, a meal item may include a "bowl of ice cream" and a target quantity may include two scoops. In another example, a meal may include a set of target meal components based on the order data. The processing logic may determine an absence of one of the set of target meal components based on the image data.

In some embodiments, tracking of meals within the restaurant occurs frame by frame as the one or more meal preparation items relocate within the meal preparation area. For example, for each frame of a video feed, one or more actions, poses and/or objects associated with a particular order may be identified and marked. Metadata may be generated indicating the order, the detected action, pose, object, etc., the location in the frame that the action, pose, object, etc. was detected, and so on. Alternatively or additionally, meals may be tracked based on predicted actions to be performed. Processing logic may predict a time duration that a meal preparation item may be occluded from a view of a camera. Processing logic may then expect the meal preparation item to enter a field of view of the camera after the time duration has expired. Processing logic may predict a future location of a meal preparation item based on a current location of the meal preparation item, a detected action being performed on the meal preparation item, a user post, and/or other information. For example, a current meal may include instructions to cook a first item for a first duration and processing logic may predict that the first item may be disposed proximate to a cooking appliance at the end of the first duration. In a further example, processing logic may infer that a first item may be occluded from the view of the camera when placed inside the cooking appliance. Processing logic may also determine a future location of the first item after cooking is completed (e.g., a pizza oven may have a first location to input the item and a second location to output the item). Processing logic may infer the absence of object detections of the first item for a duration and may infer the presence of object detections of the first item at a second location (e.g., output from the oven). In some embodiments, to determine errors, processing logic uses one or more order tracking methodology such as process logic associated with FIG. 6.

At block 1108, processing logic determines, based on the image data and the order data, a preparation status of a first pending meal order of the one or more pending meal orders. In some embodiments, processing logic may provide data indicating updates to statuses of pending meal orders. A meal often is prepared by carrying out a series of instructions or meal preparation actions. Processing logic may track a current state of an order and more specifically a meal. Processing logic may process image data to determine when a meal has advanced in the process and may perform an "auto-bump" in the KDS updating a status of an order in the kitchen system. For example, in conventional systems employees are providing an input to the KDS to advance a status of an order. However, processing logic may determine updates to order status and provide automatic advances of the order status based on processing the image data.

In some embodiments, processing logic may provide specific instructions to employees to carry out specific tasks. For example, processing logic may indicate that an employee needs to correct an order by performing a set of actions. In another example, processing logic may indicate to an employee one or more remaining tasks to complete an order and/or walk an employee through preparing a specific meal.

At block 1110, processing logic provides, using a kitchen interface device, a notification, within the meal preparation area, corresponding to the preparation state of the first pending meal order. In some embodiments, the kitchen interface device may display an overlay or other visual indicators on a screen contemporaneously with a live video feed of the meal preparation area. For a visual indicator such as, for example an arrow, a boundaries box, a color filter, and the like may be used to identify a meal preparation item and/or a location within the kitchen associated with a meal preparation action.

In some embodiments, the kitchen interface device 205 may provide specific instructions to employees to carry out specific tasks. For example, the kitchen interface device 205 may indicate that an employee needs to correct an order by performing a set of actions. In another example, the kitchen interface device may indicate to an employee one or more remaining tasks to complete an order and/or walk an employee through preparing a specific meal. In some embodiments, the kitchen interface device indicates a status of a customer queue area (e.g., line queue metrics such as how long queue line is, how long the wait, a duration or rate of time the line is above a target or threshold line length, and the like).

In some embodiments, the kitchen interface device may present a live feed of operational metrics within the kitchen. As will be discussed further in other embodiments, various operational metrics may be acquired about various tasks, operations, inventories, employee performance, customer queue analytics, among other things may be identified from the image frame acquired via cameras 232 in the kitchen and cameras 296 disposed in the drive thru. For example, analytics data on drive-thru queue time may be evaluated. In another example, analytics data on average pacing of employees per shift for specific actions (e.g., pacing chicken preparation) may be evaluated. The various analytics data may be used as a method for determining rewards such as identifying employees or combinations of employees that exceed target performance goals (e.g., speed, accuracy, efficiency, etc.). The various analytics may be displayed live on kitchen interface device. In some embodiments, the kitchen interface device may provide a rank or score associated with a current state of the kitchen. For example, a first employee may be listed with a score and/or ranking relative to other employees. In another example, a current store may be given a score and/or ranking relative to other stores. In another example, a specific workstation, combination of employees, meal preparation task, meal item, etc. may be analogously scored and/or ranked and displayed on the kitchen interface device.

In some embodiments, the various analytics and metrics may be associated with one or more user account, such as, for example employee profiles. The profiles may display one or more aspects of the metrics and/or analytics. In some embodiments, the user accounts may indicate holders of records and include visual icons, badges, list or graphics of accomplishments, and the like the visually show achievements of the employee corresponding to the user account.

Figure 12:
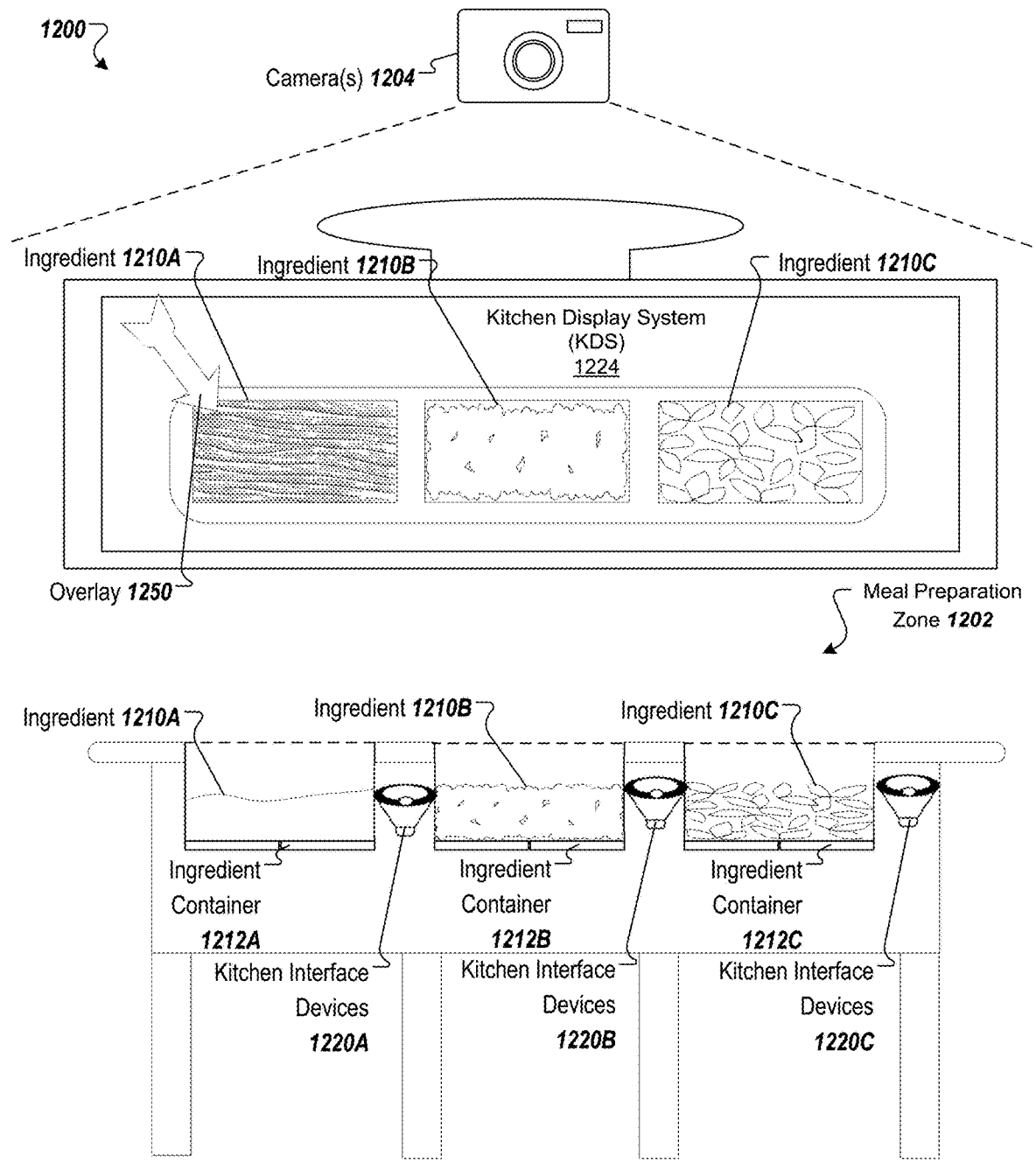
FIG. 12 depicts an image-based kitchen tracking system, according to certain embodiments.

FIG. 12 depicts an image-based kitchen tracking system 1200 using an integrated kitchen display system 1224, according to certain embodiments. As shown in FIG. 12, the image-based kitchen tracking system 1200 may include one or more cameras 1204 with one or more camera coverage zones. As described in association with other embodiments, image data captured by camera 1204 may include various ingredients 1210A-C disposed within multiple ingredient containers 1212A-C disposed at various locations within a meal preparation zone 1202.

In some embodiments, the image-based kitchen tracking system 1200 includes a KDS 1224 or more generally a display disposed within the meal preparation zone 1202. The KDS 1224 may display a status of a currently pending meal order. For example, the KDS 1224 may indicate a current step to be performed for one or more pending meal orders. The KDS 1224 may indicate a full list of remaining steps to complete one or more pending meal orders beyond just the next step.

In some embodiments, the KDS 1224 may display or prompt one or more actions associated with one or more preparation items in the meal preparation zone 1202. For example the KDS may use an overlay such as a graphic, visual cue, or other display mechanism to identify one or more remaining steps for a given meal preparation procedure. For example, the overlay 1250 may include a directional object such as, for example, an arrow. In another example, the overlay 1250 may include a bounding box. In another example, the overlay may include a map or color filter disposed on top of a graphic or visual feed corresponding to the kitchen area. The KDS 1224 may leverage the overlay 1250 with a graphic representative of the meal preparation zone 1202 such as for example, a picture of the meal preparation zone 1202. In some embodiments, the KDS 1224 may display a live video feed of the meal preparation zone 1202. The KDS 1224 may employ the overlay on top of the live video feed to indicate a live location of a corresponding meal preparation item and/or meal preparation action associated with a pending meal order.

In some embodiments, the KDS 1224 may visually indicate a step-by-step process for how to complete a meal order. For example, the KDS 1224 may be used a training, onboarding, re-training system that teaches a user (e.g., an employee) step by step how to prepare one or more menu items. In some embodiments, the KDS 1224 may incorporate a delay feature based on an amount of time or after an input from a user is received. The delay feature may delay showing an employee the item and/or order for advancing a meal order until after condition initiating the delay is met (e.g., a duration of time, user input (e.g., a help button)). In some embodiments, the identified training herein may be associated with the introduction of the new meal preparation item, a new menu item, a promotional item, a limited item, and the like. For example, the instructions may be associated with an item newly introduced to the meal preparation environment.

In some embodiments, the image-based kitchen tracking system 1200 includes one or more kitchen interface devices 1220A-C. The kitchen interface devices 1220A-C may be configured to receive inputs (e.g., using a touch screen interface, keyboard, mouse, etc.) from within the meal preparation area and/or provide outputs (e.g., using a printer, display, lights (e.g., light emitting diodes (LEDs)) haptic device, speakers etc.) to the meal preparation area. For example, the employee may provide inputs indicating labels of meal preparation items which may assist a customer in identifying the items either by the contents (e.g., cheese, no cheese, extra mustard, no must, bacon lettuce tomato "BLT" sandwich, etc.) or by name associated with the items (e.g., in an order with multiple meal items that may appear similar one to another). The employee may leverage aggregators or other system (e.g., meal tracking system) to track the items and provide and end label to mitigate confusion by the end customer receiving an assembled order.

For example, an LED, speaker, haptic device (e.g., vibration device such as a haptic touch screen), may indicate a subsequent meal preparation item or a meal preparation action associated with a new step in preparing a corresponding meal item. In some embodiments, the visual, auditory, and/or haptic cues may be provided after a delay in determining a new action is detected. For example, the kitchen interface devices may act as a training mechanism that displays cues indicating the next action to perform after the employee has had an opportunity to make an attempt. In some embodiments, the same or analogous cues may indicate whether and action be performed (e.g., a meal items being used in a corresponding action) is correct. For example, a negative cues such as a red light, a buzzer, or rapid haptic vibration, and the like may indicate a negative response and that a meal preparation error has occurred and/or is currently occurring. In some embodiments, analogous cues may be used to indicate an action is correctly performed. For example, a green light, a positive auditory cue, or light haptic vibrations may be used to indicate a correct action has been performed. In some embodiments, the kitchen interface device 1220A-C may be associated with an ingredient 1210A-C based on a proximity of the kitchen interface device 1220A-C to an ingredient container 1212A-C houses corresponding ingredients 1210A-C.

Figure 13:
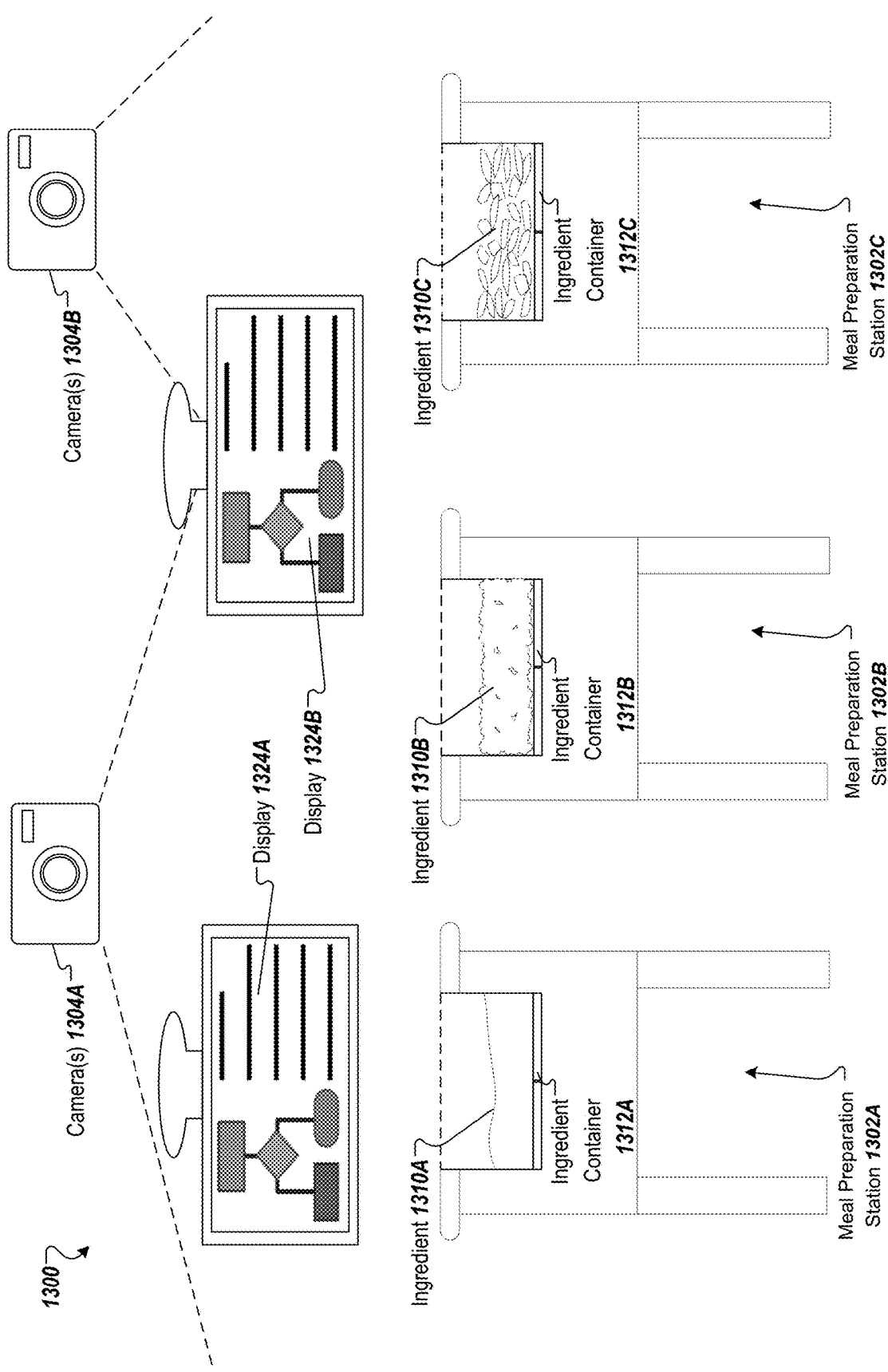
FIG. 13 depicts an image-based kitchen tracking system, according to certain embodiments.

FIG. 13 depicts an image-based kitchen tracking system 1300 using an integrated kitchen display system (KDS) with displays 1324A-B, according to certain embodiments. As shown in FIG. 13, the image-based kitchen tracking system 1300 may include one or more cameras 1304A-B with one or more camera coverage zones. As described in association with other embodiments, image data captured by camera 1304A-C may include multiple ingredient containers 1312A-C housing ingredients 1310A-C disposed at various locations across multiple meal preparation stations 1302A-C within a meal preparation zone.

In some embodiments, a display 1324A-B may be associated with a particular meal preparation station 1302A-C or a set of meal preparations stations 1302A-C. For example, a display 1324A-B may display information associated with one or more pending meal orders that are to be prepared using the corresponding meal preparation station 1302.

As previously discussed, an order, and more specifically a meal, often is prepared by carrying out a series of instructions or meal preparation actions. The image-based kitchen tracking system 1300 may track a current state of an order and more specifically a meal. The image-based kitchen tracking system 1300 may process image data of a kitchen to determine when a meal has advanced in the process and may perform an "auto-bump" in the KDS updating a status of an order in the kitchen system. For example, in conventional system employees are providing an input to the KDS to advance a status of an order. However, the image-based kitchen tracking system 1300 may determine updates to order status and provide automatic advances of the order status based on processing image data corresponding to the kitchen without the employee overhead of tracking and manually advancing orders. Further "auto-bumping" order may provide a system that tracks consistent criteria for advancing orders that is not dependent on multiple employees "bumping" order under various interpretable criteria. "Auto-bumping" may further allow each preparation station to be updated and on the same page at any given moment in the kitchen when the orders are updated live automatically by the kitchen system rather than waiting for an employee to manually bump one or more order tasks through. The displays may update a presentation of a status of a currently pending order based on a determination of an advancement of a meal preparation status. For example, an order may be display on a first display when a current meal preparation action corresponds to a first meal preparation station 1302A. The image-based kitchen tracking system may determine an advancement of the meal preparation status to a second meal preparation procedure associated with a different meal preparation station 1302B. The preparation status of a corresponding meal order may move from a first display to a second display corresponding to the newly corresponding meal preparation station 1302B.

In some embodiments, the displays 1324A-B may present a live feed of operational metrics within the kitchen. As previously discussed, various operational metrics may be acquired about various tasks, operations, inventories, employee performance, customer queue analytics, among other things may be identified from the image frame acquired via cameras 1304A-B in the kitchen and cameras disposed in the drive thru. For example, analytics data on drive-thru queue time may be evaluated. In another example, analytics data on average pacing of employees per shift for specific actions (e.g., pacing chicken preparation) may be evaluated. The various analytics data may be used as a method for determining rewards such as identifying employees or combinations of employees that exceed target performance goals (e.g., speed, accuracy, efficiency, etc.). The various analytics may be displayed (e.g., updated live) on display 1324A-B. In some embodiments, the display 1324A-B may provide a rank or score associated with a current state of the kitchen. For example, a first employee may be listed with a score and/or ranking relative to other employees. In another example, a current store may be given a score and/or ranking relative to other stores. In another example, a specific workstation, combination of employees, meal preparation task, meal item, etc. may be scored, analogously ranked, and displayed on display 205.

Figure 14:
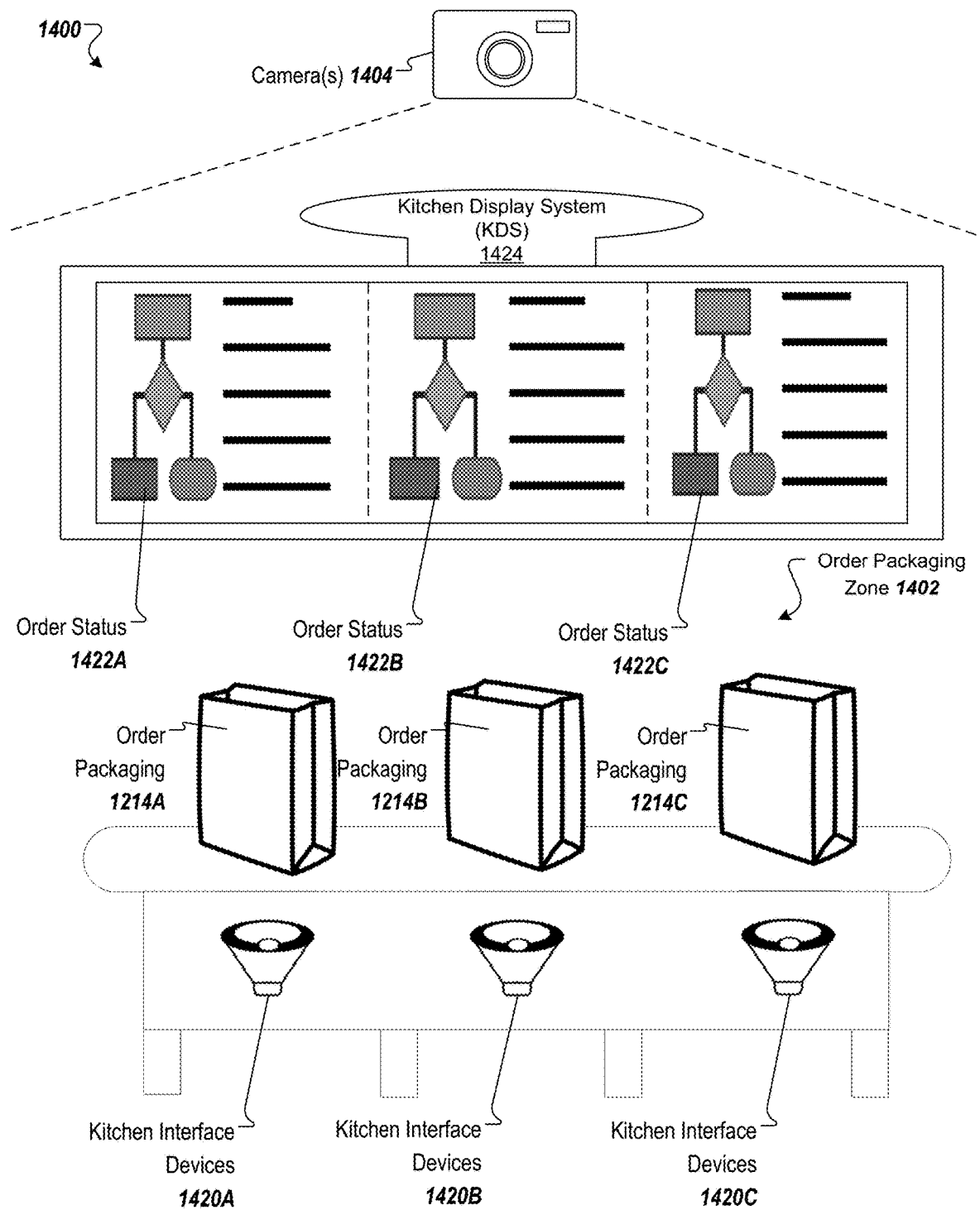
FIG. 14 depicts an image-based kitchen tracking system, according to certain embodiments.

FIG. 14 depicts an image-based kitchen tracking system 1400 using an integrated kitchen display system 1424, according to certain embodiments. As shown in FIG. 14, the image-based kitchen tracking system 1400 may include one or more cameras 1404 with one or more camera coverage zones. As described in association with other embodiments, image data captured by camera 1404 may include multiple bag and/or meal packaging to house one or more meal preparation items.

In some embodiments, the KDS 1424 may indicate to an employee who is assembling orders information regarding the status 1422A-C of currently pending orders, such as, for example dynamically displaying the contents of order packaging 1214A-C (e.g., bags or wrapping using to cover or other support one or more meal preparation items). In some embodiments, the KDS 1424 may indicates which package or bag to place an item as an employee prepares to assemble an order together.

In some embodiments, the image-based kitchen tracking system 1400 may include one or more kitchen interface devices 1420A-C. As will be discussed in other embodiments, various kitchen interfaces devices such as visual, auditory, and/or haptic devices may provide an associated signal to indicates which of the packages to put a corresponding meal item into. For example, an LED, speaker, haptic device (e.g., vibration device such as a haptic touch screen), etc. may indicate an order packaging 1214A-C associated with a meal preparation item (e.g., held by the employee). In some embodiments, the visual, auditory, and/or haptic cues may be provided after a delay in determining a new action is detected. For example, the kitchen interface devices may act as a training mechanism that displays cues indicating the next action to perform after the employee has had an opportunity to make an attempt. In some embodiments, the same or analogous cues may indicate whether an action being performed (e.g., placing a meal preparation item within an order packaging 1214A-C) is correct. For example, a negative cues such as a red light, a buzzer, or rapid haptic vibration, and the like may indicate a negative response and that a meal packaging/bagging error has occurred and/or is currently occurring. In some embodiments, analogous cues may be used to indicate an action is correctly performed. For example, a green light, a positive auditory cue, or light haptic vibrations may be used to indicate a correct action (e.g., correct placement of a meal item within order packaging 1214A-C) has been performed. In some embodiments, the kitchen interface device 1220A-C may be associated with an order packaging 1211A-C based on a proximity of the kitchen interface device 1420A-C to an order packaging 1214A-C.

In some embodiments, the KDS 1425 may indicate a live update of a contents of a meal package or a bag enclosing one or more meal preparation. For example, a bag may enclose one or more meal preparation items and as items are added to (and in some cases removed from) the bag the contents of the bag may be updated on the KDS 1424. Some meal items have a similar appearance such as, for example, various packaging used to wrap meal items and the ability to see the contents of the bag may allow for improved efficiency and accuracy in preparing and/or delivering meal to customers. In some embodiments, the KDS 1424 may indicate what is still needed to be input into a bad to complete an order. For example, the display may indicate that a first item is in the bag by showing the item in a positive position on the KDS 1424. For example, the first item may be shown in green, with a checkmark next the item name, faded out, and the like to show that the first item is accounted for in the contents of a bag. On the other hand, items that are not currently in a bag but are still needed to complete the order may be displayed in a prominent position. For example, a second item that is needed in a first bag may be presented on the KDS 1424 with a red color, highlighted, or otherwise indicated that the second item needs to be added to the bag.

Figure 15:
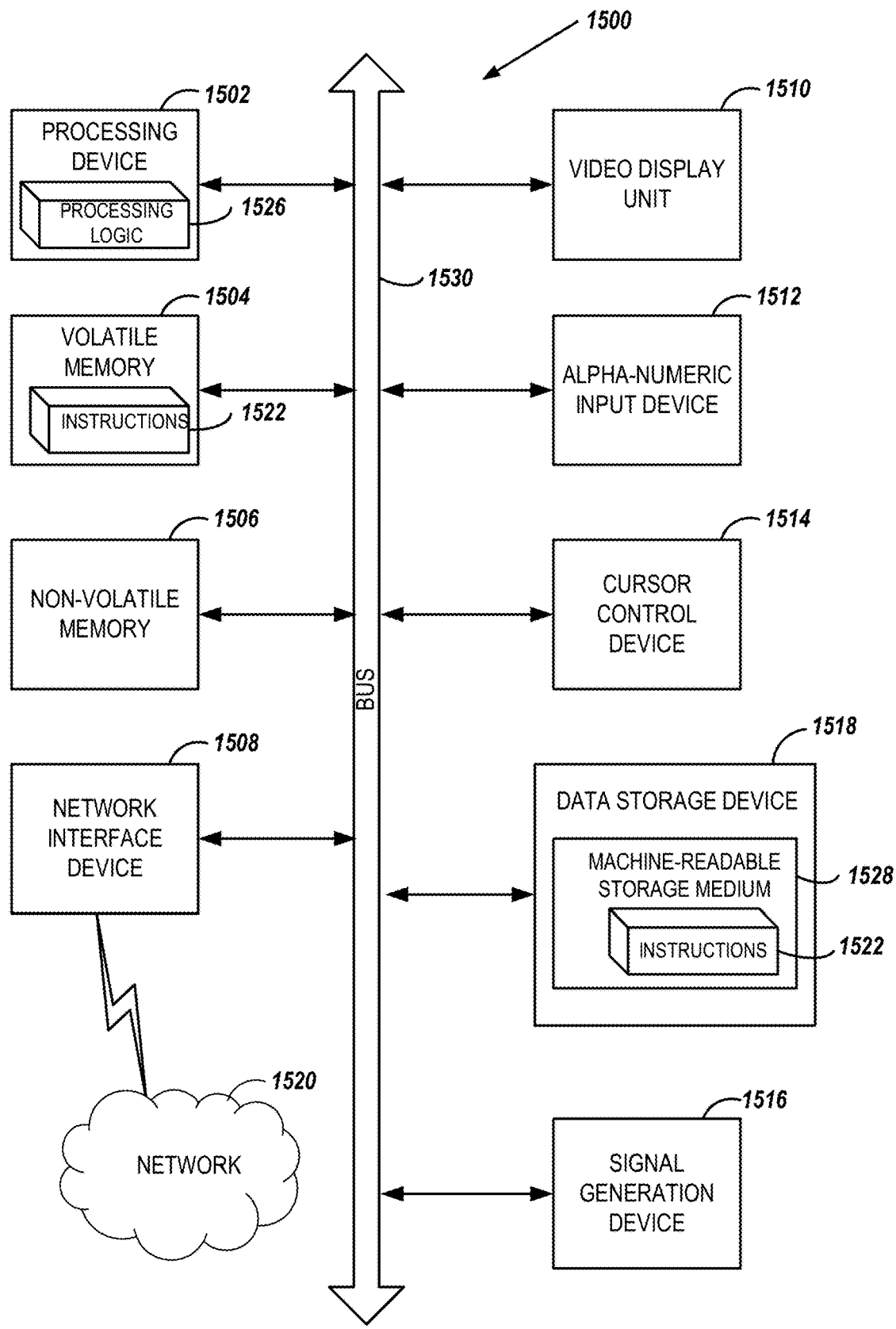
FIG. 15 depicts a block diagram of an example computing device, operating in accordance with one or more aspects of the present disclosure.

FIG. 15 depicts a block diagram of an example computing device 1500, operating in accordance with one or more aspects of the present disclosure. In various illustrative examples, various components of the computing device 1500 may represent various components of the POS 102, KDS 104 server 116, illustrated in FIG. 1 and machine learning system 210, data integration system 202, client device 207, data acquisition system 230, kitchen management system 220, illustrated in FIG. 2.

Example computing device 1500 may be connected to other computer devices in a LAN, an intranet, an extranet, and/or the Internet. Computing device 1500 may operate in the capacity of a server in a client-server network environment. Computing device 1500 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 1500 may include a processing device 1502 (also referred to as a processor or CPU), a main memory 1504 (e.g., read-only memory (ROM), flash memory, dynamic random access memory (DRAM) such as synchronous DRAM (SDRAM), etc.), a static memory 1506 (e.g., flash memory, static random access memory (SRAM), etc.), and a secondary memory (e.g., a data storage device 1518), which may communicate with each other via a bus 1530.

Processing device 1502 represents one or more general-purpose processing devices such as a microprocessor, central processing unit, or the like. More particularly, processing device 1502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1502 may be configured to execute instructions implementing methodology described in association with FIGS. 1-14.

Example computing device 1500 may further comprise a network interface device 1508, which may be communicatively coupled to a network 1520. Example computing device 1500 may further comprise a video display 1510 (e.g., a liquid crystal display (LCD), a touch screen, or a cathode ray tube (CRT)), an alphanumeric input device 1512 (e.g., a keyboard), a cursor control device 1514 (e.g., a mouse), and an acoustic signal generation device 1516 (e.g., a speaker).

Data storage device 1518 may include a machine-readable storage medium (or, more specifically, a non-transitory machine-readable storage medium) 1528 on which is stored one or more sets of executable instructions 1522. In accordance with one or more aspects of the present disclosure, executable instructions 1522 may comprise executable instructions associated with methodology associated with FIGS. 1-14.

Executable instructions 1522 may also reside, completely or at least partially, within main memory 1504 and/or within processing device 1502 during execution thereof by example computing device 1500, main memory 1504 and processing device 1502 also constituting computer-readable storage media. Executable instructions 1522 may further be transmitted or received over a network via network interface device 1508.

While the computer-readable storage medium 1528 is shown in FIG. 15 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, compact disc read only memory (CD-ROMs), and magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   receiving, by a processing device, image data comprising one or more image frames indicative of a state of a meal preparation area;
   determining, by the processing device based on the image data, a first meal preparation item or a first meal preparation action associated with the state of the meal preparation area at a first time;
   determining, by the processing device based on the image data, a second meal preparation item or a second meal preparation action associated with the state of the meal preparation area at a second time, wherein an identity of the first meal preparation item or the first meal preparation action corresponds to an identity of the second meal preparation item or the second meal preparation action;
   determining, by the processing device based on the image data, a performance metric associated with a meal preparation procedure corresponding to (i) the first meal preparation item or the first meal preparation action and (ii) the second meal preparation item or the second meal preparation action; and
   causing, by the processing device, a notification corresponding to the performance metric to be displayed on a graphical user interface (GUI).

2. The method of claim 1, wherein determining the first meal preparation item or the first meal preparation action comprises:
   using the image data as input to a machine learning model; and
   obtaining one or more outputs of the machine learning model, the one or more outputs indicative of the first meal preparation item or the first meal preparation action.

3. The method of claim 1, further comprising:
   determining, based on the image data, a first pose of a meal preparation entity associated with the meal preparation procedure; and
   determining, based on the first pose, a meal preparation technique, wherein the performance metric corresponds to a utilization of the meal preparation technique.

4. The method of claim 1, further comprising:
   determining, based on the image data, one of a meal preparation entity or a meal preparation station associated with the meal preparation procedure, wherein the performance metric is associated with an accuracy or a speed corresponding to the meal preparation entity or the meal preparation station.

5. The method of claim 4, further comprising:
   determining that the performance metric does not meet a target speed or accuracy condition associated with the meal preparation procedure; and
   determining a training procedure associated with the meal preparation procedure, wherein the notification indicates the training procedure.

6. The method of claim 4, further comprising:
   determining that the performance metric meets a target speed condition or a target accuracy condition associated with the meal preparation procedure; and
   responsive to determining that the performance metric meets the target speed condition or the target accuracy condition, determining a reward corresponding to the meal preparation entity, wherein the notification indicates the reward.

7. The method of claim 6, wherein the notification comprises an icon indicating the reward associated with a user account corresponding to the meal preparation entity.

8. The method of claim 4, further comprising:
   determining an employee schedule corresponding to the meal preparation entity based on the performance metric, wherein the notification indicates at least a portion of the employee schedule.

9. The method of claim 1, further comprising:
   receiving second image data comprising one or more image frames indicative of a state of a customer queue area; and
   determining the performance metric further based on the second image data, wherein the performance metric corresponds to the state of the customer queue area.

10. The method of claim 1, wherein the performance metric corresponds to a rate or duration a customer queue area maintains a queue length longer that a threshold queue length.

11. The method of claim 1, wherein the performance metric is associated with at least one of a speed or an accuracy corresponding to the meal preparation procedure.

12. The method of claim 1, wherein the performance metric corresponds to a rate or duration of downtime of a first meal preparation entity.

13. The method of claim 1, wherein the performance metric corresponds to a presentation metric indicating a presentation quality of the first meal preparation item and the second meal preparation item.

14. The method of claim 1, further comprising:
determining, based on the image data, one of a meal preparation entity or a meal preparation station associated with the meal preparation procedure, wherein:
the performance metric corresponds to a score or ranking associated with the meal preparation entity or the meal preparation station; and
the notification indicates a relative placement of the score or ranking in relation to one or more other meal preparation entities or other meal preparation stations.

15. The method of claim 1, wherein:
the performance metric corresponds to a score or ranking associated with a restaurant corresponding to the meal preparation area; and
the notification indicates a relative placement of the score or ranking in relation to one or more other restaurants.

16. The method of claim 1, wherein the GUI corresponds to a display disposed within the meal preparation area, wherein the notification is displayed within the meal preparation area.

17. A system comprising:
a first camera to capture image data comprising one or more image frames of a first field of view of a meal preparation area, the one or more image frames indicative of a state of the meal preparation area;
a kitchen interface device configured to at least one of i) receive inputs from within the meal preparation area and ii) provide outputs to the meal preparation area;
a memory; and
a processing device, coupled to the memory, the first camera, and the kitchen interface device, wherein the processing device is to:
receive, from the first camera, the image data;
determine, based on the image data, a first meal preparation item or a first meal preparation action associated with the state of the meal preparation area at a first time;
determine, based on the image data, a second meal preparation item or a second meal preparation action associated with the state of the meal preparation area at a second time, wherein an identity of the first meal preparation item or the first meal preparation action corresponds to an identity of the second meal preparation item or the second meal preparation action;
determine, based on the image data, a performance metric associated with a meal preparation procedure corresponding to (i) the first meal preparation item or the first meal preparation action and (ii) the second meal preparation item or the second meal preparation action;
receive order data comprising one or more pending meal orders;
determine, based on the image data, the order data, and the performance metric, a preparation status of a first pending meal order of the one or more pending meal orders; and
provide, using the kitchen interface device, a notification within the meal preparation area corresponding to the preparation status of the first pending meal order.

18. The system of claim 17, wherein the kitchen interface device comprises at least one of an auditory output device, a visual output device, or a haptic output device, and wherein the processing device is further to:
determine, based on the preparation status, a subsequent meal preparation item to the first meal preparation item or a subsequent meal preparation action to the first meal preparation action corresponding to the meal preparation procedure; and
provide, using the kitchen interface device, at least one of an auditory signal, a visual signal, or a haptic signal proximate a location corresponding to the subsequent meal preparation item or the subsequent meal preparation action.

19. The system of claim 17, wherein the kitchen interface device comprises a kitchen display, and wherein the processing device is further to:
determine, based on the preparation status, a subsequent meal preparation item to the first meal preparation item or a subsequent meal preparation action to the first meal preparation action corresponding to the meal preparation procedure
generate an overlay corresponding to the subsequent meal preparation item or the subsequent meal preparation action; and
provide the overlay for presentation with a video feed of the meal preparation area on the kitchen display.

20. The system of claim 17, wherein the kitchen interface device comprises a kitchen display, and wherein the processing device is further to:
determine, based on the image data, a contents of a meal preparation package; and
causing the contents of the meal preparation package to be presented on the kitchen display.

21. The system of claim 20, wherein the processing device is further to:
determine, based on the contents of the meal preparation package and the order data, one or more remaining meal preparation item corresponding to preparing the first pending meal order; and
cause the one or more remaining meal preparation item to be presented on the kitchen display.

22. The system of claim 17, wherein the processing device is further to:
cause a notification corresponding to the performance metric to be displayed on a graphical user interface (GUI).

23. A non-transitory machine-readable storage medium comprising instructions that, when executed by a processing device, cause the processing device to perform operations comprising:
receiving image data comprising one or more image frames indicative of a state of a meal preparation area;
determining, based on the image data, a first meal preparation item or a first meal preparation action associated with the state of the meal preparation area at a first time;
determining, based on the image data, a second meal preparation item or a second meal preparation action associated with the state of the meal preparation area at a second time, wherein an identity of the first meal preparation item or the first meal preparation action corresponds to an identity of the second meal preparation item or the second meal preparation action;
determining, based on the image data, a performance metric associated with a meal preparation procedure corresponding to (i) the first meal preparation item or the first meal preparation action and (ii) the second meal preparation item or the second meal preparation action; and
causing a notification corresponding to the performance metric to be displayed on a graphical user interface (GUI).

24. The non-transitory machine-readable storage medium of claim 23, wherein determining the first meal preparation item or the first meal preparation action comprises:
- using the image data as input to a machine learning model; and
- obtaining one or more outputs of the machine learning model, the one or more outputs indicative of the first meal preparation item or the first meal preparation action.

25. The non-transitory machine-readable storage medium of claim 23, wherein the operations further comprise:
- determining, based on the image data, a first pose of a meal preparation entity associated with the meal preparation procedure; and
- determining, based on the first pose, a meal preparation technique, wherein the performance metric corresponds to a utilization of the meal preparation technique.

26. The non-transitory machine-readable storage medium of claim 23, wherein the operations further comprise:
- determining, based on the image data, one of a meal preparation entity or a meal preparation station associated with the meal preparation procedure, wherein the performance metric is associated with a meal preparation accuracy or a meal preparation speed corresponding to the meal preparation entity or the meal preparation station.

27. The non-transitory machine-readable storage medium of claim 23, wherein the operations further comprise:
- receiving second image data comprising one or more image frames indicative of a state of customer queue area; and
- determining the performance metric further based on the second image data, wherein the performance metric corresponds to a rate or duration a customer queue area maintains a queue length longer that a threshold queue length.

* * * * *